United States Patent
Lee et al.

(10) Patent No.: US 10,926,659 B2
(45) Date of Patent: Feb. 23, 2021

(54) OPTIMIZATION FRAMEWORK AND METHODS FOR ADAPTIVE EV CHARGING

(71) Applicants: California Institute of Technology, Pasadena, CA (US); Powerflex Systems, Inc., Los Altos, CA (US)

(72) Inventors: Ted Lee, San Marino, CA (US); Zachary J. Lee, Pasadena, CA (US); Steven H. Low, La Cañada, CA (US); Daniel C. Chang, San Jose, CA (US); Cheng Jin, Saratoga, CA (US); Rand B. Lee, San Marino, CA (US); George S. Lee, Pasadena, CA (US)

(73) Assignees: California Institute of Technology, Pasadena, CA (US); Powerflex Systems, Inc., Los Altos, CA (US)

( * ) Notice: Subject to any disclaimer, the term of this patent is extended or adjusted under 35 U.S.C. 154(b) by 81 days.

(21) Appl. No.: 16/208,075

(22) Filed: Dec. 3, 2018

(65) Prior Publication Data

US 2019/0184850 A1    Jun. 20, 2019

Related U.S. Application Data

(60) Provisional application No. 62/678,877, filed on May 31, 2018, provisional application No. 62/593,755, filed on Dec. 1, 2017.

(51) Int. Cl.
*B60L 53/00* (2019.01)
*B60L 53/67* (2019.01)
(Continued)

(52) U.S. Cl.
CPC .............. *B60L 53/67* (2019.02); *B60L 53/51* (2019.02); *B60L 53/62* (2019.02); *B60L 53/66* (2019.02); *B60L 53/68* (2019.02)

(58) Field of Classification Search
CPC .......... B60L 53/67; B60L 53/66; B60L 53/51; B60L 53/68; B60L 53/62
See application file for complete search history.

(56) References Cited

U.S. PATENT DOCUMENTS

| 5,677,924 A | 10/1997 | Bestwick |
| 6,625,520 B1 | 9/2003 | Chen et al. |

(Continued)

FOREIGN PATENT DOCUMENTS

| CN | 103241130 A | 8/2013 |
| EP | 3179421 A1 | 6/2017 |

(Continued)

OTHER PUBLICATIONS

International Preliminary Report on Patentability for International Application PCT/US2015/032482, Report dated Nov. 29, 2016, dated Dec. 8, 2016, 12 Pgs.

(Continued)

*Primary Examiner* — Naum Levin
(74) *Attorney, Agent, or Firm* — KPPB LLP

(57) ABSTRACT

Adaptive charging networks in accordance with embodiments of the invention enable the optimization of electric design of charging networks for electric vehicles. One embodiment includes an electric vehicle charging network, including one or more centralized computing systems, a communications network, several, electric vehicle node controllers for charging several electric vehicles (EVs), where the one or more centralized computing systems is configured to: receive the electric vehicle node parameters from several electric vehicle node controllers, calculate a charging rates for the electric vehicle node controllers using quadratic programming (QP), where the quadratic programming computes the charging rates based on the electric vehicle node parameters, adaptive charging parameters and a quadratic (Continued)

cost function, and distributes the charging rates to the electric vehicle node controllers.

20 Claims, 28 Drawing Sheets

(51) Int. Cl.
*B60L 53/66* (2019.01)
*B60L 53/51* (2019.01)
*B60L 53/68* (2019.01)
*B60L 53/62* (2019.01)

(56) References Cited

U.S. PATENT DOCUMENTS

| | | | |
|---|---|---|---|
| 7,076,360 B1 | 7/2006 | Ma | |
| 7,852,050 B2 | 12/2010 | Berggren et al. | |
| 8,013,570 B2* | 9/2011 | Baxter | B60L 3/0084 320/109 |
| 8,346,401 B2* | 1/2013 | Pollack | B60L 53/18 700/291 |
| 8,407,016 B2 | 3/2013 | Slota et al. | |
| 8,754,627 B1 | 6/2014 | Le | |
| 8,972,074 B2 | 3/2015 | Marasanapalle et al. | |
| 9,024,580 B2 | 5/2015 | Wu et al. | |
| 9,093,844 B2 | 7/2015 | Yonezawa et al. | |
| 9,112,382 B2 | 8/2015 | Aisu et al. | |
| 9,148,027 B2 | 9/2015 | Shane et al. | |
| 9,153,966 B2* | 10/2015 | Ishida | B60L 53/60 |
| 9,168,841 B2* | 10/2015 | Kawai | B60L 53/11 |
| 9,225,171 B2* | 12/2015 | Chen | H02J 13/0006 |
| 9,248,755 B2* | 2/2016 | Sun | B60L 11/184 |
| 9,335,748 B2* | 5/2016 | Francino | H02J 3/008 |
| 9,418,318 B2 | 8/2016 | Nadar et al. | |
| 9,564,757 B2 | 2/2017 | Wang et al. | |
| 9,703,308 B2* | 7/2017 | Claessens | G06Q 10/04 |
| 9,760,957 B2* | 9/2017 | Hug | G06Q 50/06 |
| 9,863,985 B2 | 1/2018 | Giannakis et al. | |
| 9,954,362 B2 | 4/2018 | Low et al. | |
| 10,065,520 B2* | 9/2018 | Zhang | G06Q 20/145 |
| 10,158,229 B2 | 12/2018 | Gan et al. | |
| 10,198,018 B2 | 2/2019 | Gan et al. | |
| 10,317,970 B2 | 6/2019 | Peng et al. | |
| 10,320,203 B2 | 6/2019 | Low et al. | |
| 10,673,232 B2 | 6/2020 | Zhao et al. | |
| 2008/0004721 A1 | 1/2008 | Huff et al. | |
| 2008/0005597 A1 | 1/2008 | Kern et al. | |
| 2008/0077368 A1 | 3/2008 | Nasle | |
| 2008/0281663 A1 | 11/2008 | Hakim et al. | |
| 2009/0261779 A1 | 10/2009 | Zyren | |
| 2010/0134067 A1 | 6/2010 | Baxter et al. | |
| 2010/0217550 A1 | 8/2010 | Crabtree et al. | |
| 2010/0280675 A1 | 11/2010 | Tate, Jr. et al. | |
| 2011/0043220 A1 | 2/2011 | Leibowitz et al. | |
| 2011/0153474 A1 | 6/2011 | Tormey et al. | |
| 2011/0169461 A1 | 7/2011 | Deaver | |
| 2012/0029720 A1 | 2/2012 | Cherian et al. | |
| 2012/0044843 A1 | 2/2012 | Levy et al. | |
| 2012/0049793 A1 | 3/2012 | Ross et al. | |
| 2012/0074893 A1 | 3/2012 | Cole | |
| 2012/0098481 A1 | 4/2012 | Hunter et al. | |
| 2012/0180064 A1 | 7/2012 | Helander | |
| 2012/0200160 A1 | 8/2012 | Pratt et al. | |
| 2012/0200256 A1 | 8/2012 | Tse | |
| 2012/0203388 A1 | 8/2012 | DiLuciano et al. | |
| 2012/0316691 A1 | 12/2012 | Boardman et al. | |
| 2012/0326503 A1 | 12/2012 | Birkelund et al. | |
| 2013/0020993 A1 | 1/2013 | Taddeo et al. | |
| 2013/0057210 A1 | 3/2013 | Nergaard et al. | |
| 2013/0110296 A1 | 5/2013 | Khoo et al. | |
| 2013/0201316 A1* | 8/2013 | Binder | H04L 67/12 348/77 |
| 2013/0211988 A1 | 8/2013 | Dorn et al. | |
| 2013/0238148 A1 | 9/2013 | Legbedji et al. | |
| 2013/0268131 A1 | 10/2013 | Venayagamoorthy et al. | |
| 2013/0274941 A1 | 10/2013 | Khozikov et al. | |
| 2014/0025352 A1 | 1/2014 | Ghosh et al. | |
| 2014/0032007 A1* | 1/2014 | Claessens | G05F 1/66 700/296 |
| 2014/0060065 A1 | 3/2014 | Sweet et al. | |
| 2014/0070606 A1 | 3/2014 | Gibeau | |
| 2014/0089016 A1 | 3/2014 | Smullin et al. | |
| 2014/0097683 A1 | 4/2014 | Piyabongkarn et al. | |
| 2014/0125280 A1* | 5/2014 | Sun | B60L 53/63 320/109 |
| 2014/0167985 A1 | 6/2014 | Halnais et al. | |
| 2014/0232337 A1 | 8/2014 | Namou et al. | |
| 2014/0266042 A1 | 9/2014 | Storm | |
| 2014/0312839 A1 | 10/2014 | Uyeki | |
| 2014/0316604 A1 | 10/2014 | Ortjohann et al. | |
| 2014/0379157 A1 | 12/2014 | Das et al. | |
| 2015/0009047 A1 | 1/2015 | Ashkenazi et al. | |
| 2015/0025696 A1* | 1/2015 | Hug | G06Q 50/06 700/286 |
| 2015/0051744 A1 | 2/2015 | Mitra | |
| 2015/0120109 A1 | 4/2015 | Cun | |
| 2015/0137768 A1 | 5/2015 | Kishiyama et al. | |
| 2015/0165924 A1 | 6/2015 | Cho et al. | |
| 2015/0291044 A1* | 10/2015 | Adachi | H01M 10/486 320/134 |
| 2015/0340863 A1 | 11/2015 | Qiuyu et al. | |
| 2015/0346698 A1 | 12/2015 | Mailloux et al. | |
| 2015/0346753 A1 | 12/2015 | Gan et al. | |
| 2015/0367740 A1 | 12/2015 | Mcgrath et al. | |
| 2016/0009192 A1* | 1/2016 | Zhang | G07F 15/005 320/109 |
| 2016/0031338 A1 | 2/2016 | Penilla et al. | |
| 2016/0036225 A1 | 2/2016 | Zhao et al. | |
| 2016/0036226 A1 | 2/2016 | Gan et al. | |
| 2016/0047862 A1 | 2/2016 | Shimizu et al. | |
| 2016/0121748 A1 | 5/2016 | Wytock et al. | |
| 2016/0214489 A1 | 7/2016 | Giusti et al. | |
| 2016/0248254 A1 | 8/2016 | Huomo et al. | |
| 2016/0254669 A1 | 9/2016 | Zhang et al. | |
| 2016/0315807 A1 | 10/2016 | Peng et al. | |
| 2017/0110895 A1 | 4/2017 | Low et al. | |
| 2017/0246961 A1 | 8/2017 | Lee et al. | |
| 2020/0254896 A1 | 8/2020 | Lee et al. | |

FOREIGN PATENT DOCUMENTS

| | | |
|---|---|---|
| GB | 2505929 A | 3/2014 |
| JP | 2012034452 A | 2/2012 |
| JP | 2012083989 A | 4/2012 |
| KR | 1020120075010 B1 | 1/2013 |
| KR | 101566715 B1 | 11/2015 |
| WO | 2012015507 A1 | 2/2012 |
| WO | 2012058114 A2 | 5/2012 |
| WO | 2012167383 A1 | 12/2012 |
| WO | 2014075108 A2 | 5/2014 |
| WO | 2015179873 A1 | 11/2015 |
| WO | 2015184188 A1 | 12/2015 |
| WO | 2016007910 A1 | 1/2016 |
| WO | 2016022603 A1 | 2/2016 |
| WO | 2016172348 A1 | 10/2016 |
| WO | 2017066790 A1 | 4/2017 |
| WO | 2017147612 A1 | 8/2017 |
| WO | 2019109084 A1 | 6/2019 |

OTHER PUBLICATIONS

International Preliminary Report on Patentability for International Application PCT/US2015/033055, Report dated Nov. 29, 2016, dated Dec. 8, 2016, 8 Pgs.
International Preliminary Report on Patentability for International Application PCT/US2015/040031, Report dated Jan. 10, 2017, dated Jan. 10, 2017, 7 Pgs.
International Preliminary Report on Patentability for International Application PCT/US2015/043676, Report dated Feb. 7, 2017, dated Feb. 16, 2017, 6 Pgs.

(56) References Cited

OTHER PUBLICATIONS

International Preliminary Report on Patentability for International Application PCT/US2016/028659, Report dated Oct. 24, 2017, dated Nov. 2, 2017, 10 Pgs.
International Preliminary Report on Patentability for International Application PCT/US2016/057398, Report dated Apr. 17, 2018, dated Apr. 26, 2018, 6 Pgs.
International Preliminary Report on Patentability for International Application PCT/US2017/019787, Report dated Aug. 28, 2018, dated Sep. 7, 2018, 11 Pgs.
International Search Report and Written Opinion for International Application PCT/US2015/033055, Report Completed Sep. 9, 2015, dated Sep. 9, 2015, 11 Pgs.
International Search Report and Written Opinion for International Application PCT/US2015/040031, Report Completed Sep. 23, 2015, dated Sep. 24, 2015, 9 Pgs.
International Search Report and Written Opinion for International Application No. PCT/US2015/043676, Search completed Oct. 27, 2015, dated Oct. 27, 2015, 8 Pgs.
International Search Report and Written Opinion for International Application No. PCT/US2016/028659, Search completed Jul. 27, 2016, dated Jul. 28, 2016, 12 Pgs.
International Search Report and Written Opinion for International Application No. PCT/US2016/057398, Search completed Jan. 23, 2017, dated Jan. 23, 2017, 8 Pgs.
International Search Report and Written Opinion for International Application No. PCT/US2017/019787, Search completed May 24, 2017, dated May 24, 2017, 15 Pgs.
International Search Report and Written Opinion for International Application No. PCT/US2018/063637, Search completed Apr. 1, 2019, dated Apr. 1, 2019, 9 Pgs.
International Search Report and Written Opinion for International Application PCT/US2015/032482, Report Completed Sep. 9, 2015, dated Sep. 9, 2015, 15 pgs.
"Dynamic demand control of domestic appliances", U. K. Market Transformation Program, Market Transformation Programme, Tech. Rep., 2008, published Nov. 30, 2010, 22 pages.
"Electric Vehicle Public Charging—Time vs. Energy", U.S. Department of Energy, The EV Project, Mar. 2013, 4 pages.
"Gurobi Optimizer Reference Manual", Gurobi Optimization, Version 6.5, 2016, 592 pgs.
"High level analysis of the plugged-in places chargepoint usage data", UK Office of Low Emission Vehicles, Sep. 4, 2013, retrieved from https://www.gov.uk/government/publications/high-level-analysis-of-the-plugged-in-places-chargepoint-usage-data, 34 pages.
"IEEE distribution test feeders", modified Aug. 5, 2013, online at available at http://ewh.ieee.org/soc/pes/ dsacom/testfeeders/, retrieved on Jul. 10, 2017, 3 pgs.
"SAE Electric Vehicle and Plug in Hybrid Electric Vehicle Conductive Charge Coupler J1772_201710", SAE International, Oct. 1, 1996, Revised: Oct. 13, 2017, 59 pgs.
Alsac et al., "Further developments in LP-based optimal power flow", IEEE Transactions on Power Systems, vol. 5, Issue 3, Aug. 1990, pp. 697-711.
Andreasson et al., "Distributed Control of Networked Dynamical Systems: Static Feedback, Integral Action and Consensus", IEEE Transactions on Automatic Control, vol. 59, Issue 7, Jul. 2014, pp. 1750-1764.
Andreasson et al., "Distributed vs. centralized power systems frequency control", 2013 European Control Conference (ECC), Jul. 17-19, 2013, Zurich, Switzerland, pp. 3524-3529.
Araposthatis et al., "Analysis of power-flow equation", International Journal of Electrical Power & Energy Systems, vol. 3, Issue 3, Jul. 1981, pp. 115-126.
Bacciotti et al., "Nonpathological Lyapunov functions and discontinuous Caratheodory systems", Automatica, vol. 42, Issue 3, Mar. 31, 2006, pp. 453-458.
Bai et al., "Semidefinite programming for optimal power flow problems", Electrical Power and Energy Systems, 2008, vol. 30, pp. 383-392.
Baldick, R. et al., "A fast distributed imple-mentation of optimal power flow", IEEE Transactions on Power Systems, vol. 14, Issue 3, Aug. 1999, pp. 858-864.
Baptista, E. C. et al., "Logarithmic barrier-augmented Lagrangian function to the optimal power flow problem", International Journal on Electrical Power and Energy Systems, Jun. 23, 2005, vol. 27, No. 7, pp. 528-532.
Baran, M. E. et al., "Network reconfiguration in distribution systems for loss reduction and load balancing", IEEE Transactions on Power Delivery, Apr. 1989, vol. 4, No. 2, pp. 1401-1407.
Baran et al., "Optimal Capacitor Placement on radial distribution systems", IEEE Transactions on Power Deliver, vol. 4, Issue 1, Jan. 1989, pp. 725-734.
Baran et al., "Optimal Sizing of Capacitors Placed on a Radial Distribution System", IEEE Transactions on Power Delivery, vol. 4, Issue 1, Jan. 1989, pp. 735-743.
Berg et al., "Mechanized Calculation of Unbalanced Load Flow on Radial Distribution Circuits", IEEE Transactions on Power Apparatus and Systems, vol. PAS-86, Issue 4, Apr. 1967, pp. 415-421.
Bergen et al., "A Structure Preserving Model for Power System Stability Analysis", IEEE Transactions on Power Apparatus and Systems, vol. PAS-100, No. 1, 1981, pp. 25-35.
Bernardo, "Fast Charging Stations: Network Planning versus Free Entry", Apr. 22, 2013, 14 pages.
Cobb, "Dec. 2014 Dashboard", Hybridcars.com, Jan. 6, 2015, retrieved from http://www.hybridcars.com on May 21, 2020, 11 pgs.
Qu et al., "Application of robust control to sustained oscillations in power systems", IEEE Transactions on Circuits and Systems I: Fundamental Theory and Applications, vol. 39, Issue 6, Jun. 1992, pp. 470-476.
Schweppe et al., "Homeostatic Utility Control", IEEE Transactions on Power Apparatus and Systems, vol. PAS-99, Issue 3, May 1980, pp. 1151-1163.
Shafiee et al., "Distributed Secondary Control for Islanded Microgrids—A Novel Approach", IEEE Transactions on Power Electronics, vol. 29, Issue 2, Feb. 2014, pp. 1018-1031.
Short et al., "Stabilization of Grid Frequency Through Dynamic Demand Control", IEEE Transactions on Power Systems, vol. 22, Issue 3, Aug. 2007, pp. 1284-1293.
Siljak et al., "Robust decentralized turbine/governor control using linear matrix inequalities", IEEE Transactions on Power Systems, vol. 17, Issue 3, Aug. 2002, pp. 715-722.
Simpson-Porco et al., "Stability, power sharing, & distributed secondary control in droop-controlled microgrids", 2013 IEEE International Conference on Smart Grid Communications (SmartGridComm), Oct. 21-24, 2013, Vancouver, BC, Canada, pp. 672-677.
Simpson-Porco et al., "Synchronization and power sharing for droop-controlled inverters in islanded microgrids", Automatica, vol. 49, Issue 9, Sep. 2013, pp. 2603-2611.
Sousa, A. A. et al., "Robust optimal power flow solution using trust region and interior-point methods", IEEE Transactions on Power Systems, May 2011, vol. 26, No. 2, pp. 487-499.
Srinivasa et al., "HERB: a home exploring robotic butler", Autonomous Robots, 2010, vol. 28, pp. 5-20.
Stott, B. et al., "DC power flow revisited", IEEE Transactions on Power Systems, Aug. 2009, vol. 24, No. 3, pp. 1290-1300.
Stott, B. et al., "Fast decoupled load flow", IEEE Transactions on Power Apparatus and Systems, May 1974, vol. PAS-93, No. 3, pp. 859-869.
Sturm, "Using SeDuMi 1.02, a matlab toolbox for optimization over symmetric cones", Optimization Methods and Software, Mar. 1999, vol. 11, No. 1-4, pp. 625-653.
Sun, A. X. et al., "Fully decentralized AC optimal power flow algorithms", 2013 IEEE Power & Energy Society General Meeting, Jul. 21-25, 2013, Vancouver, BC, Canada, pp. 1-5.
Tao, "Optimal Power Flow Via Quadratic Modeling", Dec. 2011, 194 pages.
Taylor et al., "Convex models of distribution system reconfiguration", IEEE Transactions on Power Systems, vol. 6, No. 1, Jan. 2007, pp. 1407-1413.
Topcu et al., "Compositional stability analysis based on dual decomposition", Proceedings of the 48h IEEE Conference on Decision and

(56) References Cited

OTHER PUBLICATIONS

Control (CDC) held jointly with 2009 28th Chinese Control Conference, Dec. 15-18, 2009, Shanghai, China, pp. 1175-1180.
Torres, G. L. et al., "An interior-point method for nonlinear optimal power flow using voltage rectangular coordinates", IEEE Transactions on Power Systems, Nov. 1998, vol. 13, No. 4, pp. 1211-1218.
Trudnowski et al., "Power-System Frequency and Stability Control using Decentralized Intelligent Loads", 2005/2006 IEEE/PES Transmission and Distribution Conference and Exhibition, May 21-24, 2006, Dallas, TX, USA, pp. 1453-1459.
Tsolas et al., "A structure preserving energy function for power system transient stability analysis", IEEE Transactions on Circuits and Systems, vol. 32, Issue 10, Oct. 1985, pp. 1041-1049.
Turitsyn, K. et al., "Local control of reactive power by distributed photovoltaic generators", In IEEE SmartGridComm, Oct. 4-6, 2010, pp. 79-84.
Wang et al., "EV charging algorithm implementation with user price preference", 2015 IEEE Power & Energy Society Innovative Smart Grid Technologies Conference (ISGT), Feb. 18-20, 2015, Washington, DC, USA, pp. 1-5.
Wang et al., "Event-based electric vehicle scheduling considering random user behaviors", 2015 IEEE International Conference on Smart Grid Communications (SmartGridComm), Nov. 2-5, 2015, Miami, FL, USA, pp. 313-318.
Wang et al., "Predictive Scheduling Framework for Electric Vehicles With Uncertainties of User Behaviors", IEEE Internet of Things Journal, vol. 4, No. 1, Feb. 2017, pp. 52-63.
Wang et al., "Robust decentralized control for multimachine power systems", IEEE Transactions on Circuits and Systems I: Fundamental Theory and Applications, vol. 45, Issue 3, Mar. 1998, pp. 271-279.
Wang et al., "Smart Charging for Electric Vehicles: A Survey From the Algorithmic Perspective", IEEE Communications Surveys & Tutorials, vol. 18, No. 2, Jan. 14, 2016, pp. 1500-1517.
Xiao, Y. et al., "Power flow control approach to power systems with embedded FACTS devices", IEEE Transactions on Power Systems, Nov. 2002, vol. 17, No. 4, pp. 943-950.
You et al., "Reverse and forward engineering of frequency control in power networks", 53rd IEEE Conference on Decision and Control, Dec. 15-17, 2014, Los Angeles, CA, USA, pp. 191-198.
Yu et al., "An Intelligent Energy Management System for Large-Scale Charging of Electric Vehicles", CSEE Journal of Power and Energy Systems, vol. 2, No. 1, Mar. 24, 2016, pp. 47-53.
Yu et al., "Demand Response via Large Scale Charging of Electric Vehicles", Proceedings of the IEEE Power and Energy Society General Meeting (PESGM), Boston, Massachusetts, Jul. 17-21, 2016, 5 pgs.
Yu et al., "On market dynamics of electric vehicle diffusion", 2014 52nd Annual Allerton Conference on Communication, Control, and Computing (Allerton), Sep. 30-Oct. 3, 2014, Monticello, IL, USA, pp. 1051-1057.
Zhang et al., "A real-time control framework for smart power networks with star topology", 2013 American Control Conference, Jun. 17-19, 2013, Washington, DC, USA, pp. 5062-5067.
Zhang et al., "An Improved Least-Laxity-First Scheduling Algorithm of Variable Time Slice for Periodic Tasks", 6th IEEE International Conference on Cognitive Informatics, Lake Tahoe, CA, USA, Aug. 6-8, 2007, pp. 548-553, DOI: 10.1109/COGINF.2007.4341935.
Zhang et al., "Distributed dynamic feedback control for smart power networks with tree topology", 2014 American Control Conference, Jun. 4-6, 2014, Portland, OR, USA, pp. 1156-1161.
Zhang et al., "Geometry of feasible injection region of power networks", 2011 49th Annual Allerton Conference on Communication, Control, and Computing (Allerton), Sep. 28-30, 2011, pp. 1508-1515.
Zhao et al., "Design and Stability of Load-Side Primary Frequency Control in Power Systems", IEEE Transactions on Automatic Control, vol. 59, Issue 5, May 2014, pp. 1177-1189.

Zhao et al., "Power System Dynamics as Primal-Dual Algorithm for Optimal Load Control", arXiv:1305.0585, May 6, 2013, pp. 1-35.
Zhao et al., "Swing dynamics as primal-dual algorithm for optimal load control", 2012 IEEE Third International Conference on Smart Grid Communications (SmartGridComm), Nov. 5-8, 2012, Tainan, Taiwan, pp. 570-575.
Bitar et al., "Deadline differentiated pricing of deferrable electric power service", 2012 IEEE 51st IEEE Conference on Decision and Control (CDC), Dec. 10-13, 2012, Maui, HI, USA, pp. 4991-4997.
Bitar et al., "Deadline differentiated pricing of delay-tolerant demand", arXiv:1407.1601 [math.OC], Jan. 20, 2015, 28 pgs.
Bohn et al., "A real world technology testbed for electric vehicle smart charging systems and PEV-EVSE interoperability evaluation", Proceedings of the IEEE Energy Conversion Congress and Exposition (ECCE), Milwaukee, Wisconsin, Sep. 18-22, 2016, pp. 1-8.
Bohn et al., "Local automatic load control for electric vehicle smart charging systems extensible via OCPP using compact submeters", Proceedings of the IEEE Transportation Electrification Conference and Expo (ITEC), Chicago, Illinois, Jun. 22-24, 2017, 8 pgs.
Boyd et al., "Convex Optimization", Cambridge University Press, 2004, 703 pages.
Boyd et al., "Distributed Optimization and Statistical Learning via the Alternating Direction Method of Multipliers", Foundations and Trends in Machine Learning, vol. 3, No. 1, 2010, pp. 1-122.
Brooks et al., "Demand Dispatch", IEEE Power and Energy Magazine, vol. 8, Issue 3, May-Jun. 2010, pp. 20-29.
Burger et al., "An internal model approach to (optimal) frequency regulation in power grids", arXiv:1403.7019, Mar. 27, 2014, 14 pages.
Cain et al., "History of optimal power flow and formulations; Optimal Power Flow Paper 1", Federal Energy Regulatory Commission, Dec. 2012, 36 pgs.
Callaway et al., "Achieving Controllability of Electric Loads", Proceedings of the IEEE, vol. 99, Issue 1, Jan. 2011, pp. 184-199.
Capitanescu, F. et al., "Interior-point based algorithms for the solution of optimal power flow problems", Electric Power Systems Research, vol. 77, Issues 5-6, Apr. 2007, pp. 508-517, https://doi.org/10.1016/j.epsr.2006.05.003.
Carpentier, J., "Contribution to the economic dispatch problem", Bulletin de la Societe Francoise des Electriciens, vol. 3, No. 8, 1962, pp. 431-447.
Castillo et al., "Survey of approaches to solving the ACOPF; Optimal Power Flow Paper 4", Federal Energy Regulatory Commission, Mar. 2013, 49 pgs.
Chang et al., "Financial Viability of Non-Residential Electric Vehicle Charging Stations", Technical report, Luskin Center, Anderson School of Management, UCLA, Aug. 2012, 51 pages.
Chen et al., "Distribution system power flow analysis—a rigid approach", IEEE Transactions on Power Delivery, vol. 6, Issue 3, Jul. 1991, pp. 1146-1152.
Chen et al., "iEMS for large scale charging of electric vehicles: Architecture and optimal online scheduling", 2012 IEEE Third International Conference on Smart Grid Communications (SmartGridComm), Nov. 5-8, 2012, Tainan, Taiwan, pp. 629-634.
Chen et al., "Optimizing Operations for Large Scale Charging of Electric Vehicles", 2013 46th Hawaii International Conference on System Sciences, Jan. 7-10, 2013, Wailea, Maui, HI, USA, pp. 2319-2326.
Cheng et al., "A Three-Phase Power Flow Method for Real-Time Distribution System Analysis", IEEE Transactions on Power Systems, vol. 10, May 1995, 9 pages.
Cherukuri et al., "Asymptotic convergence of constrained primal-dual dynamics", Systems & Control Letters, vol. 87, Jan. 31, 2016, pp. 10-15.
Cheung et al., "Power System Toolbox Version 3.0", Rensselaer Polytechnic Institute and Cherry Tree Scientific Software, 2009, 123 pages.
Chow et al., "A toolbox for power system dynamics and control engineering education and research", IEEE Transactions on Power Systems, vol. 7, Issue 4, Nov. 1992, pp. 1559-1564.

(56) References Cited

OTHER PUBLICATIONS

Chung et al., "Master-Slave Control Scheme in Electric Vehicle Smart Charging Infrastructure", The Scientific World Journal, vol. 2014, No. 462312, May 26, 2014, 14 pages.

Chynoweth et al., "Smart electric vehicle charging infrastructure overview", Proceedings of the 5th IEEE PES Innovative Smart Grid Technologies (ISGT), Washington D.C., Feb. 19-22, 2014, 5 pgs.

Clement-Nyns et al., "The Impact of Charging Plug-In Hybrid Electric Vehicles on a Residential Distribution Grid", IEEE Transactions on Power Systems, vol. 25, Issue 1, Feb. 2010, pp. 371-380.

Contaxis, G. C. et al., "Decoupled Optimal Load Flow Using Linear or Quadratic Programming", IEEE Transactions on Power Systems, vol. 1, Issue 2, May 1986, pp. 1-7.

Cross et al., "My Electric Avenue: Integrating electric vehicles into the electrical networks", Proceedings of the Hybrid and Electric Vehicles Conference (HEVC 2016), London, United Kingdom, Nov. 2-3, 2016, 6 pgs.

Dall'Anese et al., "Distributed Optimal Power Flow for Smart Microgrids", IEEE Transactions on Smart Grid, vol. 4, Issue 3, Sep. 2013, pp. 1464-1475.

Devane, E. et al., "Stability and convergence of distributed algorithms for the OPF problem", 52nd IEEE Conference on Decision and Control, Dec. 10-13, 2013, Florence, Italy, pp. 2933-2938.

Dommel et al., "Optimal Power Flow Solutions", IEEE Transactions on Power Apparatus and Systems, vol. PAS-87, Issue 10, Oct. 1968, pp. 1866-1876.

Donnelly et al., "Frequency and stability control using decentralized intelligent loads: Benefits and pitfalls", IEEE PES General Meeting, Jul. 25-29, 2010, Providence, RI, USA, pp. 1-6.

Dorfler et al., "Breaking the Hierarchy: Distributed Control and Economic Optimality in Microgrids", IEEE Transactions on Control of Network Systems, vol. 3, Issue 3, Sep. 2016, pp. 241-253.

Dorfler et al., "Plug-and-Play Control and Optimization in Microgrids", 53rd IEEE Conference on Decision and Control, Dec. 15-17, 2014, Los Angeles, CA, USA, pp. 211-216.

Dupuis, "Dynamical systems and variational inequalities", Annals of Operations Research, vol. 44, No. 1, Feb. 28, 1993, pp. 7-42.

Farivar, M. et al., "Branch flow model: relaxations and convexification (parts I, II)", IEEE Trans. on Power Systems, Aug. 2013, vol. 28, No. 3, pp. 2554-2572.

Farivar, M. et al., "Inverter VAR control for distribution systems with renewables", In IEEE SmartGridComm, Oct. 17-20, 2011, pp. 457-462.

Farivar, M. et al., "Optimal Inverter VAR Control in Distribution Systems with High PV Penetration", In PES General Meeting, Jul. 22-26, 2012, pp. 1-7.

Farivar et al., "Branch Flow Model relaxations, convexification", Computing + Math Sciences Electrical Engineering, Caltech, May 2012, 69 pages.

Feijer et al., "Stability of primal-dual gradient dynamics and applications to network optimization", Automatica, vol. 46, Issue 12, Dec. 2010, pp. 1974-1981.

Frade et al., "Optimal Location of Charging Stations for Electric Vehicles in a Neighborhood in Lisbon, Portugal", Transportation Research Record: Journal of the Transportation Research Board, No. 2252, 2011, pp. 91-98.

Frank et al., "Optimal power flow: a bibliographic survey I, Formulations and deterministic methods", Energy Systems, 2012, vol. 3, No. 3, pp. 221-258.

Fukuda et al., "Exploiting Sparsity in Semidefinite Programming Via Matrix Completion I: General Framework", SIAM Journal on Optimization, 2001, vol. 11, No. 3, pp. 647-674.

Gan, L. et al., "Convex Relaxations and Linear Approximation for Optimal Power Flow in Multiphase Radial Networks", In Power systems computation conference, Aug. 18-22, 2014, 9 pgs.

Gan et al., "Exact Convex Relaxation of Optimal Power Flow in Radial Networks", IEEE Transactions on Automatic Control, vol. 60, Issue 1, Jan. 2015, pp. 72-87.

Gan et al., "Optimal decentralized protocol for electric vehicle charging", 2011 50th IEEE Conference on Decision and Control and European Control Conference, Dec. 12-15, 2011, Orlando, FL, USA, pp. 5798-5804.

Gan et al., "Optimal decentralized protocol for electric vehicle charging", IEEE Transactions on Power Systems, vol. 28, Issue 2, May 2013, pp. 940-951.

Gan et al., "Optimal power flow in distribution networks", Proc. 52nd IEEE Conference on Decision and Control, Dec. 2013, in arXiv:12084076, 7 pgs.

Ge et al., "The Planning of Electric Vehicle Charging Stations in the Urban Area", 2nd International Conference on Electronic & Mechanical Engineering and Information Technology (EMEIT—2012), Nov. 2012, pp. 1598-1604, doi:10.2991/emeit.2012.356.

Grant, M. et al., "Cvx: Matlab software for disciplined convex programming", online at http://cvxr.com/cvx/, 2008, 2 pgs.

Guo et al., "Nonlinear decentralized control of large-scale power systems", Automatica, vol. 36, Issue 9, Sep. 2000, pp. 1275-1289.

Guo et al., "Optimal Online Adaptive Electric Vehicle Charging", Proceedings of the IEEE Power & Energy Society General Meeting, Chicago, Illinois, Jul. 16-20, 2017, 5 pgs.

Hammerstrom et al., "Pacific Northwest GridWse Testbed Demonstration Projects Part II. Grid Friendly Appliance Project", Pacific Northwest National Laboratory, Technical Report No. PNNL-17079, Oct. 2007, 123 pages.

He et al., "Optimal deployment of public charging stations for plug-in hybrid electric vehicles", Transportation Research Part B: Methodological, vol. 47, Jan. 2013, pp. 87-101.

Hill et al., "Stability analysis of multimachine power networks with linear frequency dependent loads", IEEE Transactions on Circuits and Systems, vol. 29, Issue 12, Dec. 1982, pp. 840-848.

Huneault et al., "A survey of the opt-imal power flow literature", IEEE Transactions on Power Systems, May 1991, vol. 6, No. 2, pp. 762-770.

Hutson et al., "Intelligent Scheduling of Hybrid and Electric Vehicle Storage Capacity in a Parking Lot for Profit Maximization in Grid Power Transactions", 2008 IEEE Energy 2030 Conference, Atlanta, GA, USA, Nov. 17-18, 2008, pp. 1-8, DOI: 10.1109/ENERGY. 2008.4781051.

Ilic, Marija D., "From Hierarchical to Open Access Electric Power Systems", Proceedings of the IEEE, vol. 95, Issue 5, May 2007, pp. 1060-1084.

Jabr, R. A. et al., "A primal-dual interior-point method to solve the optimal power flow dispatching problem", Optimization and Engineering, Feb. 12, 2003, vol. 4, No. 4, pp. 309-336.

Jabr et al., "Radial Distribution Load Flow Using Conic Programming", IEEE Transactions on Power Systems, Aug. 2006, vol. 21, Issue 3, pp. 1458-1459.

Jakobsson, Martin, "On Some Extensions and Performance of Fast-Lipschitz Optimization", Master's Degree Project Stockholm, Sweden, Oct. 2011. Retrieved from the Internet: <http://www.diva-portal.org/smash/get/diva2:471914/FULLTEXT01.pdf>, see abstract, 84 pgs.

Jiang et al., "Toward a globally robust decentralized control for large-scale power systems", IEEE Transactions on Control Systems Technology, vol. 5, Issue 3, May 1997, pp. 309-319.

Kelly et al., "Rate Control for Communication Networks: Shadow Prices, Proportional Fairness and Stability", The Journal of the Operational Research Society, vol. 49, No. 3, Mar. 1998, p. 237-252.

Kersting, W H., "Radial distribution test feeders", IEEE Transactions on Power Systems, vol. 6, Issue 3, Aug. 1991, pp. 975-985.

Kersting et al., "Distribution System Modeling and Analysis", CRC Press, 2006, 329 pgs., (presented in 2 parts).

Kiani et al., "A hierarchical transactive control architecture for renewables integration in Smart Grids", 2012 IEEE 51st IEEE Conference on Decision and Control (CDC), Dec. 10-13, 2012, Maui, HI, USA, pp. 4985-4990.

Kim, B. H. et al., "Coarse-grained distributed optimal power flow", IEEE Transactions on Power Systems, vol. 12, Issue 2, May 1997, pp. 932-939.

(56) References Cited

OTHER PUBLICATIONS

Kraning et al., "Dynamic Network Energy Management via Proximal Message Passing", Foundations and Trends in Optimization, vol. 1, 2013, pp. 70-122.

Lam, A. et al., "Optimal Distributed Voltage Regulation in Power Distribution Networks", arXiv:1204.5226, Apr. 23, 2012, retrieved from https://arxiv.org/abs/1204.5226v1, 24 pages.

Lam et al., "Distributed algorithms for optimal power flow problem", 2012 IEEE 51st IEEE Conference on Decision and Control (CDC), Dec. 10-13, 2012, Maui, HI, USA, pp. 430-437.

Lavaei et al., "Zero duality gap in optimal power flow problem", IEEE Transactions on Power Systems, 2012, vol. 27, No. 1, pp. 92-107.

Lee et al., "Adaptive charging network for electric vehicles", Proceedings of the IEEE Global Conference on Signal and Information Processing (GlobalSIP), Washington D.C., Dec. 7-9, 2016, 5 pgs.

Li, N. et al., "Demand response in radial distribution networks: Distributed algorithm", 2012 Conference Record of the Forty Sixth Asilomar Conference on Signals, Systems and Computers (ASILOMAR), Nov. 4-7, 2012, Pacific Grove, CA, USA, pp. 1549-1553.

Li et al., "Connecting Automatic Generation Control and Economic Dispatch from an Optimization View", 2014 American Control Conference (ACC), Jun. 4-6, 2014, Portland, Oregon, USA, pp. 735-740.

Li et al., "Optimal demand response based on utility maximization in power networks", 2011 IEEE Power and Energy Society General Meeting, Jul. 24-29, 2011, Detroit, MI, USA, pp. 1-8.

Liu et al., "Decentralized Multi-Agent System-Based Cooperative Frequency Control for Autonomous Microgrids Wth Communication Constraints", IEEE Transactions on Sustainable Energy, vol. 5, Issue 2, Apr. 2014, pp. 446-456.

Low, "Convex Relaxation of Optimal Power Flow Part I: Formulations and Equivalence", IEEE Transactions on Control of Network Systems, Mar. 2014, vol. 1, No. 1, 44 pgs.

Low, "Convex Relaxation of Optimal Power Flow—Part II: Exactness", IEEE Transactions on Control of Network Systems, Jun. 2014, vol. 1, No. 2, pp. 177-189.

Low et al., "Optimization Flow Control—I: Basic Algorithm and Convergence", IEEE/ACM Transactions on Networking, vol. 7, Issue 6, Dec. 1999, pp. 861-874.

Lu et al., "Design Considerations for Frequency Responsive Grid Friendly Appliances", 2005/2006 IEEE/PES Transmission and Distribution Conference and Exhibition, May 21-24, 2006, Dallas, TX, USA, pp. 647-652.

Lu et al., "Nonlinear stabilizing control of multimachine systems", IEEE Transactions on Power Systems, vol. 4, Issue 1, Feb. 1989, pp. 236-241.

Lygeros et al., "Dynamical properties of hybrid automata", IEEE Transactions on Automatic Control, vol. 48, Issue 1, Jan. 31, 2003, pp. 2-17.

Ma et al., "Decentralized charging control for large populations of plug-in electric vehicles", 49th IEEE Conference on Decision and Control (CDC), Dec. 15-17, 2010, Atlanta, GA, USA, pp. 206-212.

Ma et al., "Decentralized Charging Control of Large Populations of Plug-in Electric Vehicles", IEEE Transactions on Control Systems Technology, vol. 21, Issue 1, Jan. 2013, pp. 67-78.

Mallada et al., "Distributed Frequency-Preserving Optimal Load Control", Proceedings of the 19th World Congress, IFAC Proceedings Volumes, vol. 47, Issue 3, Aug. 24-29, 2014, Cape Town, South Africa, pp. 5411-5418.

Mallada et al., "Fair load-side control for frequency regulation in smart grids", Proc. of Allerton Conference on Communication, Control, and Computing, Monticello, IL, USA, 2014, 10 pages.

Mallada et al., "Optimal load-side control for frequency regulation in smart grids", 2014 52nd Annual Allerton Conference on Communication, Control, and Computing (Allerton), Sep. 30, 2014-Oct. 3, 2014, pp. 731-738.

Min, W. et al., "A trust region interior point algorithm for optimal power flow problems", Electrical Power and Energy Systems, May 2005, vol. 27, No. 4, pp. 293-300.

Molina-Garcia et al., "Decentralized Demand-Side Contribution to Primary Frequency Control", IEEE Transactions on Power Systems, vol. 26, Issue 1, Feb. 2011, pp. 411-419.

Momoh et al., "A review of selected optimal power flow literature to 1993. Part I: Nonlinear and quadratic programming approaches", IEEE Transactions on Power Systems, Feb. 1999, vol. 14, No. 1, pp. 96-104.

Moon et al., "The development of equivalent system technique for deriving an energy function reflecting transfer conductances", IEEE Transactions on Power Systems, vol. 14, Issue 4, Nov. 1999, pp. 1335-1341.

Mukherjee et al., "A Review of Charge Scheduling of Electric Vehicles in Smart Grid", IEEE Systems Journal, vol. 9, No. 4, Dec. 2015, pp. 1541-1553.

Nakahira et al., "Smoothed Least-laxity—first Algorithm for EV Charging", Proceedings of the 8th International Conference on Future Energy Systems, Shatin, Hong Kong, China, May 16-19, 2017, pp. 242-251.

O'Neill et al., "The IV Formulation and Linear Approximations of the AC Optimal Power Flow Problem", Optimal Power Flow Paper, Dec. 2012, 18 pages.

Ortega et al., "Transient stabilization of multimachine power systems with nontrivial transfer conductances", IEEE Transactions on Automatic Control, vol. 50, Issue 1, Jan. 2005, pp. 60-75.

Overbye et al., "A comparison of the AC and DC power flow models for LMP calculations", 37th Annual Hawaii International Conference on System Sciences, 2004. Proceedings of the, Jan. 5-8, 2004, Big Island, HI, USA, 9 pages.

Palomar et al., "A tutorial on decomposition methods for network utility maximization", IEEE Journal on Selected Areas in Communications, vol. 24, Issue 8, Aug. 2006, pp. 1439-1451.

Pandya et al., "A survey of optimal power flow methods", Journal of Theoretical and Applied Information Technology, 2008, vol. 4, No. 5, pp. 450-458.

Peng et al., "Distributed algorithm for optimal power flow on a radial network", 53rd IEEE Conference on Decision and Control, Dec. 15-17, 2014, Los Angeles, CA, USA, pp. 167-172.

Peng et al., "Feeder Reconfiguration in Distribution Networks Based on Convex Relaxation of OPF", IEEE Transactions on Power Systems, vol. 30, Issue 4, Jul. 2015, pp. 1793-1804.

Petroff, "These countries want to ditch gas and diesel cars", CNN Business, Jul. 26, 2017, Retrieved from: https://money.cnn.com/2017/07/26/autos/countries-that-are-banning-gas-cars-for-electric/index.html, 3 pgs.

Phan et al., "Distributed Methods for Solving the Security-Constrained Optimal Power Flow Problem", IEEE PES Innovative Smart Grid Technologies (ISGT), 2012, Jan. 16-20, 2012, 7 Pgs.

Purchala et al., "Usefulness of DC power flow for active power flow analysis", IEEE Power Engineering Society General Meeting, 2005, Jun. 16, 2005, San Francisco, CA, USA, pp. 454-459.

International Preliminary Report on Patentability for International Application No. PCT/US2018/063637, Report dated Jun. 2, 2020, dated Jun. 11, 2020, 7 Pgs.

International Search Report and Written Opinion for International Application No. PCT/US2020/017531, Search completed Mar. 30, 2020, dated May 4, 2020, 15 pgs.

Jones-Albertus, "Confronting the Duck Curve: How to Address Over-Generation of Solar Energy", Department of Energy, Office of Energy Efficiency & Renewable Energy Online: Oct. 12, 2017: Retrieved Mar. 28, 2020, https://www.energy.gov/eere/articles/confronting-duck-curve-how-address-over-generation-solar-energy, 7 pgs.

* cited by examiner (b) 240V split phase Delta (a) 120Y/208V 3-phase Wye

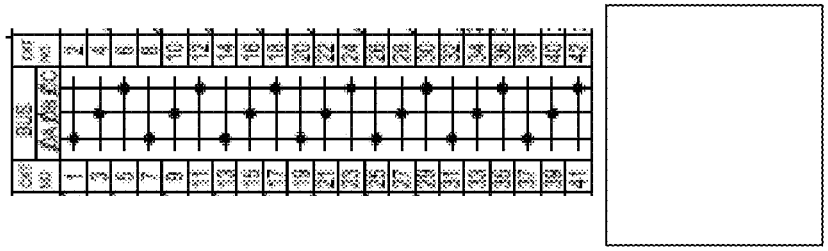
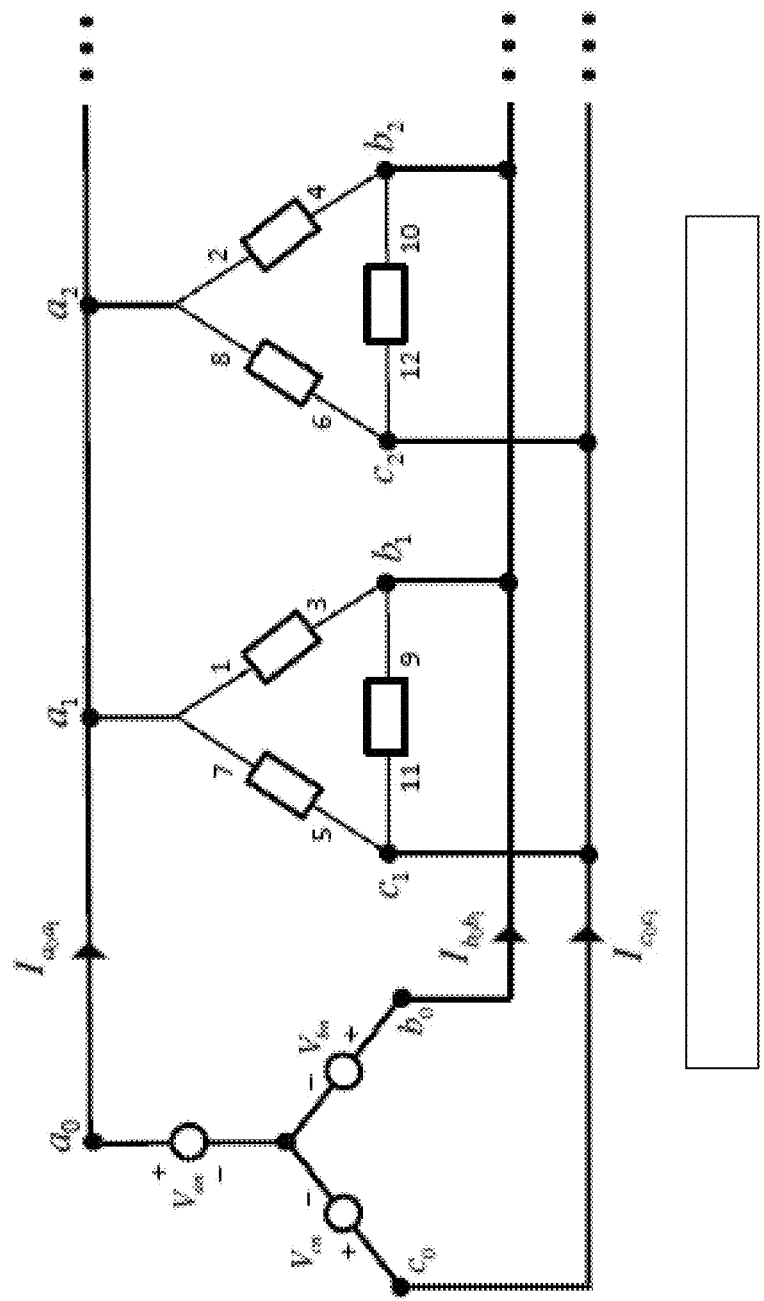
FIG. 10b
FIG. 10a

|  | Group 1 | Group 2 | Group 3 |
|---|---|---|---|
| guaranteed energy | $e_g > 0$ | $e_g \geq 0$ | none |
| admission control | yes | no | no |
| subgroups | no | no | yes (future version) |
| group priority | highest | lower | lowest |

Groups and properties.

FIG. 12

Input: Driver input $(e_0, d_0)$ of new EV 0.
Output: EV 0's group assignment and its laxity $a_0$.
Algorithm:

1. Determine its peak rate $\bar{r}_0$.

2. Compute its laxity:
$$a_0 := 1 - \frac{e_0}{(d_0 - 1)\bar{r}_0}$$

3. Assign EV 0 to Group 3 or Group 1/2 (for some $\epsilon \geq 0$, e.g. $\epsilon = 0.1$):

(a) If $a_0 < \epsilon$, it is infeasible to deliver $e_0$ before $d_0$ even if there is no resource capacity constraint. Either ask the driver to re-enter its input $(e_0, d_0)$ or assign EV 0 to Group 3 for further processing.

(b) If $a_0 = 1$, then $e_0$ is zero. Either ask driver to re-enter its input $(e_0, d_0)$ or assign EV 0 to Group 3 for further processing.

(c) If $\epsilon \leq a_0 < 1$, EV 0 can be assigned to either Group 1 or Group 2 depending on requested service level.

i. For Group 1 request: perform admission control (see Algorithm 6 in Section 5.2).
       ii. For Group 2 request: determine minimum energy $\underline{e}_0 \geq 0$ and assign to Group 2.

Output laxity $a_0$.
    Note: if $a_0 = 0$, there is zero laxity and EV 0 must be charged at its peak rate $\bar{r}_0$ in order to receive $e_0$ before $d_0$.

Algorithm 1: Check the laxity of a new EV request $(e_0, d_0)$.

FIG. 13

Input: EV data $(e_i, d_i, \bar{r}_i, \underline{e}_i, \underline{r}_i, i \in [1,n])$;
capacity constraints $(P_l(t), \forall l, t \in [1,T])$.
Output: charging profiles $r^{} := (r_i^{}(t), i \in [1,n], t \in [1,T])$.

Algorithm:

1. Solve QP:

$$\min_r \quad c_q(r) \quad (14A\text{-}1)$$

$$\text{s. t.} \quad \underline{r}_i \leq r_i(1) \leq \bar{r}_i(1), \quad i \in [1,n] \quad (14A\text{-}2)$$

$$0 \leq r_i(t) \leq \bar{r}_i(t), \quad i \in [1,n], t \in [2,T] \quad (14A\text{-}3)$$

$$\underline{e}_i \leq \sum_{t=1}^{T} r_i(t) \leq e_i, \quad i \in [1,n] \quad (14A\text{-}4)$$

$$\sum_i A_{li} r_i(t) \leq P_l(t), \quad t \in [1,T], \forall l \quad (14A\text{-}5)$$

If infeasible, return "QP for Group 2 infeasible" and stop. Otherwise, let $r^*$ denote an optimal solution of (14A)

2. Post-process the QP solution $r^*$:

(a) For each EV $i$, let $\tau_i$ be the time index of the last nonzero element in $r_i^*(t)$.

i. Set $\bar{r}_i(t) := 0$ for $t > \tau_i$.

ii. Set $r_i^{\min}(t) := \underline{r}_i$ for $t \in [1, \tau_i]$ and $r_i^{\min}(t) := 0$ for $t \in [\tau_i, T]$.

(b) Solve:

$$\min_r \quad \sum_{t=1}^{T} \left( \sum_i (r_i(t) - r_i^*(t))^2 \right) \quad (14B\text{-}1)$$

$$\text{s. t.} \quad r_i^{\min}(t) \leq r_i(t) \leq \bar{r}_i(t), \quad i \in [1,n], t \in [1,T] \quad (14B\text{-}2)$$

$$\sum_i A_{li} r_i(t) \leq P_l(t), \quad t \in [1,T], \forall l \quad (14B\text{-}3)$$

(c) If infeasible, return "Post processing for Group 2 infeasible" and stop. Otherwise, let $r^{**}$ denote an optimal solution of (14B)

3. Output $r^{**}$.

Algorithm 2: QP with minimum rates $\underline{r}_i$ for Group 2.

FIG. 14

Input: EV data $(e_i, d_i, \bar{r}_i, \underline{e}_i, \underline{r}_i, i \in [1,n])$;
capacity constraints $(P_l(t), \forall l, t \in [1,T])$.
Output: charging rates $r(t)$ for time $t$.

Algorithm:

1. Compute
$$i_0 := \left\lfloor \frac{\min_l P_l(t)}{\max_i \underline{r}_i} \right\rfloor$$

2. Order EVs according to their laxities $a_i := 1 - e_i/((d_i-1)\bar{r}_i)$ and suppose
$$a_1 \leq a_2 \leq \cdots \leq a_{i_0} \leq \cdots \leq a_n$$

3. Set
$$r_i(t) = \begin{cases} \underline{r}_i & i = 1, \ldots, i_0 \\ 0 & i = i_0+1, \ldots, n \end{cases}$$

4. Output $r(t)$.

Algorithm 3: Allocate minimum rates $\underline{r}_i$ for the $t$-subproblem.

*FIG. 15*

Input: EV data $(e_i, d_i, \bar{r}_i, \underline{e}_i, \underline{r}_i, i \in [1,n])$;
capacity constraints $(P_l(t), \forall l, t \in [1,T])$.
Output: charging profiles $r^{} := (r_i^{}(t), i \in [1,n], t \in [1,T])$.

Algorithm:

1. Solve QP (14A) in Algorithm 2.

2. If QP returns an optimal solution $r^*$, then goto Step 4.

3. If QP is infeasible, then set $\underline{r}_i := 0$ and $\underline{e}_i := 0$ for all $i$. Solve QP (14A) again and denote the solution by $r^*$.

4. Post-process the QP solution $r^*$.

(a) Solve (14B) in Algorithm 2 by solving subproblems for each $t$ separately.

(b) If $t$-subproblem returns an optimal solution $r^{**}(t)$, then solve the next $t$-subproblem.

(c) If $t$-subproblem is infeasible, then compute the rates $r^{**}(t)$ using Algorithm 3 and solve the next $t$-subproblem.

5. Output $r^{**}$.

Algorithm 4: Handle infeasibility.

FIG. 16

Input: Data $(e_i, d_i, \bar{r}_i, \underline{r}_i)$ for all Group 1 EVs $i$ (only); original resource capacities $(P_l^0(t), \forall l, t \in [1,T])$.
Output: charging profiles $r^{} := (r_i^{}(t), i \in [1,n], t \in [1,T])$.

Algorithm:

1. Solve QP:

$$\min_r \quad c_q(r) \tag{17A-1}$$

$$\text{s. t.} \quad \underline{r}_i \leq r_i(1) \leq \bar{r}_i(1), \quad i \in [1,n] \tag{17A-2}$$

$$0 \leq r_i(t) \leq \bar{r}_i(t), \quad i \in [1,n], t \in [2,T] \tag{17A-3}$$

$$\sum_{t=1}^{T} r_i(t) = e_i, \quad i \in [1,n] \tag{17A-4}$$

$$\sum_i A_{li} r_i(t) \leq P_l^0(t), \quad t \in [1,T], \forall l \tag{17A-5}$$

Let $r^*$ denote an optimal solution o (17A)

2. Post-process the QP solution $r^*$:

(a) For each EV $i$, let $\tau_i$ be the time index of the last nonzero element in $r_i^*(t)$.

i. Set $\bar{r}_i(t) := 0$ for $t > \tau_i$.

ii. Set $r_i^{min}(t) := \underline{r}_i$ for $t \in [1, \tau_i - 1]$ and $r_i^{min}(t) := 0$ for $t \in [\tau_i, T]$.

(b) Solve:

$$\min_r \sum_{t=1}^{T} \left( \sum_i (r_i(t) - r_i^*(t))^2 \right) \tag{17B-1}$$

$$\text{s. t.} \quad r_i^{min}(t) \leq r_i(t) \leq \bar{r}_i(t), i \in [1,n], t \in [1,T] \tag{17B-1}$$

$$\sum_i A_{li} r_i(t) \leq P_l(t), \quad t \in [1,T], \forall l \tag{17B-1}$$

(c) Let $r^{**}$ denote an optimal solution (17B)

3. Output $r^{**}$.

Algorithm 5: QP with minimum rates $\underline{r}_i$ for Group 1.

FIG. 17

Input: Data $(e_0, d_0, \bar{r}_0, \underline{r}_0)$ of the new Group 1 EV 0 request.
Data $(e_i, d_i, \bar{r}_i, \underline{r}_i)$ for all existing Group 1 EVs;
Data $(e_i, d_i, \bar{r}_i, \underline{e}_i, \underline{r}_i)$ for all existing Group 2 EVs;
original resource capacities $(P_l^0(t), \forall l, t \in [1, T])$.
Output: Admission decision for EV 0.

Algorithm:

1. Check if Group 1 guarantee can still be maintained with the addition of $(e_0, d_0, \bar{r}_0, \underline{r}_0)$.

(a) Add $(e_0, d_0, \bar{r}_0, \underline{r}_0)$ to Group 1.

(b) Execute Algorithm 5 for Group 1.

(c) If infeasible, then reject the new request $(e_0, d_0, \bar{r}_0, \underline{r}_0)$; stop.

(d) If feasible, denote the charging profile by $r_{G1}^{} := (r_i^{}(t), i \in$ Group $1, t \in [1, T])$.

2. Check if $\underline{e}_i$ for all existing Group 2 EVs can still be guaranteed with the addition of $(e_0, d_0, \bar{r}_0, \underline{r}_0)$.

(a) Compute left-over capacities for Group 2:

$$P_l(t) := P_l^0(t) - \sum_{i \in \text{Group 1}} r_i^{**}(t), \quad t \in [1, T]$$

where $P_l^0(t)$ are the original resource capacities.

(b) Execute Algorithm 2 for Group 2 EVs only using the left-over capacities $(P_l(t), \forall l, t \in [1, T])$.

(c) If infeasible, then reject the new request $(e_0, d_0, \bar{r}_0, \underline{r}_0)$; stop.

(d) If feasible, assign the new request $(e_0, d_0, \bar{r}_0, \underline{r}_0)$ to Group 1.

Algorithm 6: Admission control for Group 1.

FIG. 18

Input:

1. QP with original durations $d$.

2. Slack $\sigma > 0$.            % slackness in scaling factor $\gamma$.

Output: New durations $d^{new}$ and feasible charging rates $r$.

Algorithm:

1. Initialization:

(a) $\underline{\gamma} := 1$.            % This case assumed infeasible.

(b) $\overline{\gamma} := \frac{T}{\min_i d_i}$.            % This case assumed feasible.

(c) Solve $QP(\overline{\gamma}d)$ in (28)

(d) If $QP(\overline{\gamma}d)$ is infeasible, then Goto ErrorProcessing; else denote the solution by $r$.

2. Iteration:

(a) If $\overline{\gamma} - \underline{\gamma} \leq \sigma$, then Return $d^{new} := \overline{\gamma}d$ and the charging rates $r$.

(b) Else $\gamma := (\underline{\gamma} + \overline{\gamma})/2$.

(c) Solve $QP(\gamma d)$ in (28)

(d) If $QP(\gamma d)$ is infeasible, then $\underline{\gamma} := \gamma$; else $\overline{\gamma} := \gamma$ and denote the solution by $r$.

(e) Goto Step (2a).

Algorithm 6: Maintain feasibility by scaling up durations.

*FIG. 19*

Input:

1. QP with original durations $d$.

2. Threshold $\epsilon > 0$.          % for discretizing $x$.

Output:    New durations $d^{new}$ and feasible charging rates $r$.

Algorithm:

1. Solve (35) to produce an optimal (continuous variable) $x$.

2. If $x_i(t) \geq \epsilon$, then $x_i(t) := 1$; else $x_i(t) := 0$.

3. Compute the new durations $d^{new}$ according to (33).

4. Solve $QP(d^{new})$ in (28) to determine a feasible charging profile $r$ for all Group 1 EVs.

5. Return $d^{new}$ and $r$.

Algorithm 7: Maintain feasibility through additional dwell times $x$.

FIG. 20

Structure of basic online LP for EV charging.

Structure of online LP for infrastructure protection and load shifting.

Structure of online quadratic program for load tracking.

FIG. 24 Structure of online LP with demand charge mitigation.

FIG. 25 Real-time pricing with price cap.

FIG. 26  Building blocks of optimization-based product features.

OPTIMIZATION FRAMEWORK AND METHODS FOR ADAPTIVE EV CHARGING

CROSS-REFERENCE TO RELATED APPLICATIONS

The present invention claims priority to U.S. Provisional Patent Application Ser. No. 62/593,755 entitled 'Optimization Framework and Methods for Adaptive EV Charging" filed Dec. 1, 2017 and to U.S. Provisional Patent Application Ser. No. 62/678,877 entitled 'Optimization Framework and Methods for Adaptive EV Charging" filed May 31, 2018. The disclosures of U.S. Provisional Patent Application Ser. No. 62/593,755 and U.S. Provisional Patent Application Ser. No. 62/678,877 are herein incorporated by reference in their entirety.

STATEMENT OF FEDERALLY SPONSORED RESEARCH

This invention was made with government support under Grant No. HP1602119 and CCF1637598 awarded by the National Science Foundation. The government has certain rights in the invention.

FIELD OF THE INVENTION

The present invention generally relates to electric vehicles and more specifically relates to adaptive charging station optimization for electric vehicles.

BACKGROUND

An incredible amount of infrastructure is relied upon to transport electricity from power stations, where the majority of electricity is currently generated, to where it is consumed by individuals. Power stations can generate electricity in a number of ways including using fossil fuels or using renewable energy sources such as solar, wind, and hydroelectric sources. Substations typically do not generate electricity, but can change the voltage level of the electricity as well as provide protection to other grid infrastructure during faults and outages. From here, the electricity travels over distribution lines to bring electricity to locations where it is consumed such as homes, businesses, and schools. The term "smart grid" describes a new approach to power distribution which leverages advanced technology to track and manage the distribution of electricity. A smart grid applies upgrades to existing power grid infrastructure including the addition of more renewable energy sources, advanced smart meters that digitally record power usage in real time, and bidirectional energy flow that enables the generation and storage of energy in additional places along the electric grid.

Electric vehicles (EVs), which include plug-in hybrid electric vehicles (PHEVs), can use an electric motor for propulsion. EV adoption has been spurred by federal, state, and local government policies providing various incentives (e.g. rebates, fast lanes, parking, etc.). Continued EV adoption is likely to have a significant impact on the future smart grid due to the additional stress load that EVs add to the grid (an EV's power demand can be many times that of an average residential house).

SUMMARY OF THE INVENTION

Adaptive charging networks in accordance with embodiments of the invention enable the optimization of electric design of charging networks for electric vehicles. One embodiment includes an electric vehicle charging network, including: one or more centralized computing systems, a communications network, a plurality of electric vehicle node controllers for charging a plurality of electric vehicles (EVs), where each electric vehicle node controller in the plurality of node controller comprises: a network interface; a processor; a memory containing: an adaptive charging application; a plurality of electric vehicle node parameters describing charging parameters of an electric vehicle in the electric vehicle charging network; wherein the process is configured by the adaptive charging application to: send electric vehicle node parameters to the one or more centralized computing systems; and charge an electric vehicle using a charging rate received from the one or more centralized computing systems; wherein the one or more centralized computing systems is configured to: receive the electric vehicle node parameters from the plurality of electric vehicle node controllers; calculate a plurality of charging rates for the plurality of electric vehicle node controllers using quadratic programming (QP), wherein the quadratic programming computes the plurality of charging rates based on the electric vehicle node parameters, a plurality of adaptive charging parameters and a quadratic cost function; and distributing the charging rates to the plurality of electric vehicle node controllers.

In a further embodiment, the charging rates meet energy demands of the plurality of electric vehicles by a plurality of departure times.

In another embodiment, the charging rates for the plurality of electric vehicle nodes are a time series of timing rates provided to each electric vehicle node controller.

In a still further embodiment, the electric vehicle node parameters include an electric vehicle departure time, a remaining energy demand, and a maximum charging rate.

In still another embodiment, the time series of timing rates can be evaluated by the one or more centralized computing systems using the following expression:

$$\min_r c(r)$$

subject to $0 \leq r_i(t) \leq \bar{r}_i(t)$, $i \in [1,n]$, $t \in [1,T]$ $e_i \leq \sum_{t=1}^{T} r_i(t) \leq \bar{e}_i$, $i \in [1,n]$ $\sum_i A_{li} r_i(t) \leq P_l(t)$, $t \in [1,T]$, for all resources l where $c(r)$ is a convex quadratic cost function, $e_i$ is an energy demand, $e_i$ is a minimum energy that will be delivered, T is an optimization horizon, $r_i(t)$ is the calculated charging rate, $\bar{r}_i$ is a maximum rate. $P_l(t)$ denotes the capacities of resources l at time t, and $A_{li}$ are the coefficients that describe how EV i's are constrained by resources l, wherein for each QP instance, can be t=1, 2, . . . , T.

In a yet further embodiment, the charging rates for a first set of electric vehicle node controllers are a maximum charging rate; and the charging rates for a second set of electric vehicle node controllers are a minimum charging rate.

In yet another embodiment, calculating the plurality of charging rates is a least laxity first process.

In a further embodiment again, a first electric vehicle node controller is assigned a first group that is guaranteed that, for each EV in the first group, a requested energy will be delivered, and a second electric vehicle node controller is assigned to a second group that is guaranteed, for each EV in the second group, a minimum energy.

In another embodiment again, charging rates for the first group and second group are determined sequentially by:
solving for charging rates using QP for EVs in the first group only;
computing left-over capacities for Group 2; and
solving for charging rates using QP for EVs in the second group only using the left-over capacities.

In a further additional embodiment, the one or more centralized computing systems is configure to reduce rate fluctuations across a time period by using a penalty term within the quadratic cost function.

In another additional embodiment, the one or more centralized computing systems is configured to: set a charging rate to be greater than zero for an EV with a remaining energy demand.

In a still yet further embodiment, the one or more centralized computing systems is configured to: receive a request for admission of an electric vehicle from an electric vehicle node controller; determine whether to admit the electric vehicle based on existing electric vehicle node parameters from the plurality of electric vehicle node controllers and existing capacity constraints.

In still yet another embodiment, the one or more centralized computing systems is configure to: prioritize the plurality of electric vehicle node controllers when there is insufficient capacity to meet energy demands of the plurality of electric vehicles.

In a still further embodiment again, the one or more centralized computing systems is configure to schedule charging by the plurality of electric vehicle node controllers based on solar generation.

In still another embodiment again, the one or more centralized computing systems is configure to select charging rates that minimize the distance between a forecasted solar generation and a total net load.

In still another embodiment again, the one or more centralized computing systems is configured to cap a total site load over a time period.

In still another embodiment yet again, the plurality of electric vehicle node controllers are connected in delta configurations providing an unbalanced three-phase infrastructure.

In still another embodiment yet again still, the electric vehicle charging network further includes providing phase constrains and line constraints on currents along legs of the delta configurations.

In yet still another embodiment again, the one or more centralized computing systems is configure to: determining that a minimum energy demand cannot be met for an EV and post-processing, using the QP, the plurality of charging rates.

In another embodiment again, the plurality of adaptive charging parameters are quadratic capacity constraints.

BRIEF DESCRIPTION OF THE DRAWINGS

FIG. 10a shows a Wye-configured voltage source connected to a set of loads in Delta configuration in accordance with an embodiment of the invention.

FIG. 10b illustrates an electrical panel arrangement to connect loads to voltage sources in accordance with an embodiment of the invention.

FIG. 12 illustrates parameters for groups in accordance with an embodiment of the invention.

FIG. 13 illustrates an algorithm for checking the laxity of a new EV request in accordance with an embodiment of the invention.

FIG. 14 illustrates an algorithm for a QP with minimum rates for Group 2 in accordance with an embodiment of the invention.

FIG. 15 illustrates an algorithm for allocating minimum rates for the t-subproblem in accordance with an embodiment of the invention.

FIG. 16 illustrates an algorithm for handling infeasibility in accordance with an embodiment of the invention.

FIG. 17 illustrates an algorithm for QP with minimum rates for Group 1 in accordance with an embodiment of the invention.

FIG. 18 illustrates an algorithm for admission control for group I in accordance with an embodiment of the invention.

FIG. 19 illustrates an algorithm for maintaining feasibility by scaling up durations in accordance with an embodiment of the invention.

FIG. 20 illustrates an algorithm for maintaining feasibility through additional dwell times in accordance with an embodiment of the invention.

DETAILED DESCRIPTION

Figure 1:
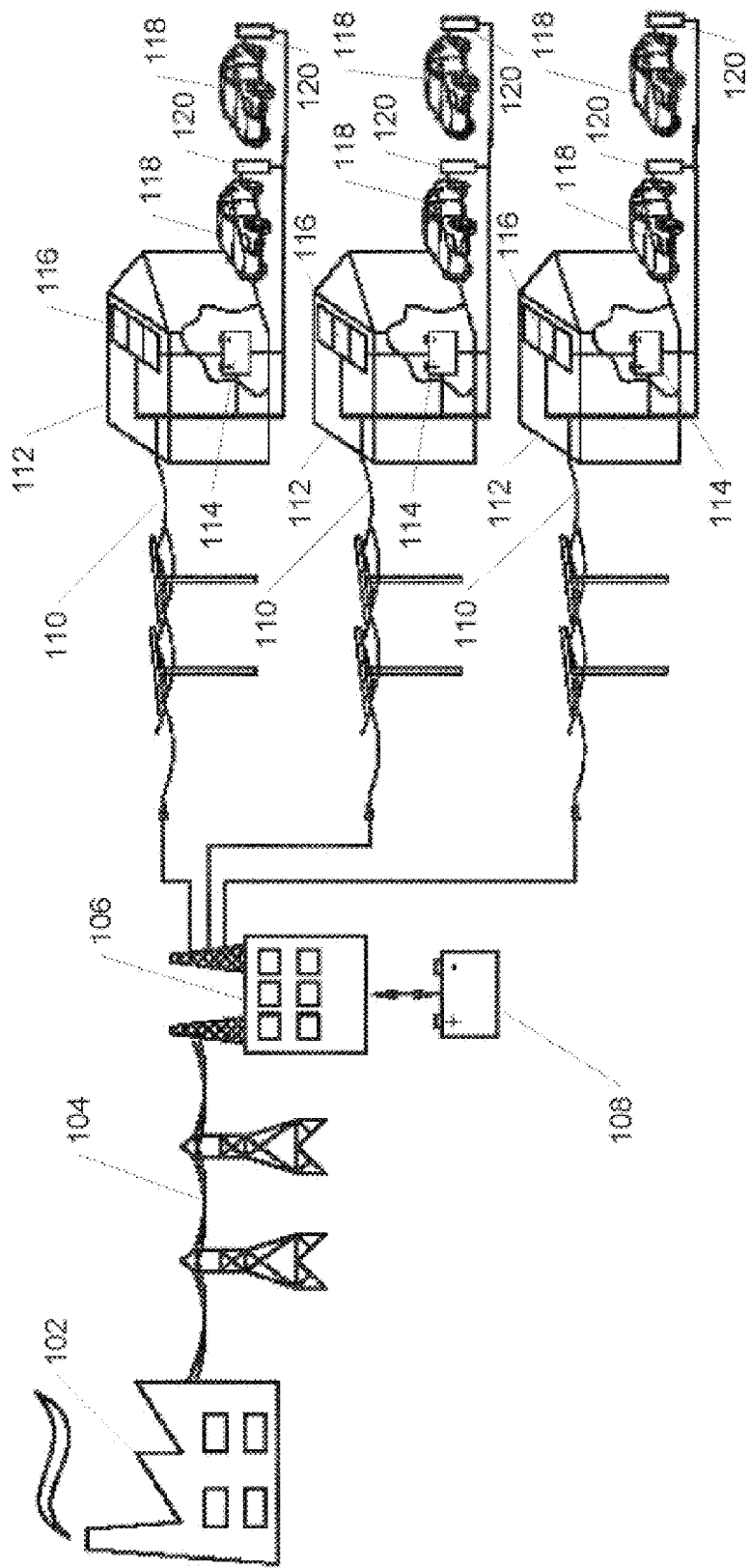
FIG. 1 is a diagram conceptually illustrating a power distribution network in accordance with an embodiment of the invention.

Turning now to the drawings, electric vehicle supply equipment and methods for supplying power to a set of electric vehicles using electric vehicle supply equipment in accordance with various embodiments of the invention are illustrated. An adaptive charging station (ACS) is a smart version of electrical vehicle supply equipment (EVSE) having dynamic adjustment features. EVSE generally can be any device which brings power to and/or fills an EVs battery, and are an intermediate between an EV and a power source. EVSE can utilize a variety of parameters including (but not limited to) voltages, amperages, current type, charging speeds, and/or plug types. Level 1 charging (L1) is generally the slowest form or charging and can connect an EV to a standard 110V or 120V outlet. Level 2 charging (L2) can provide additional voltage (generally up to 240V) and as such can provide a faster charge compared to L1. Level 3 charging (L3) generally uses up to 480V and can provide even faster charging than L1 or L2. In several embodiments of the invention, the SAE J1772 standard can be used to define AC charging levels. It should be readily apparent that other standardized systems for EVSEs can be utilized as appropriate including (but not limited to) CHAdeMO, SAE Combined Charging Solutions, and/or Tesla charging format and that EVSEs can include both alternating current (AC) and/or direct current (DC). Furthermore, the development of additional charging standards involving a variety of AC and/or DC charging profiles is contemplated.

ACS can be grouped together into an adaptive charging network (ACN). ACNs can be specifically designed for large scale deployments such as (but not limited to) college campuses, corporate offices, airports, movie theaters, and/or malls.

In many embodiments, an ACN computes charging rates for EVs over a time horizon. In certain embodiments, an EV model is used to construct and solve a linear program (LP) over a rolling time window. In several embodiments, a quadratic programming (QP) framework may be utilized to compute charging rates for EVs, where the objective function is quadratic and the constraints are linear. In certain embodiments, the system is an unbalanced 3-phase system, where the capacity constraints are quadratic. Accordingly, certain embodiments provide a quadratically constrained quadratic program (QCQP). In many embodiments, the QCQP is a convex program that is polynomial-time solvable.

In many embodiments, the objective function may have several components such that it is a weighted sum of the component function. Each component can be designed to achieve a certain purpose, such as charging as fast as possible, tracking a given signal (e.g., onsite solar generation, demand-response signal, among others), implementing different priorities, reducing temporal fluctuations, ensuring unique optimal solutions, among numerous others. Accordingly, different product features may be systematically implemented within a same QP framework.

In several embodiments, product features may be implemented through the introduction of new constraints. Described in detail below are various features, including demand charge mitigation, demand response: load shifting/tracking, priority charging, joint EV/solar/storage optimization, reducing temporal fluctuations, enforcing minimum rates, and handling infeasibilty, among numerous other features as appropriate to the requirements of specific applications in accordance with many embodiments of the invention.

In particular, many embodiments provide a QP that provides load shifting/tracking. In particular, a demand response event may be to maintain a total ACN site load to below or at a certain load for a certain time period (e.g., below 1 MW from 1 PM to 4 PM today). Furthermore, the QP may have the total site load track a given profile for a particular time period.

Several embodiments of the QP may provide for priority charging among EVs by using an appropriate choice of parameter values. In particular, a higher priority EV can be assigned a larger weight, a larger minimum energy, and/or a larger maximum charging rate. In certain embodiments, a driver of an EV vehicle may pay a different price for prioritized charging.

In several embodiments, an EV may be grouped into different groups providing different priorities. The priorities may be implemented using different techniques, including admission control whereby an EV may be admitted or denied admission for charging based on the existing EVs within the ACN, and strict priority where certain groups are given strict priority over others, among various other techniques as discussed in detail below. In particular, different groups may be specified, including, for example. Group 1 where a defining feature may be that the EV is guaranteed its requested energy whereas a Group 2 whereby it only guarantees a minimum energy (but not necessarily its requested energy). Accordingly, Group 1 EVs may have strict priority over Group 2. In certain embodiments, admission control may be performed before a new EV is admitted to Group 1 in order to guarantee the requested energy of all existing Group 1 EVs and the minimum energy of all existing Group 2 EVs.

In certain embodiments, an ACN site may provide for EV charging, solar generation, and a battery (onsite energy storage) and the QP may schedule EV charging and battery operation to track solar generation. In particular, the charging rates and battery operation may be chosen in order to minimize the distance between the forecast solar generation and the total net load (e.g., EV+background+battery draw). Certain embodiments may solve a convex optimization problem (QP), as described in detail below.

In several embodiments, a QP framework may reduce rate fluctuations across a time period. In particular, the cost function may reduce the temporal fluctuation of the solution to a single QP instance, which is different from reducing fluctuations across different QP solutions. Certain embodiments may utilize a penalty term to reduce temporal fluctuations, which can make the QP cost function strictly convex and hence provide a unique optimal solution.

In several embodiments, the QP framework may enforce a minimum rate. In particular, it may be undesirable to set a charging rate to zero before an EV has finished charging because this may cause the mechanical contact in the charger to open, and a charging profile with many zero and nonzero rates before an EV has finished charging can incur excessive wear and tear. As such, certain embodiments of the QP framework may set charging rates to a rate that is greater than zero as long as an EV has an energy demand.

In certain embodiments, the QP framework may handle infeasibility in a situation where a minimum energy demand cannot be met for some EV, or when a capacity constraint may be violated at some resource. In certain situations, an EV rate may be determined based on laxity.

Charging stations and processes utilized to perform energy discovery protocol processes and determine EV charging rates for a set of vehicles in accordance with various embodiments of the invention are discussed further below.

Electric Vehicle Power Distribution Networks

A power distribution network in accordance with an embodiment of the invention is shown in FIG. 1. Electricity is generated at power generator 102. Power transmission lines 104 can transmit electricity between the power generator and power substation 106. Power substation 106 additionally can connect to one or more large storage batteries 108, which temporarily store electricity, as well as power distribution lines 110. The power distribution lines 110 can transmit electricity from the power substation to an adaptive charging network (ACN) 112. ACNs 112 can include a battery 114, solar panels 116, and adaptive charging stations (ACSs) 120. Electric vehicles 118 can connect to the ACN (and therefore to the power distribution network) at the ACSs. Some charging networks can only charge a small number of electric vehicles, while others have the necessary infrastructure to charge dozens or even hundreds of electric vehicles simultaneously.

The power generator 102 can represent a power source including (but not limited to) those using fossil fuels, nuclear, solar, wind, or hydroelectric power. Substation 106 changes the voltage of the electricity for more efficient power distribution. Solar panels 116 are distributed power generation sources, and can generate power to supply electric charging stations as well as generate additional power for the power grid.

Although many different systems are described above with reference to FIG. 1, any of a variety of power distribution networks including adaptive charging station controllers may be utilized as appropriate to the requirements of specific applications in accordance with embodiments of the invention. Adaptive charging stations connected to an adaptive charging network in accordance with various embodiments of the invention are discussed below.

Adaptive Charging Station Controllers

Figure 2:
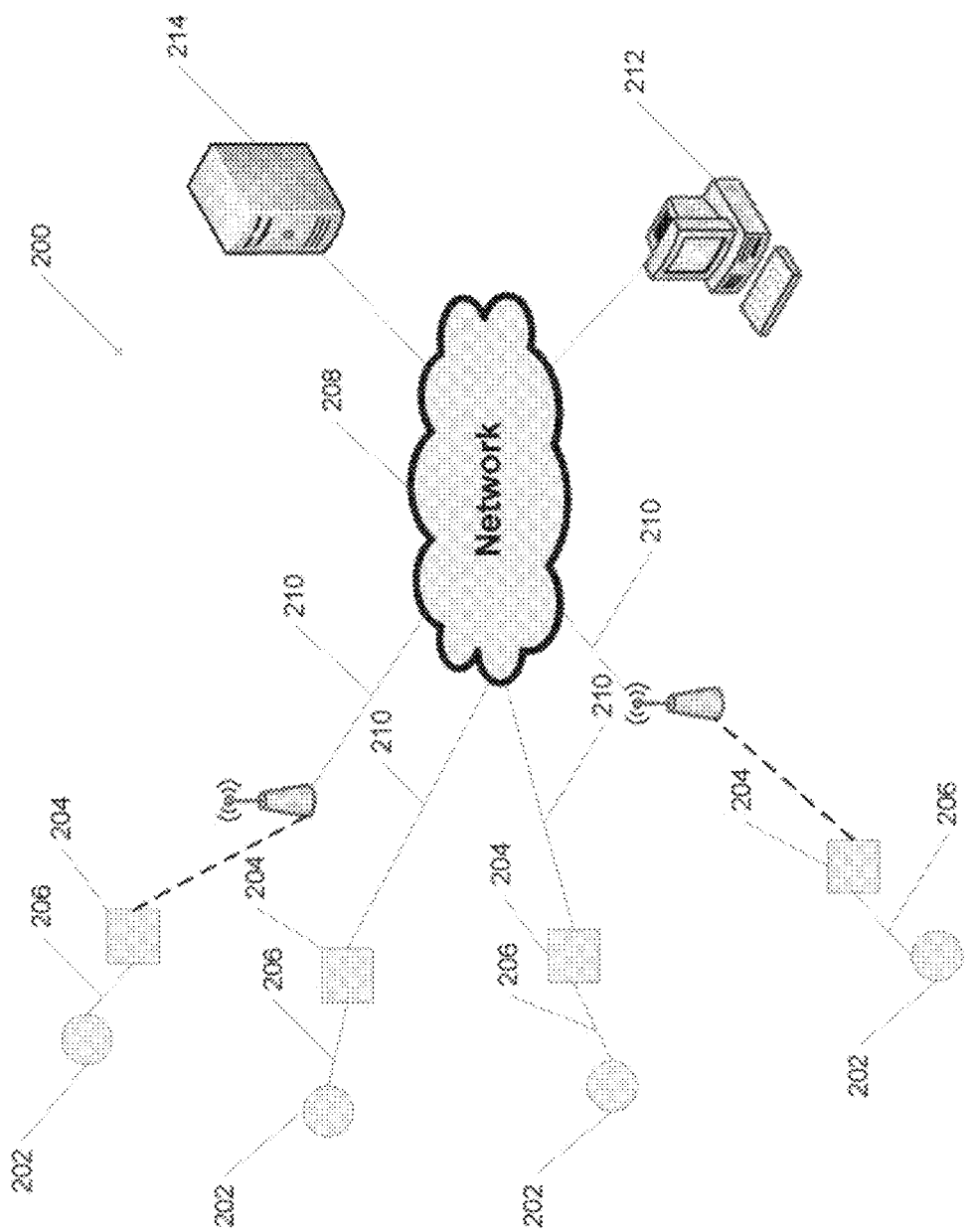
FIG. 2 is a diagram conceptually illustrating electric vehicle nodes connected to a communications network in accordance with an embodiment of the invention.

ACSs connected to an ACN in accordance with an embodiment of the invention are shown in FIG. 2. EV nodes 202 can connect to ACSs 204 using a wired and/or wireless charging connection. ACSs can connect to the ACN 208 using wired and/or wireless connections 210. ACSs can communicate with each other over this wired and/or wireless connection. In some embodiments, ACSs can communicate via data flowing directly on the power line. The adaptive charging network may also be connected to one or more centralized computers 212 to monitor calculations made by or to send instructions to multiple EV nodes. Additionally, in many embodiments, a database management system 214 can be connected to the network to track EV node data which, for example, may be used to historically track power usage at various locations or at various times of day over time. In many embodiments, adaptive charging stations can use adaptive charging station controllers, where linked adaptive charging stations can distribute available charging capacity between upstream and downstream ACSs in the ACN. In several embodiments of the invention, ACSs can be connected in various topologies including (but not limited to) hub and spoke, bus, tree, daisy chaining, point-to-point, star, ring, mesh, and/or hybrid topologies.

Although many systems are described above with reference to FIG. 2, any of a variety of systems can be utilized to implement a network of adaptive charging stations connected in an adaptive charging network in a variety of topologies as appropriate to the requirements of specific applications in accordance with various embodiments of the invention. Adaptive charging station controllers in accordance with several embodiments of the invention are discussed below.

Figure 3:
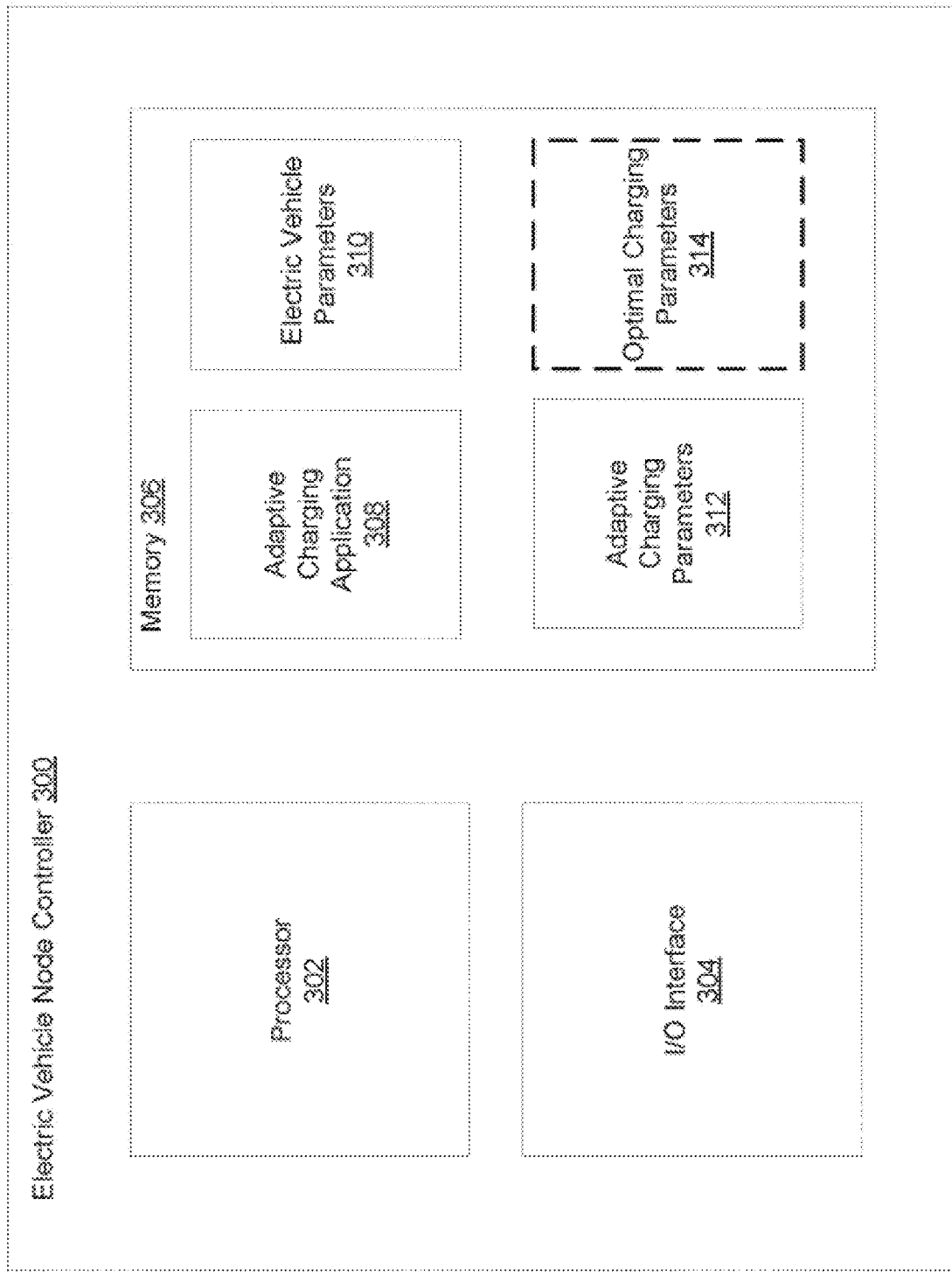
FIG. 3 is a block diagram of an electric vehicle node controller in accordance with an embodiment of the invention.

An adaptive charging station controller (ACS controller) in accordance with an embodiment of the invention is shown in FIG. 3. In various embodiments, the ACS controller 300 can perform calculations to distribute charging capacity between linked ACSs upstream and downstream within an ACN. In many embodiments, an ACS controller can make requests for available capacity from upstream nodes and/or transmit available capacity to downstream nodes.

In the illustrated embodiment, the ACS controller includes at least one processor 302, an I/O interface 304, and memory 306. In many embodiments, the memory includes software including EV charging application 308 as well as EV parameters 310, adaptive charging parameters 312, and energy discovery protocol parameters 314. An ACS can calculate charging parameters by using a combination of its own electric vehicle parameters, adaptive charging parameters, and/or energy discovery protocol parameters received through the I/O interface. Adaptive charging parameters can include specific charging process parameters and/or optimization constraint parameters. Additionally, adaptive charging parameters can include parameters specific to adaptive charging stations and/or adaptive charging networks. Energy discovery protocol parameters can include (but are not limited to) parameters specific to available capacity, requested capacity from upstream ACSs, and/or transmitted capacity to downstream ACSs. In a number of embodiments, the ACS controller and/or the ACS includes a touch screen display that enables the operator of an EV to provide information concerning the EV connected to an ACS and/or information concerning desired charging requirements (e.g. information indicative of a power requirement and an associated charging time such as (but not limited to) departure time and/or desired additional miles to add to range of EV). As is discussed further below, the ACS controller and/or ACS can also be connected to one or more sensors that can detect a vehicle occupying a specific parking space associated with the ACS when the vehicle is not drawing current from the ACS. In this way, the sensors enable the ACS controller to provide reliable information concerning the availability of the ACS to controllers within the ACN and/or operators of EVs more generally via web services.

Although a number of different ACS controller implementations are described above with reference to FIG. 3, any of a variety of computing systems can be utilized to control an ACS within an ACN as appropriate to the requirements of specific applications in accordance with various embodiments of the invention. Various configurations of ACSs within an ACN in accordance with many embodiments of the invention are discussed below.

System Model

In many embodiments, processes are utilized that attempt to optimize charging of EVs within an ACNs in accordance with at least one optimization criterion. A system model for computing a charging rate for an EV using a linear program (LP) in accordance with an embodiment is described below.

Optimization Horizon.

Fix a time horizon $T:=\{1, 2, \ldots, T\}$. This defines a rolling time window over which EV charging rates can be optimized repeatedly, as in model-predictive control. Specifically, at time t, ACN:
1. assumes there will be no future EV arrivals (this is the online aspect);
2. computes the charging rate for every EV that is active (e.g., still needs charging), by optimizing the charging rates of all EVs over the time horizon t+1, t+2, ..., t+T;
3. for the period t+1, charge all the active EVs at the calculated rates $r(t+1):=(r_i(t+1)$, for all EV i);
4. updates the remaining energy demand of each EV, and possibly other state variables, at the end of time t+1;
5. updates new EV arrivals in time t+1, if any;

and repeats the procedure at time r+1.

For example, if the charging rates are updated every minute and they are optimized over 10 hours, then t is in unit of minute and T=600 minutes. Suppose the current time is t=0 and there are 30 EVs i∈[1,30]. Where the notation i∈[1,n] and t∈[1,T] denotes i∈{1, ..., 30} and t∈{1, ..., T} respectively. Then an ACN can compute the charging rates $r(t):=(r_1(t), \ldots, r_{30}(t))$ for t∈[1,600]. For time period t=1, the ACN charges the 30 EVs at rates $r(1):=(r_1(1), \ldots, r_{30}(1))$. Then the ACN can update the remaining energy demand of these EVs and any new EV arrivals, and repeats the computation at time t=1 to compute the rates $r(t):=(r_1(t), \ldots, r_{30}(t))$ for t∈[2,601].

An electric vehicle (EV) model used to compute charging rates using a linear program in accordance with several embodiments of the invention is now described.

EV Model.

Many embodiments provide an EV model that is used to construct and solve a LP at each time t to compute the charging rates r(t+1), r(t+2), ..., r(T+1) over the rolling window [t+1,T+1], where $r(s):=(r_i(s), i\in[1,n])$ is a vector of charging rates for time s. At the next time t+1, a new LP can be constructed for the computation of charging rates over the window [t+2, T+2]. In general, at each time s, the ACN may compute the rates for the next T times in the window [s, T+s−1]. To differentiate each time t∈[s, T+s−1], s is called the computation period.

Without loss of generality, the computation period s=0 may be focused on and the computation of rates may be considered over the time window [1,T].

An ACN can describe an EV i using a vector $(e_i, d_i, \bar{r}_i, \underline{r}_i, \underline{e}_i)$ with the following interpretation:

$e_i > 0$ is the remaining energy demand. It is equal to the remaining energy demand at the beginning of the previous computation period minus the measured energy actually drawn by the EV in that period.

$d_i \in [1,T]$ is the (expected) departure time. The initial departure time when EV i first arrives can be obtained from user input. For subsequent computation periods, $d_i$ are the departure times in the previous periods minus 1.

Note, these parameters $(e_i, d_i, \bar{r}_i)$ depend on the current computation period s=0 and will be updated at subsequent computation periods s=1, ....

Note that $d_i$ may be interpreted as the time when EV i is scheduled to depart, and therefore the time available for charging is [1, $d_i$−1], not [1, $d_i$]. This detail should not be forgotten because some of the design below may be modified if time available for charging is interpreted to be [1,$d_i$], e.g., the cost function $c_2(r)$ in (23) should be modified to $c_2(r) = \Sigma_t \Sigma_i (t-(d_i+1)) r_i(t)$ otherwise; see discussion below in section "Charge as fast as possible" and Equation (18).

There may be two "corner cases" to handle. The first corner case is when an a new EV arrival has an expected departure time outside the window, $d_i > T$. One way is to assume T is large enough to satisfy any EV's energy demand and set $d_i$ to be T. The second corner case is when an EV departs later than it originally specified (at computation periods after the departure time, $d_i$ will be negative). If an EV is not charged after its specified departure time, then $d_i = 0$ may be set after the specified departure time or the EV may be removed from the list of active EVs. This process has the nice feature that it discourages a driver from deliberately declaring a departure time that is earlier than the true departure time.

$\bar{r}_i := (\bar{r}_i(t), t \in [1,T])$ is a vector of max charging rates. For the QP to be solved at computation period 0, this is a given vector. It is determined based on a variety of factors such as EVSE limit, EV limit, or the ramp-down mechanism, e.g., $$\bar{r}_1 := \min \{EVSE \text{ limit}, EV \text{ limit}, \text{ramp-down rate}\}$$

By setting $\bar{r}_i(t)=0$ for $t \geq d_i$, the QP framework may not charge after EV i's specified departure time.

$\underline{r}_i$ is a minimum charge rate. It is undesirable to set a charging rate to zero before the EV has finished charging because this will cause the mechanical contact in the charger to open. A charging profile $r_i(t)$ with many zero and nonzero rates before the EV finishes charging can incur excessive wear and tear. Moreover, some EVs may not recover once its charging rate is set to zero, i.e., it will not resume charging until it is unplugged and plugged in again. Hence, many embodiments enforce minimum rates whenever possible.

$\underline{e}_i \geq 0$ is a minimum energy that may be delivered. If $\underline{e}_i = 0$ then there is no minimum energy guarantee. This is for Group 2 EVs (as described in detail further below).

A Note on R(T)

In many embodiments, the ACN uses an ac (alternating current) system, whereby the currents, voltages, and instantaneous power flows are sinusoidal functions of time (instantaneous power has twice the frequency as currents or voltages). Accordingly, $r_i(t)$ may be used to sometimes denote power, and sometimes current. When $r_i(t)$ refers to current, it is the RMS value (which is equal to the magnitude of the complex current phasor). When $r_i(r)$ refers to power, it can either by the real power (in kWh) or the apparent power (in KVA). EV charging stations may draw power at unity power factor, reactive power is zero and apparent power equals the real power, and hence the distinction may not be important in these situations. In several embodiments where products provide reactive power compensation for grid services, then there may be a need to differentiate between real power and apparent power.

In many embodiments, most parts of the optimization processes may use current instead of power. If the voltages are fixed (both their magnitudes and phases), power is directly proportional to current and either can be equivalently used. However, using currents may have several advantages including the following:

Line limits and breaker limits etc may all be specified in terms of current limits.

Pilot signals/CT measurements can be in current.

Whenever there may be a need to calculate power or energy, many embodiments may multiply available voltage with current (and time for energy), so if voltage changes, there may be no need to have to modify other parts of the process.

Dealing with currents and voltages may stay in a linear system and can be simpler to handle.

Accordingly, processes in accordance with many embodiments of the invention can use $r_i(t)$ to denote power or current as appropriate to the requirements of a given application.

Quadratic Program

Many embodiments use a quadratic program to compute the charging rates for a set of EVs over a time period. A QP framework for computing charging rates for an BV in accordance with several embodiments of the invention is illustrated in FIG. 4.

Figure 4:
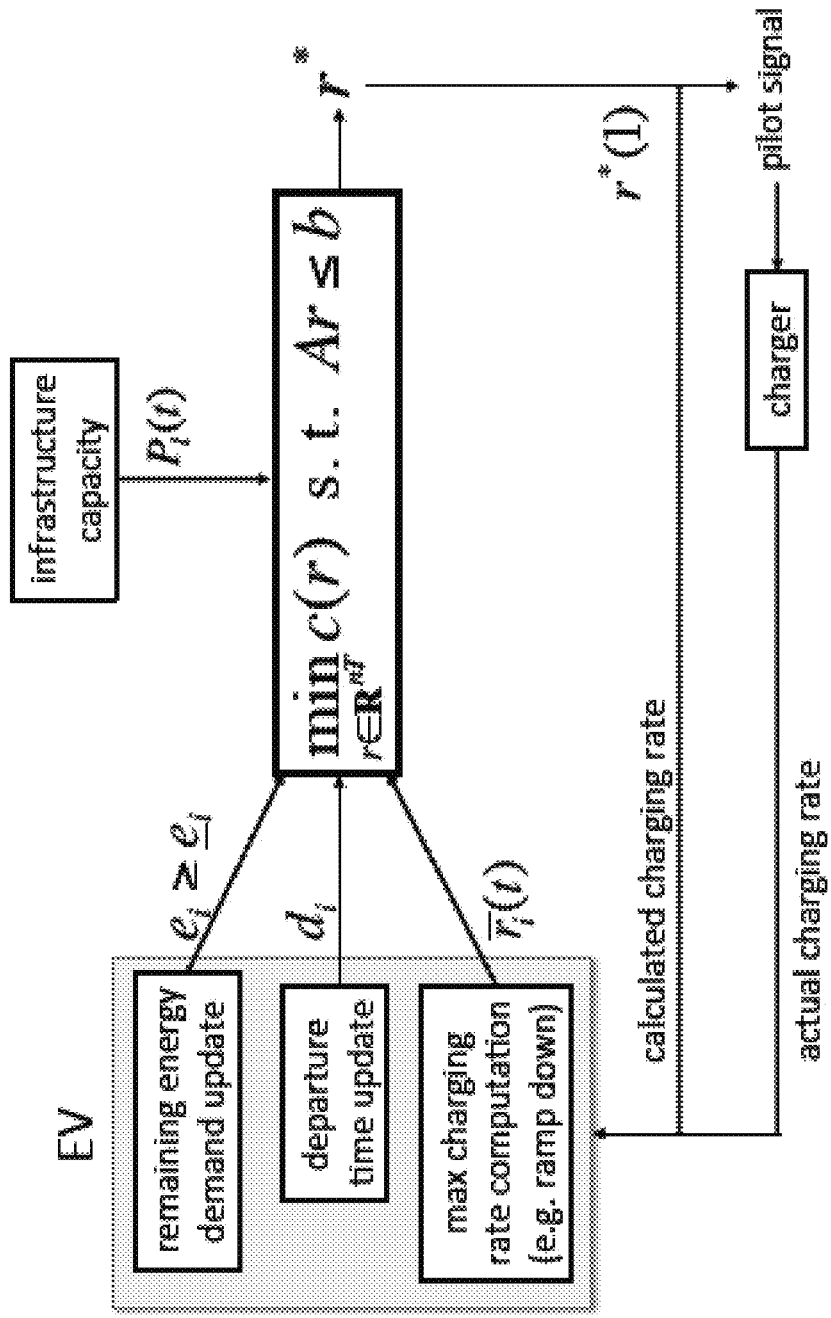
FIG. 4 illustrates a quadratic programming (QP) framework for computing charging rates for an electric vehicle (EV) in accordance with an embodiment of the invention.

Given (as illustrated in FIG. 4):
an optimization horizon $[1,T]$;
a set of EVs specified by $(e_i, d_i, \bar{r}_i, \underline{r}, \underline{e}_i)$;
the basic form of a quadratic program (QP) to compute the charging rates over $[1,T]$ these EVs is:

$$\min_r c(r) \quad (1a)$$

$$\text{subject to } 0 \leq r_i(t) \leq \bar{r}_i(t), i \in [1, n], t \in [1, T] \quad (1b)$$

$$\underline{e}_i \leq \sum_{t=1}^{T} r_i(t) \leq e_i, i \in [1, n] \quad (1c)$$

$$\sum_i A_{li} r_i(t) \leq P_l(t), t \in [1, T], \text{ for all resources } l \quad (1d)$$

where $c(r)$ is a convex quadratic cost function, $P_l(t)$ denotes the capacities of resources 1 at time r, and $A_{li}$ are the coefficients that describe how EV i's are constrained by resources 1 (as described in detail below). Note that for each QP instance, t can be not the real time but t=1, 2, ..., T. Although FIG. 4 illustrates a particular QP framework for computing charging rates for an EV, any of a variety of frameworks, including linear program with linear constraints, quadratic program with linear constraints, and quadratic program with quadratic constraints may be utilized as appropriate to the requirements of specific applications in accordance with several embodiments of the invention. Capacity constraints for objective functions in accordance with numerous embodiments of invention is now described.

Capacity Constraints

An objective function of a QP framework may compute charging rates for EVs based on the capacity constraints of a particular ACN. The capacities may vary based on the capacities of the cables connecting the chargers. Furthermore, the QP may use linear capacity constraints or quadratic capacity constraints when determining an optimal EV charging rate. Computation of capacity constraints may be based on the following.

It may be convenient to express the linear capacity constraints (1d) in matrix form:

$$Ar(t) \leq P(t)$$

where the matrix A has $A_{li}$ as its (l,i) entry, $r(t):=(r_i(t), i \in [1, n])$ is the column vector of charging rates, and $P(t):=(P_l(t), \forall l)$ is the column vector of resource capacities.

For example, if a set of 8 chargers are fed by a cable with capacity 80A, the corresponding capacity constraint is $$\sum_{i=1}^{8} r_i(t) \leq P_l(t)$$

where $P_l(t)=80A$ for all t. This can be put in the form of (1d) below, $\sum_i A_{li} r_i(t) \leq P_l(t)$, by setting $$A_{li} = \begin{cases} 1 & \text{if } EV \ i \text{ shares resource } l \\ 0 & \text{otherwise} \end{cases}$$

Sometimes, $S_l$ may be used to denote the set of EVs that share resource l.

Figure 5:
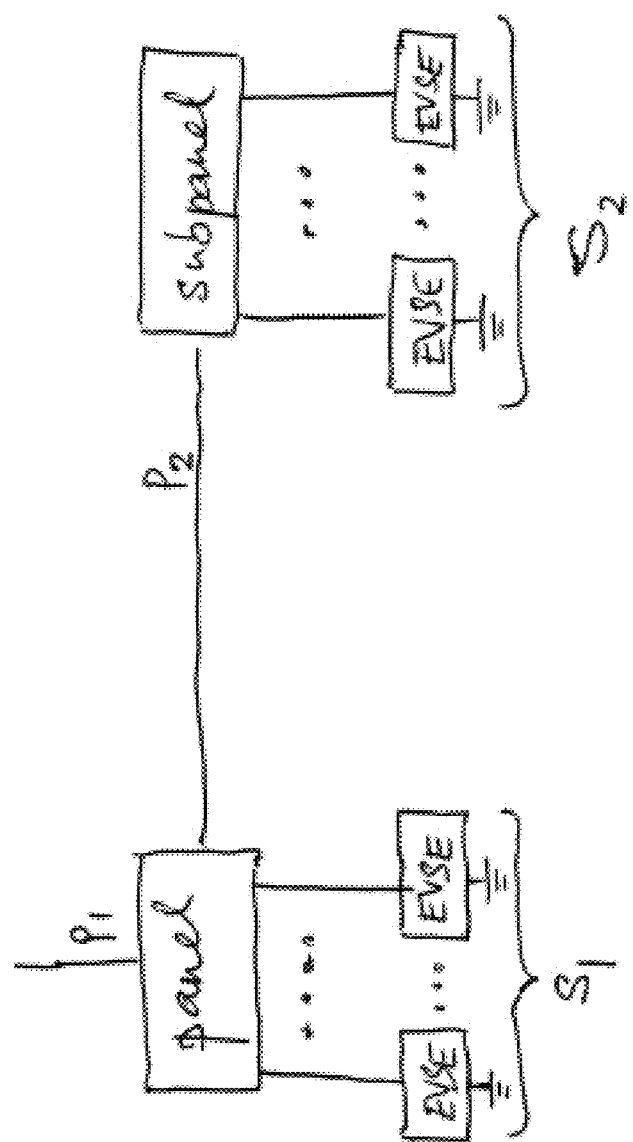
FIG. 5 illustrates an EVSE configuration for a single phase or Y-configuration of a three-phase system in accordance with an embodiment of the invention.

For example (Single-phase or Y configuration), suppose a panel is fed by a cable with capacity $P_1$ (constant for all time t). It serves a set $S_1$ of EVs and a subpanel with capacity $P_2$ that serves a set $S_2$ of EVs, as shown in FIG. 5. Note, as illustrated in FIG. 5, each EVSE can be connected between a live wire and the neutral, e.g., either in a single-phase configuration or Y-configuration of a three-phase system. Suppose the capacity of the cable between the (sub)panel and an EVSE is not a bottleneck.

Then the capacity constraint on the subpanel is:

$$\sum_{i \in S_2} r_i(t) \leq P_2 \quad (2a)$$

and the capacity constraint on the main panel is:

$$\sum_{i \in S_1} r_i(t) + \sum_{i \in S_2} r_i(t) \leq P_1 \quad (2b)$$

To write these two constraints in the form of (1d) below, define $$A_{1i} = \begin{cases} 1 & \text{if } EV \ i \in S_1 \\ 0 & \text{otherwise} \end{cases}$$

$$A_{2i} = \begin{cases} 1 & \text{if } EV \ i \in S_2 \\ 0 & \text{otherwise} \end{cases}$$

Then the constraints (2) become $$\sum_{i=1}^{n} A_{1i} r_i(t) + \sum_{i=1}^{n} A_{2i} r_i(t) \leq P_1$$

$$\sum_{i=1}^{n} A_{2i} r_i(t) \leq P_2$$

Let:
$r^1(t):=(r_i(t), i \in S_1)$ and $r^2(t):=(r_i(t), i \in S_2)$ denote the column vectors of charging rates for EVs in $S_1$ and $S_2$ respectively;

$A^1 := (A_{1i}, i \in S_1)$ and $A^2 := (A_{1i}, i \in S_2)$ denote the row vectors corresponding to EVs in $S_1$ and $S_2$ respectively; then these two capacity constraints can be written in matrix form as:

$$\begin{bmatrix} A^1 & A^2 \\ 0 & A^2 \end{bmatrix} \begin{bmatrix} r^1(t) \\ r^2(t) \end{bmatrix} \leq \begin{bmatrix} P_1 \\ P_2 \end{bmatrix}$$

Solving the above QP subject to the specified constraints can provide a time sequence of charging rates for each EV. However, additional constraints may be provided to further direct the manner in which available capacity is assigned to individual EVs by the ACN.

Although FIG. 5 illustrates various single-phase or Y configurations, any of a variety of configurations may be specified as appropriate to the requirements of specific applications in accordance with various embodiments of the invention. Furthermore, solving the above QP subject to the specified constraints can provide a time sequence of charging rates for each EV. However, in many embodiments, additional constraints may be provided to further direct the manner in which available capacity is assigned to individual EVs by the ACN. The following section describes the manner in which the QP can be implemented in the context of a 3-phase system.

Reference Design

Figure 6:
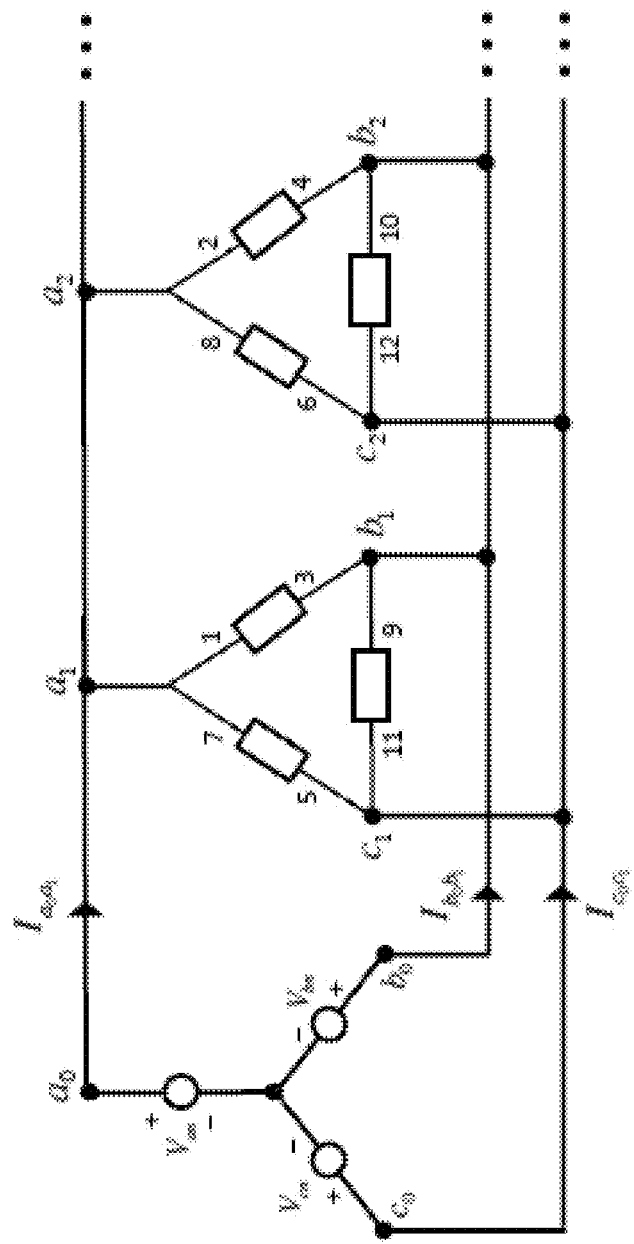
FIG. 6 illustrates a three-phase design whereby a three-phase voltage source is connected to loads in parallel in accordance with an embodiment of the invention.
Figure 7A:
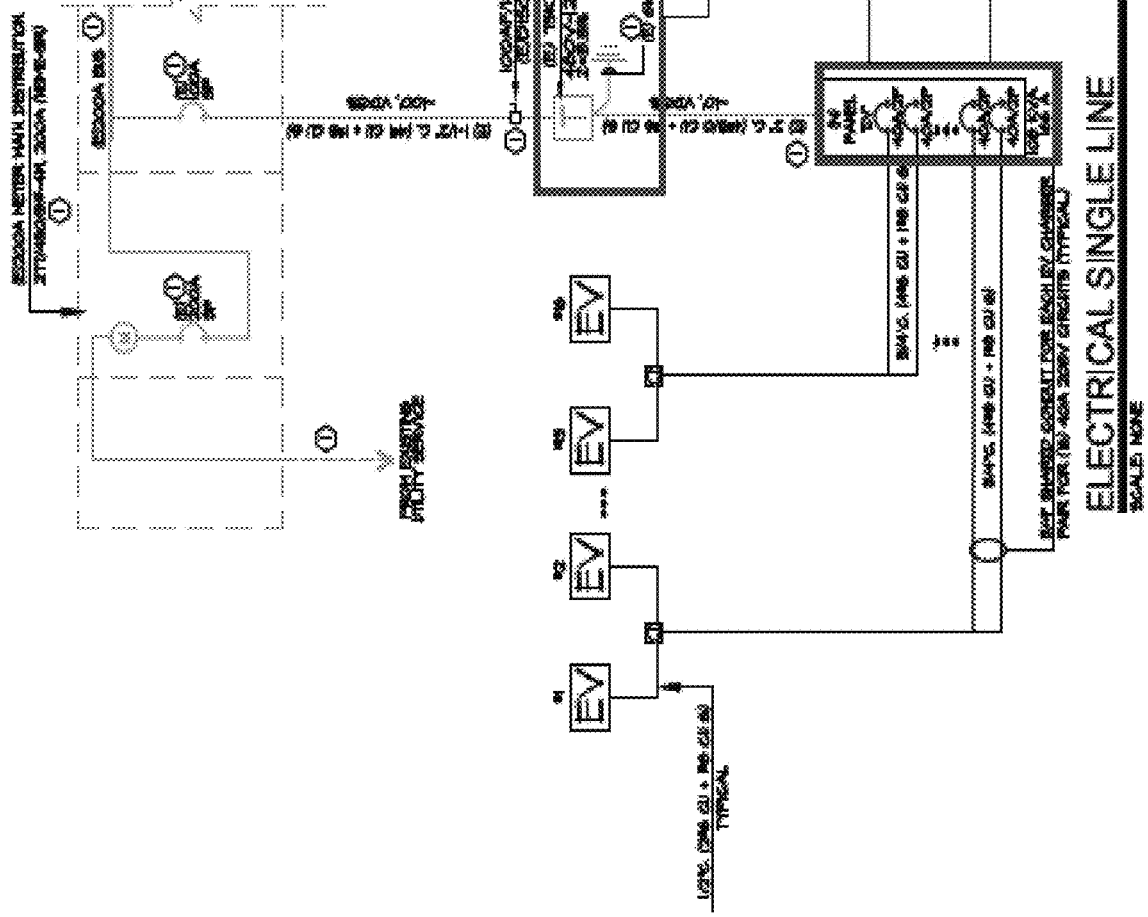
FIG. 7a illustrates a three-phase transformer in accordance with an embodiment of the invention.
Figure 7B:
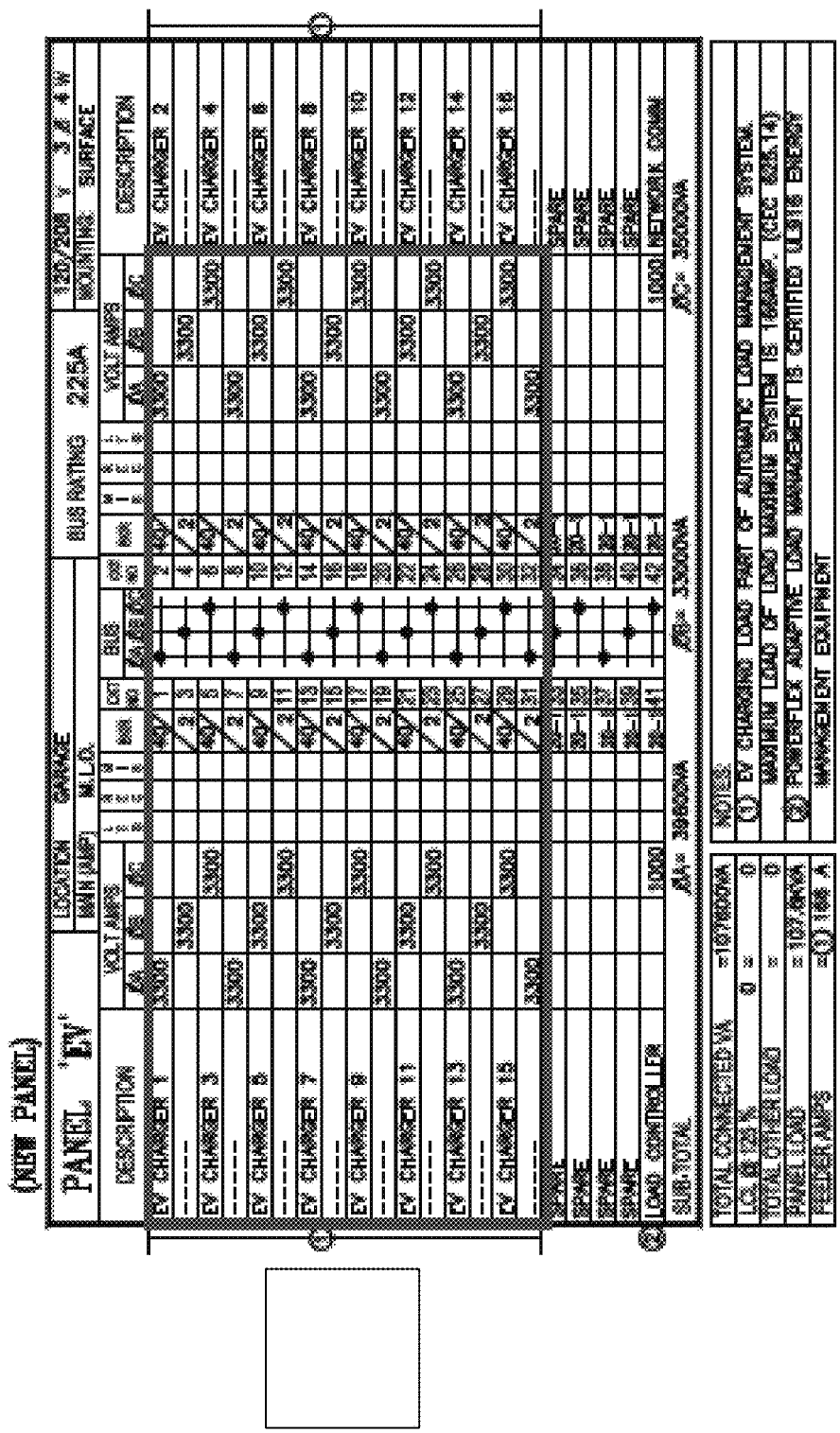
FIG. 7b illustrates an electric panel in accordance with an embodiment of the invention.

In many embodiments, EVSEs are connected to three-phase circuits. Accordingly, many embodiments adapt the QP framework, as outlined above, within the context of a three-phase system. Described now are QP frameworks within the context of three-phase systems in accordance with various embodiments of the invention. A Reference Design for a three-phase EVSE in accordance with many embodiments of the invention is illustrated in FIG. 7a. An electric panel in accordance with several embodiments is illustrated in FIG. 7b. A circuit model in accordance with several embodiments is shown in FIG. 6 where the secondary side of a distribution transformer can be modeled as a three-phase voltage source on the left in Wye configuration that supplies a set of three-phase loads (charging stations) in parallel in Delta configuration. In particular, FIG. 6 illustrates a three-phase design whereby a three-phase voltage source is connected to loads in parallel in accordance with various embodiments of the invention.

Referring to the circuit model in FIG. 6, in many embodiments, the QP may include capacity limits on the line currents $(I_{a_0 a_1}, I_{b_0 b_1}, I_{c_0 c_1})$ from the secondary side of the distribution transformer (the three-phase voltage source) to the electric panel. Let $I^{max}$ denote the line limit for each of the three lines, e.g., require that the current magnitude be bounded by $I^{max}$:

$$|I_{p_0 p_1}| \leq I^{max}, \quad p=a,b,c \quad (3)$$

The line limit $I^{max}$ may depend on both the power rating of the transformer and the current rating of the wire connecting the secondary side of the distribution transformer to the electric panel. It is derived in detail below as (7):

$$I^{max} := \min\left\{\frac{|S_{3phase}|}{\sqrt{3}|V_{an}|} = 361 \text{ A, wire current limit}\right\} \quad (4)$$

Certain embodiments may set bounds on the magnitudes of the charging currents $(I_{a_k b_k}, I_{b_k c_k}, I_{a_k c_k})$ $k=1, 2, \ldots$, that enforce the line limit (3). In certain embodiments, the circuit model illustrated in FIG. 6 may use a linear bound which is simple but conservative may take the following form (from (21)):

$$\sum_{k=1}^{K} (|I_{a_k b_k}| + |I_{c_k a_k}|) \leq I^{max} \text{ for phase } a \text{ line}$$

$$\sum_{k=1}^{K} (|I_{b_k c_k}| + |I_{a_k b_k}|) \leq I^{max} \text{ for phase } b \text{ line}$$

$$\sum_{k=1}^{K} (|I_{c_k a_k}| + |I_{b_k c_k}|) \leq I^{max} \text{ for phase } c \text{ line}$$

The optimization variables $r_i(t)$ may denote the magnitudes of the charging currents $|I_{p_k q_k}|$.

A second embodiment of the circuit model illustrated in FIG. 6 may use a quadratic bound instead of linear bounds which can be more computationally expensive but may be tight can take the form (from (19)):

$$\left(\sum_{k=1}^{K} |I_{a_k b_k}|\right)^2 + \left(\sum_{k=1}^{K} |I_{c_k a_k}|\right)^2 + \left(\sum_{k=1}^{K} |I_{a_k b_k}|\right)\left(\sum_{k=1}^{K} |I_{c_k a_k}|\right) \leq$$

$$(I^{max})^2 \text{ for phase } a \text{ line}$$

$$\left(\sum_{k=1}^{K} |I_{b_k c_k}|\right)^2 + \left(\sum_{k=1}^{K} |I_{a_k b_k}|\right)^2 + \left(\sum_{k=1}^{K} |I_{b_k c_k}|\right)\left(\sum_{k=1}^{K} |I_{a_k b_k}|\right) \leq$$

$$(I^{max})^2 \text{ for phase } b \text{ line}$$

$$\left(\sum_{k=1}^{K} |I_{c_k a_k}|\right)^2 + \left(\sum_{k=1}^{K} |I_{a_k b_k}|\right)^2 + \left(\sum_{k=1}^{K} |I_{c_k a_k}|\right)\left(\sum_{k=1}^{K} |I_{a_k b_k}|\right) \leq$$

$$(I^{max})^2 \text{ for phase } c \text{ line}$$

Although FIG. 6 illustrates various three-phase designs where a three-phase voltage source is connected to loads in parallel, any of a variety of designs may be specified as appropriate to the requirements of specific applications in accordance with various embodiments of the invention. Three-phase transformer designs in accordance with various embodiments are now described below.

Transformers

Figure 8:
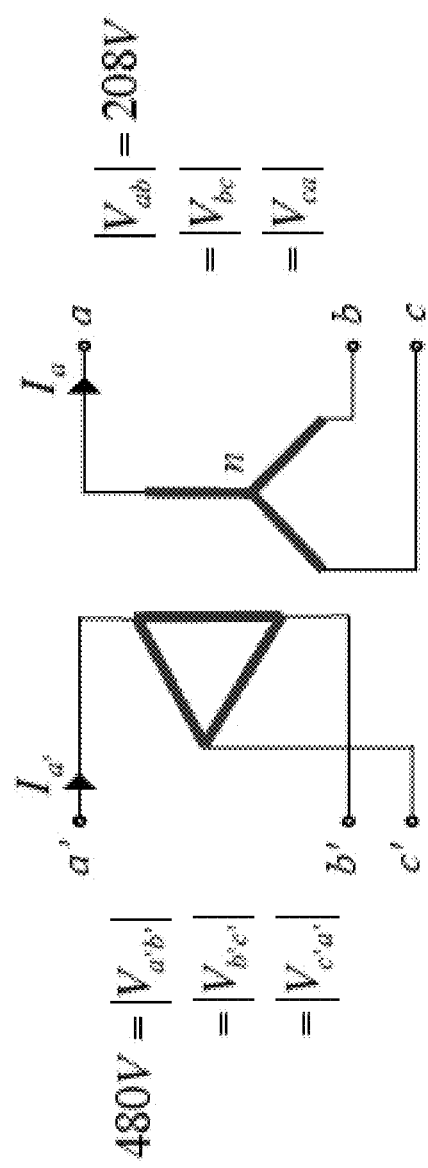
FIG. 8 illustrates a reference design transformer with voltages 480V-120/208V and power rating of 75 kVA in accordance with an embodiment of the invention.

Three-phase transformers that can be utilized in the Reference Design illustrated in FIG. 7a in accordance with various embodiments can be specified based upon limits on the line currents feeding into a three-phase transformer, in either Wye or Delta configuration. The three-phase transformer in the Reference Design (as illustrated in for example, FIG. 7a) has the specification voltages: 480V-120/208V power rating: 75 kVA This means that the primary side may be three-phase arranged in Delta configuration with line-to-line voltage magnitude of 480V, and the secondary side is three-phase arranged in Wye configuration with line-to-neutral voltage magnitude of 120V and line-to-line voltage magnitude of 208V=$\sqrt{3}\cdot$120V. FIG. 8 illustrates a Reference Design transformer with voltages 480V-120/208V and power rating of 75 kVA in accordance with several embodiments of the invention. Sometimes this may be also more explicitly specified as 480Δ-208Y/120 with 208V being the line-to-line voltage on the secondary side.

The power rating of a three-phase transformer typically refers to the three-phase power $S_{3phase}$, which is typically three times the single-phase power $S_{1phase}$ (assuming balanced operation). The magnitude of the single-phase power for the Reference Design can therefore be $$|S_{1phase}| = \frac{|S_{3phase}|}{3} = \frac{75 \text{ kVA}}{3} = 25 \text{ kVA}$$

The power input on the primary side is typically equal to the power output on the secondary side under the assumption that the transformer loss is negligible. The power rating may be the maximum power the transformer can handle on the primary or secondary side. It implies a capacity limit on each phase wire on the primary as well as secondary side. In many embodiments, these limits are used as capacity constraints on the charging currents when determining charging rates for each EV. Various techniques for calculating these current limits in accordance with certain embodiments of the invention are described below.

On the primary side, the configuration may be Delta and hence the single-phase power $S_{1phase}$ is given by (see FIG. 8)

$$S_{1phase} = V_{a'b'} I^*_{a'b'} \quad (5a)$$

where $I^*_{a'b'}$ denotes the complex conjugate of the phase current $I_{a'b'}$. The phase current $I_{a'b'}$ is related to the line current $I_{a'}$ by (assuming balanced operation in positive sequence)

$$I_{a'} = I_{a'b'} - I_{c'a'} = (1-e^{j2\pi/3})I_{a'b'} = \sqrt{3}e^{-j\pi/6}I_{a'b'}$$

and hence $$I_{a'b'} = \frac{I'_a}{\sqrt{3}} e^{j\pi/6} \quad (5b)$$

Substituting (5b) into (5a), results in $$S_{1phase} = V_{a'b'} \frac{I^*_{a'}}{\sqrt{3}} e^{-j\pi/6}$$

Hence the current limit on each line is $$|I_{a'}| = \sqrt{3} \frac{|S_{1phase}|}{|V_{a'b'}|} \quad (6)$$

Since the power rating of a three-phase transformer may always specify the three-phase power $S_{3phase}$ instead of single-phase power $S_{1phase}$, (6) is often expressed as $$|I_{a'}| = \frac{|S_{3phase}|}{\sqrt{3}|V_{a'b'}|}$$

For the Reference Design, the current limit on each line is:

$$|I_{a'}| = \frac{75 \text{ kVA}}{\sqrt{3}\, 480 \text{ V}} = 90 \text{ A}$$

In many embodiments, there is usually less concern with the current limit on the primary side because the goal of the system is to manage charging stations connected to the secondary side.

On the secondary side, the configuration may be Wye and hence the complex powers can be related as (assuming balanced operation)

$$S_{3phase} = 3 S_{1phase} = 3 V_{an} I^*_{an} = 3 V_{an}(-I_a^*)$$

since $I_a = -I_{an}$. This and the power rating implies a limit on the line current on the secondary side:

$$|I_a| = \frac{|S_{3phase}|}{3|V_{an}|} = \frac{75 \text{ kVA}}{3 \times 120 \text{ V}} = 208.3 \text{ A}$$

This is the current limit due to transformer power rating. The wire connecting the secondary side of the transformer and the electric panel may also have a current limit. The limit used in the capacity constraint of various optimization processes described:

$$I^{max} := \min\{|I_a|, \text{ wire current limit}\} \quad (7)$$

Although FIG. 7a illustrates various three-phase transformer designs, any of a variety of transformer designs may be utilized as appropriate to the requirements of specific applications in accordance with various embodiments of the invention.

Current Limits on Loads

Described in detail now are various embodiments of the QP framework that optimize a constraint for a current limit imposed on each charging station by distribution transformers. In particular, in various embodiments, the current limit in (7) on each line connecting a secondary side of a distribution transformer to an electric panel may impose a current limit on each EVSE, and the QP framework may optimize the constraints based on this current limit.

Figure 9B:
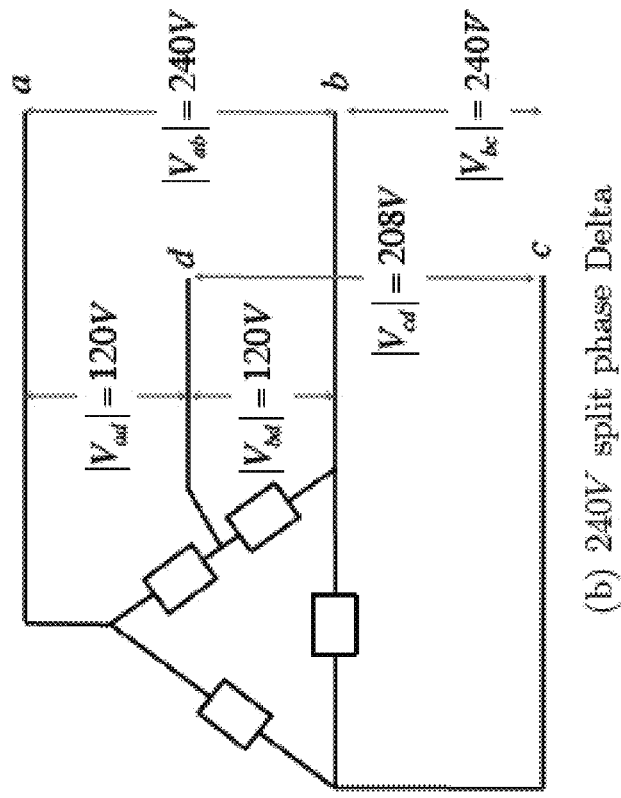
FIG. 9b illustrates a 5-wire transformer in Delta configuration with one of the phases center-tapped to provide three voltage levels in accordance with an embodiment of the invention.
Figure 9A:
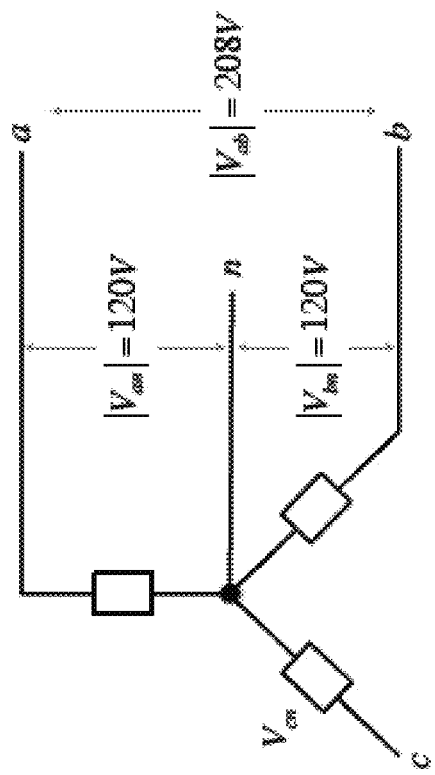
FIG. 9a illustrates a 5-wire three-phase transformer in Wye configuration in accordance with an embodiment of the invention.

FIGS. 9a and 9b show common distribution transformer configurations in accordance with several embodiments of the invention. In particular, FIGS. 9a and 9b show the secondary sides of two common configurations of three-phase distribution transformers in accordance with various embodiments of the invention. FIG. 9a shows a 5-wire three-phase transformer in Wye configuration, as in the Reference Design, in accordance with various embodiments of the invention. Three phase wires (labeled a, b, c) and a neutral wire (labeled n) are shown. The fifth wire, not shown, is the earth ground wire, typically connected to neutral. A different voltage magnitude can be supplied to a load depending on how it is connected. The voltage magnitude between a phase wire and the neutral is 120V and that between a pair of phase wires is $120\sqrt{3}=208$V.

FIG. 9b shows a 5-wire transformer in Delta configuration with one of the phases center-tapped to provide three voltage levels in accordance with various embodiments of the invention. Four phase wires (labeled a, b, c, d) are shown but an earth ground wire is not shown. The voltage magnitude between wires ad or bd is 120V, whereas that between wire cd is 208V. The line-to-line voltage magnitude is 240V. Although FIGS. 9a and 9b illustrate various distribution transformer configurations, any of a variety of transformer configurations may be utilized as appropriate to the requirements of specific applications in accordance with various embodiments of the invention.

FIG. 10a shows a Wye-configured voltage source connected to a set of loads in Delta configuration in accordance with various embodiments of the invention. The voltage source is the secondary side of a three-phase 120V/208V transformer shown in FIG. 9a. The voltage magnitude across each load is the line-to-line voltage 208V. This is one of the configurations described above in the context of the Reference Design. Although FIG. 10a illustrates various Wye-configured voltage sources, any of a variety of configured voltage sources may be utilized as appropriate to the requirements of specific applications in accordance with various embodiments of the invention.

FIG. 10b shows an electric panel arrangement to connect the loads to the voltage source in accordance with various embodiments of the invention. The dot in the first row indicates that the wires numbered 1 and 2 are connected to phase a, the dot in the second row indicates that the wires numbered 3 and 4 are connected to phase b, the dot in the third row indicates that the wires numbered 5 and 6 are connected to phase c, and so on. Therefore the load connected between wires 1 and 3 can be connected between phase a and phase b lines (see the corresponding labels on the loads in FIG. 10a. Similarly for the load connected between wires 2 and 4, and other loads connected between different phases. Although FIG. 10b illustrates various electrical panel arrangements to connect loads to voltage sources, any of a variety of electrical panel arrangements may be utilized as appropriate to the requirements of specific applications in accordance with various embodiments of the invention.

In many embodiments, there is an interest in the currents $J_0:=(I_{a_0a_1}, I_{b_0b_1}, I_{c_0c_1})$ supplied by the three-phase source to the loads. Suppose the wires connecting the three-phase source to the loads are rated at $I^{max}$, e.g., it may set that the current magnitudes be bounded by $I^{max}$:

$$|I_{p_0p_1}| \leq I^{max}, \quad p=a,b,c \quad (8)$$

where $I^{max}$ is derived in (7).

Suppose the loads are not impedance loads, but constant current loads that draw specified currents. Let the current drawn by the load in FIG. 10a between wires 1 and 3 be $I_{a_1b_1}$, that between wires 9 and 11 be $I_{b_1c_1}$, that between wires 5 and 7 be $I_{c_1a_1}$. In general, let the load currents in the kth three-phase load be $$I_k := \begin{bmatrix} I_{a_kb_k} \\ I_{b_kc_k} \\ I_{c_ka_k} \end{bmatrix}$$

Bounds on the load currents may now be derived ($I_k$, k=1, ..., K) that enforce the line limits (8). Recall that the magnitudes $|I_{p_kp_k}|$, p=a, b, c, of the current phasors can be the root-mean-square (RMS) values of the corresponding sinusoidal functions. In practice, load currents are usually specified in terms of RMS values, and hence the bounds of interest depend on the magnitudes $|I_{p_kp_k}|$ of the current phasors, not their phases.

Applying KCL at nodes $(a_1,b_1,c_1)$ provides $$\underbrace{\begin{bmatrix} I_{a_0a_1} \\ I_{b_0b_1} \\ I_{c_0c_1} \end{bmatrix}}_{J_0} = \underbrace{\begin{bmatrix} 1 & 0 & -1 \\ -1 & 1 & 0 \\ 0 & -1 & 1 \end{bmatrix}}_{A} \underbrace{\begin{bmatrix} I_{a_1b_1} \\ I_{b_1c_1} \\ I_{c_1a_1} \end{bmatrix}}_{I_1} + \underbrace{\begin{bmatrix} I_{a_1a_2} \\ I_{b_1b_2} \\ I_{c_1c_2} \end{bmatrix}}_{J_1}$$

where $J_k := (I_{a_ka_{k+1}}, I_{b_kb_{k+1}}, I_{c_kc_{k+1}})$, k=0, ..., K−1, are the line currents from stage k to stage k+1. In general, it has $$J_k = AI_k + J_{k+1}, \quad k=0, \ldots, K-1$$

Hence the total supply currents are given by $$J_0 = A(I_0 + I_1 + \ldots + I_K) \quad (9)$$

when there are K three-phase constant current loads. Note that this expression does not require that the loads are balanced. (Note however that the line limit $I^{max}$ in (7) is derived assuming balanced operation and is therefore only an approximate limit.) In particular, if a load (say) $I_{a_kb_k}$ is absent, then set $I_{a_kb_k}=0$ in (9).

Let the total load current in each leg of the Delta configuration be denoted by $$I^{ab} := \sum_{k=1}^{K} I_{a_kb_k}, \quad I^{bc} := \sum_{k=1}^{K} I_{b_kc_k}, \quad I^{ca} := \sum_{k=1}^{K} I_{c_ka_k} \quad (10)$$

Then (9) can be written in terms of the total load currents as:

$$\begin{bmatrix} I_{a_0a_1} \\ I_{b_0b_1} \\ I_{c_0c_1} \end{bmatrix} = \begin{bmatrix} 1 & 0 & -1 \\ -1 & 1 & 0 \\ 0 & -1 & 1 \end{bmatrix} \begin{bmatrix} I^{ab} \\ I^{bc} \\ I^{ca} \end{bmatrix}$$

The line limits (8) are therefore $$|I_{a_0a_1}| = |I^{ab} - I^{ca}| \leq I^{max}$$

$$|I_{b_0b_1}| = |I^{bc} - I^{ab}| \leq I^{max}$$

$$|I_{c_0c_1}| = |I^{ca} - I^{bc}| \leq I^{max}$$

Enforcing line limits hence may need one to know not just the magnitudes $|I_{p_kp_k}|$ of the load currents, but also their phases in order to compute their sums.

Figure 11:
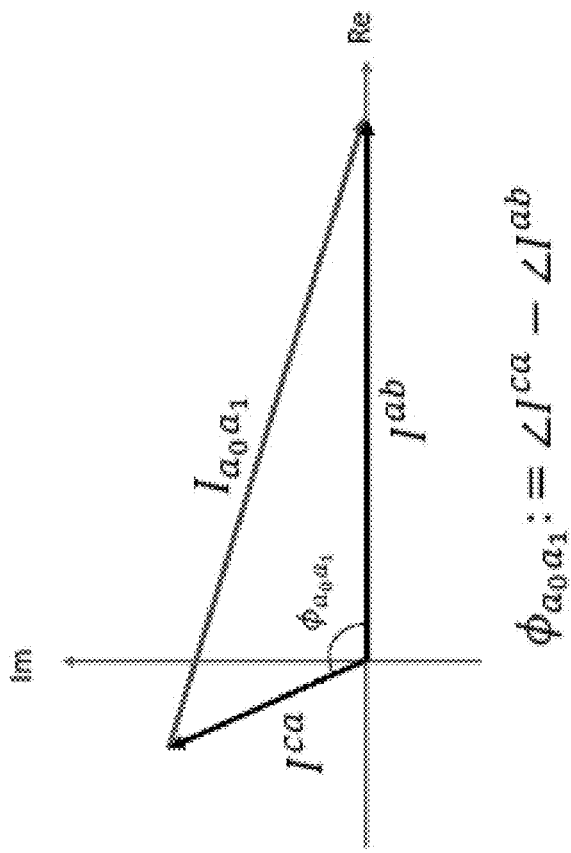
FIG. 11 illustrates computing inequalities for enforcing line limits using magnitudes and phases of loads in accord acne with an embodiment of the invention.

FIG. 11 illustrates $I_{a_0a_1} = I^{ab} - I^{ca}$. Hence by the cosine rule $|I_{a_0a_1}|^2 = |I^{ab}|^2 + |I^{ca}|^2 - 2 \cdot |I^{ab}| \cdot |I^{ca}| \cos \phi$ where $\phi_{a_0a_1} := \angle I^{ca} - \angle I^{ab}$ is the angle between $I^{ab}$ and $I^{ca}$.

As explained with reference to FIG. 1, these inequalities are equivalent to:

$$|I^{ab}|^2 + |I^{ca}|^2 - 2 \cdot |I^{ab}| \cdot |I^{ca}| \cos \phi_{a_0a_1} \leq (I^{max})^2 \quad (12a)$$

$$|I^{bc}|^2 + |I^{ab}|^2 - 2 \cdot |I^{bc}| \cdot |I^{ab}| \cos \phi_{b_0b_1} \leq (I^{max})^2 \quad (12b)$$

$$|I^{ca}|^2 + |I^{bc}|^2 - 2 \cdot |I^{ca}| \cdot |I^{bc}| \cos \phi_{c_0c_1} \leq (I^{max})^2 \quad (12c)$$

If the angles $\phi_{p_0p_1}$, p=a, b, c, are know between the total load currents ($I^{ab}$, $I^{bc}$, $I^{ca}$) in each leg of the Delta configuration, then (12) are convex quadratic constraints on the magnitudes of ($I^{ab}$, $I^{bc}$, $I^{ca}$).

ACNs can use the processes described above to determine the charging rates to provide to a number of EVs, when the ACN is supplied by three phase power. In the real world, the grid is less than ideal and the three-phase power supplied to the ACN may be unbalanced. Accordingly, many embodiments solve the QP for three-phase unbalanced supplies.

Unbalanced Three-Phase Infrastructure Constraints

In many embodiments, EVSEs are usually connected on three-phase circuits. The EVSEs may be connected in a delta configuration as shown in FIG. 27 in accordance with various embodiments of the invention.

Because of differences in demand the loads in this delta configuration are often imbalanced which may require for careful consideration of the infrastructure constraints to ensure safe operation. For modeling simplicity, certain embodiments may assume that the line impedances leading to each station are negligible, allowing to lump all EVSEs between common phases into a single load represented by current phasors $I_{ab}^{evse}$, $I_{bc}^{evse}$, $I_{ca}^{evse}$. Certain embodiments may also assume that each EVSE is modeled as a controllable current source with unity power factor. With this model, certain embodiments may consider two types of constraints:

Phase Constraints: A phase constraint pertains to the current along one leg of the delta, i.e. ab, bc, or ca. For example constraints on the aggregate current of the AV and CC pods are phase constraints in an ACN. Certain embodiments may treat the EVSEs within the same phase as in parallel and all have unity power factor, and can express the constraint as $\Sigma_{i \in S_j} r_i(t) \le R_j \forall j$ Line Constraints: A line constraint pertains to the current along each line i.e. a, b, or c. Examples of line constraints in an ACN include limits on $I_p^0$, $I_p^1$, $I_p^2$ and $I_p^3$ where $p \in \{a, b, c\}$.

Figure 27:
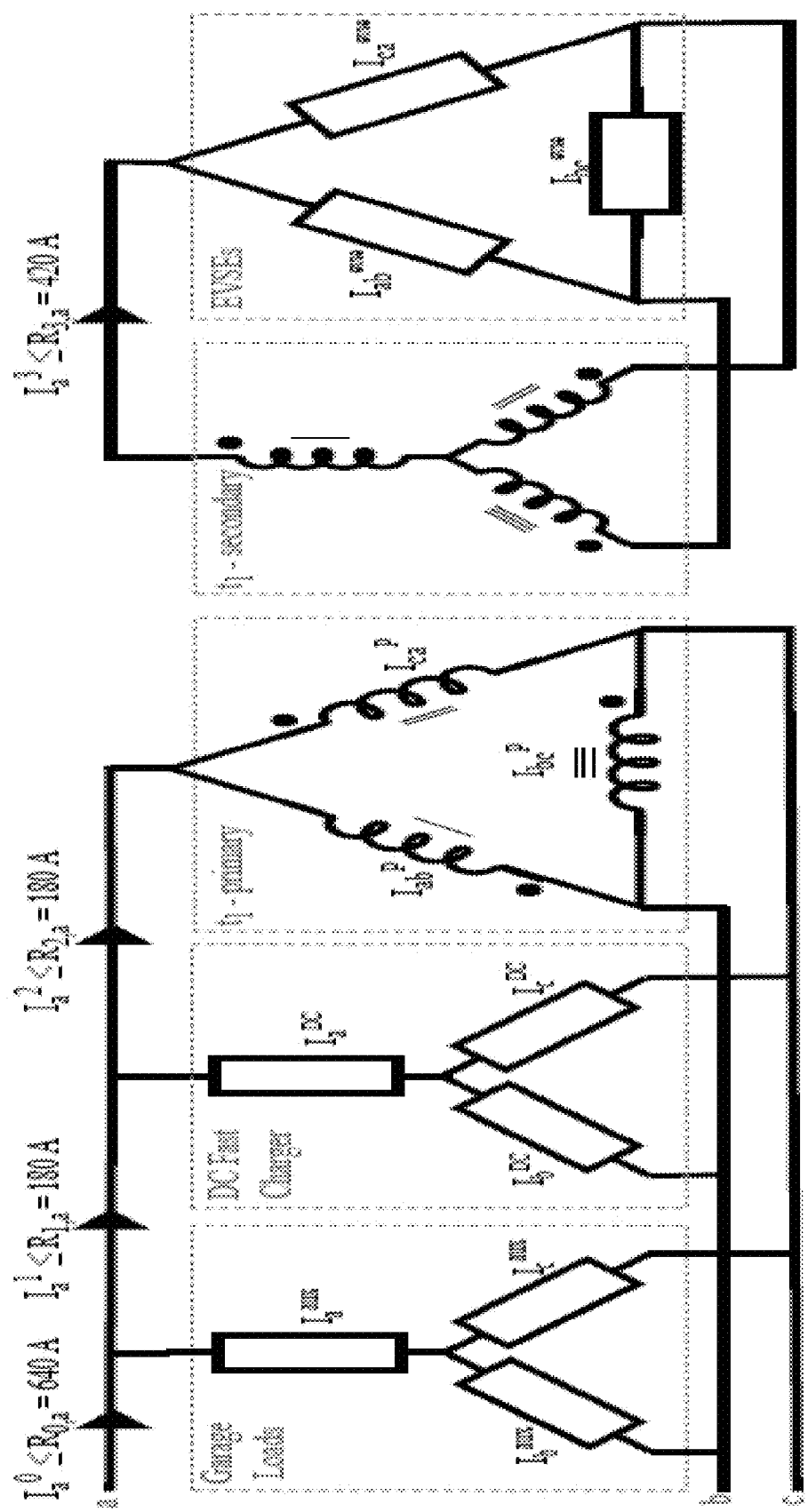
FIG. 27 illustrates EVSEs connected in a delta configuration in accordance with an embodiment of the invention.

Explained in detail now are how to derive the constraints on these current magnitudes $|I_p^0|$, $|I_p^1|$, $|I_p^2|$, and $|I_p^3|$, $p \in \{a, b, c\}$, using the circuit diagram in FIG. 27. Certain embodiments can calculate the line currents $I_p^3$ from the phase currents:

$$I_a^3 = I_{ab}^{evse} - I_{ca}^{evse}$$

$$I_b^3 = I_{bc}^{evse} - I_{ab}^{evse}$$

$$I_c^3 = I_{ca}^{evse} - I_{bc}^{evse} \quad (13)$$

where each variable is a phasor. From this point on, certain embodiments will only consider one phase/line in the interest of space, but all other constraints follow from this derivation. To find $I_{ab}^{evse}$ certain embodiments may define the set of all EVSEs connected between lines a and b to be $S_{ab}$, likewise for bc and ca. Certain embodiments can then define the magnitude of the aggregate phase current for each leg of the delta as $$|I_{ab}^{evse}| := \sum_{i \in S_{ab}} r_i(t) \quad (14)$$

Certain embodiments can treat each EVSE as a constant current load with unity power factor, so the phase of each current matches the phase of the corresponding voltage. Certain embodiments may assume that they are able to measure/calculate the phase angle of the voltage across each leg of the delta configuration. Denote the phase angle of each phase as $\phi_{ab}$, $\phi_{bc}$, and $\phi_{ca}$ respectively. If measurements of voltage phase angles are not available, certain embodiments may assume that voltage angles are balanced, i.e., each phasor is spaced 120 apart.

In any case, certain embodiments may emphasize that in the phasor $$I_{ab}^{evse} = |I_{ab}^{evse}| \cdot e^{j\phi_{ab}} \quad (15)$$

only the magnitude $|I_{ab}^{evse}|$ is variable and the phase $e^{j\phi_{ab}}$ is known.

From (13), the current constraint $|I_a^3| \le R_{3,a}$ becomes a constraints on $I_{ab}^{evse}$ and $I_{ca}^{evse}$:

$$|I_a^3| = |I_{ab}^{evse} - I_{ca}^{evse}| \le R_{3,a} \quad (16a)$$

Note that this constraint is a second-order cone (SOC) constraint in the magnitudes $|I_{ab}^{evse}|$, $|I_{ca}^{evse}|$. To see this, notice $$|I_{ab}^{evse} - I_{ca}^{evse}|^2 = (|I_{ab}^{evse}| \cos \phi_{ab} - |I_{ca}^{evse}| \cos \phi_{ca})^2 + (|I_{ab}^{evse}| \sin \phi_{ab} - |I_{ca}^{evse}| \sin \phi_{ca})^2$$

In order to account for constraints on $I_a^2$, $I_a^1$ and $I_a^0$, certain embodiments may consider the effect of the delta-wye transformer $t_1$. Using circuit analysis, certain embodiments can relate $I_a^2$ to the aggregated EVSE currents:

$$I_a^2 = \frac{1}{n}(I_{ab}^{evse} + I_{bc}^{evse} - 2I_{ca}^{evse})$$

where n is the turns ratio of the transformer which in our system is 4. Hence the constraint on $I_a^2$ can be expressed in terms of EVSE current magnitudes as:

$$|I_a^2| = \frac{1}{n}|I_{ab}^{evse} + I_{bc}^{evse} - 2I_{ca}^{evse}| \le R_{2,a} \quad (16b)$$

where $R_{2,a}$ is expressed as a current constraint on the primary side of $t_1$, rather than reflecting it to the secondary side.

Finally, certain embodiments can obtain $I_a^1$ and $I_a^0$ from $I_a^2$ by adding the currents drawn from the DC fast charging and the auxiliary garage loads. Hence its constraints are:

$$\left|\frac{1}{n}(I_{ab}^{evse} + I_{bc}^{evse} - 2I_{ca}^{evse}) + I_a^{DC}\right| \le R_{1,a} \quad (16c)$$

$$\left|\frac{1}{n}(I_{ab}^{evse} + I_{bc}^{evse} - 2I_{ca}^{evse}) + I_a^{DC} + I_a^{aux}\right| \le R_{0,a} \quad (16d)$$

Like (16a), the constraints (16b), (16c) and (16d) are SOC constraints. These constraints translate into constraints on the charging rates $r_i(t)$ through (14).

In some applications these SOC constraints are too computationally expensive, however. Simpler but more conservative constraints can be derived by observing $$|I_a^3| = |I_{ab}^{evse} - I_{ca}^{evse}| \le |I_{ab}^{evse}| + |I_{ca}^{evse}|$$

Hence the constraints (16) can be relaxed to:

$$|I_{ab}^{evse}| + |I_{ca}^{evse}| \le R_{3,a} \quad (17a)$$

$$\frac{1}{n}(|I_{ab}^{evse}| + |I_{bc}^{evse}| + |2I_{ca}^{evse}|) \le R_{2,a} \quad (17b)$$

$$\frac{1}{n}(|I_{ab}^{evse}| + |I_{bc}^{evse}| + 2|I_{ca}^{evse}|) + I_a^{DC} \le R_{1,a} \quad (17c)$$

$$\frac{1}{n}(|I_{ab}^{evse}| + |I_{bc}^{evse}| + 2|I_{ca}^{evse}|) + I_a^{DC} + I_a^{aux} \le R_{0,a} \quad (17d)$$

Special Cases

Described below are several special cases and the derivation of simple bounds on the magnitudes ($|I_{a_k b_k}|$, $|I_{b_k c_k}|$, $|I_{c_k a_k}|$) of the individual load currents that will enforce (12).

Assumption 1: Current phasors $I_{a_k b_k}$ have the same, and known, phase angle $\theta_{ab}$ for all k; similarly for $I_{b_k c_k}$ and $I_{c_k a_k}$. From (10), it provides $$I^{ab} := e^{j\theta_{ab}} \sum_{k=1}^{K} |I_{a_k b_k}|, \quad I^{bc} := e^{j\theta_{bc}} \sum_{k=1}^{K} |I_{b_k c_k}|, \quad I^{ca} := e^{j\theta_{ca}} \sum_{k=1}^{K} |I_{c_k a_k}|$$

and constraints (12a) become $$\left(\sum_{k=1}^{K} |I_{a_k b_k}|\right)^2 + \left(\sum_{k=1}^{K} |I_{c_k a_k}|\right)^2 - 2\left(\sum_{k=1}^{K} |I_{a_k b_k}|\right)\left(\sum_{k=1}^{K} |I_{c_k a_k}|\right)\cos\phi_{a_0 a_1} \leq (I^{max})^2 \quad (18)$$

where $\cos\phi_{a_0 a_1} := \theta_{ca} - \theta_{ab}$ is known. Similarly for constraints (12b) and (12c). These are quadratic constraints in the magnitudes ($|I_{a_k b_k}|$, $|I_{b_k c_k}|$, $|I_{c_k a_k}|$) of the individual load currents that will enforce (12), given the angles $\phi_{p_0 p_1}$, p=a, b, c, between the load currents in different legs of the Delta configuration.

Assumption 2: In addition to Assumption 1, the angles $\phi_{p_0 p_1} = 120°$, for p=a, b, c. Then $$\left(\sum_{k=1}^{K} |I_{a_k b_k}|\right)^2 + \left(\sum_{k=1}^{K} |I_{c_k a_k}|\right)^2 + \left(\sum_{k=1}^{K} |I_{a_k b_k}|\right)\left(\sum_{k=1}^{K} |I_{c_k a_k}|\right) \leq (I^{max})^2 \quad (19)$$

Similarly for constraints (12b) and (12c).

Assumption 3 (balanced case): All load currents have the same magnitude and the phases of currents on different legs of the Delta differ by 120°. That is, assuming positive sequence, for all k=1, . . . , K, this provides $$I_{a_k b_k} = Ie^{j\theta_{ab}}, \quad I_{b_k c_k} = Ie^{j\theta_{bc}}, \quad I_{c_k a_k} = Ie^{j\theta_{ca}}$$

where I is the common magnitude of the load currents, and $$\theta_{ab} - \theta_{bc} = 120°, \quad \theta_{bc} - \theta_{ca} = 120°, \quad \theta_{ca} - \theta_{ab} = 120°$$

Then the constraint (19) reduces to $3K^2 I^2 \leq (I^{max})^2$, or a bound on the common magnitude I of individual load currents $$I \leq \frac{I^{max}}{\sqrt{3}K} \quad (20)$$

Linear Bounds.

In many embodiments, an application may operate in unbalanced conditions, e.g., adaptive electric vehicle charging where the magnitudes $|I_{p_k q_k}|$ of the load currents are to be determined and generally different. In these cases there can be two difficulties with the line limits (18) and (19). First, the angles ($\theta_{ab}, \theta_{bc}, \theta_{ca}$) may not be known. Second, even when these angles are known, the constraints may be quadratic which can be computationally expensive to implement in real time in inexpensive devices. In this case, many embodiments can impose linear constraints which are simpler but more conservative.

Take phase a as an example. Since $|I_{a_0 a_1}| = |I^{ab} - I^{ca}| \leq |I^{ab}| + |I^{ca}|$, a simple limit on the load currents that enforces $|I_{a_0 a_1}| \leq I^{max}$ can call for $$|I^{ab}| + |I^{ca}| \leq I^{max}$$

e.g., the sum of the magnitudes of the total load currents in legs ab and ca should be less than the current rating $I^{max}$. From (10), this provides $|I^{ab}| = |\Sigma_k I_{a_k b_k}| \leq \Sigma_k |I_{a_k b_k}|$. Hence a simple linear bound on the load current magnitudes is:

$$\sum_{k=1}^{K} (|I_{a_k b_k}| + |I_{c_k a_k}|) \leq I^{max} \quad (21)$$

The constraints on phases b and c can be similar.

For a balanced system, many embodiments can easily assess how conservative the bound (21) is compared with the exact limit (20) on the load currents. In the balanced case the bound (21) reduces to $$I \leq \frac{I^{max}}{2K}$$

Hence it is $\sqrt{3}/2 \sim 87\%$ of that in (20), i.e., it is conservative by ~13% for a balanced system.

Multiple EV Groups

In many embodiments, the ACN differentiates between different EV groups to provide different charging guarantees depending upon the group to which a particular EV belongs. In several embodiments, an EV can be moved from one group to another based on network state as well as its own condition. The interpretation of each group can be revised over time. In addition, the process for determining the charging rate to provide to each EV in a group can be updated independently of other groups by maintaining interfaces and assumptions on each group.

Groups and Properties

In several embodiments, the ACN divides EVs into at least three groups. The basic assumptions on each group are as follows.

1. Group 1: EVs admitted to this group will be guaranteed (subject to certain assumptions) that the requested energy $e_i$ will be delivered before the departure time $d_i$. When an EV requests to receive service as a Group 1 EV, tests will be performed (detailed below) to determine if the requested energy $e_i$ can be guaranteed under normal anticipated conditions, and an admission decision will be made and communicated to the driver. In many embodiments, the ACN may charge a driver of an EV a high price to secure guaranteed energy delivery.
2. Group 2: EVs in this group will be served with best effort, i.e., there is no guarantee that requested energy et will be delivered before time $d_i$. They will, however, be guaranteed a minimum energy $\underline{e}_i$, which can be zero or positive, before time $d_i$. For instance, an EV is guaranteed at least 15 miles of energy or 15% of requested $e_i$. The determination of $\underline{e}_i$ is not specified as a property of Group 2, but can be decided and updated separately by another module. Note that initially, even et, cannot be fully guaranteed if $\underline{e}_i > 0$. In order to guarantee nonzero $\underline{e}_i$, the process to determine $\underline{e}_i$ should include a check on feasibility, and $\underline{e}_i$ can be reduced until feasibility is maintained. In many embodiments, the ACN can choose internally nonzero $\underline{e}_i$ but they are not revealed to the drivers and therefore EVs i are likely to receive at least $\underline{e}_i$ though the drivers are not guaranteed this.

3. Group 3: This group contains EVs that cannot be served normally. Example: the driver has not provided input or has provided inconsistent input, or the driver input implies a laxity $a_i<0$ (infeasible), or requested energy $e_i$ has been delivered but the EV can still take more charge, etc. The simplest policy is not to charge any EV in Group 3. Since any EV that does not conform to Groups 1 and 2 for any reason may be sent to Group 3, it is likely that some of them may be handled differently from others. Accordingly, certain embodiments may subdivide Group 3 into subgroups. This may allow for updates to the processes and its implementation for handling one subgroup independently of other subgroups.

While specific groups of EVs are described above, ACNs in accordance with many embodiments can utilize any of a variety of processes that treat different groups of EVs in different ways as appropriate to the requirements of a given application. Use of group priority in determining charging rate in accordance with a number of embodiments of the invention is discussed below.

Group Priority

In many embodiments, the defining feature of Group 1 may be that EV i will be guaranteed its requested energy et (up to a measurement error margin). This is in contrast with Group 2 that may guarantee only a minimum energy $\underline{e}_i \geq 0$, but not the requested energy $e_i$. In order to guarantee $e_i$, a key design decision is:

Group 1 has strict priority over Group 2 and Group 3. This means that all resources will be devoted to satisfy Group 1 EV's energy requests $e_i$ first. Group 2 EVs will be allocated left-over capacities. Specifically the charging rates of Group 1 and Group 2 EVs are determined sequentially:

1. Solve QP (with equality energy constraints) for Group 1 EVs only. Denote their rates by $r_{G1}^*:=(r_i^*(t), i \in \text{Group } 1, t \in [1,T])$.
2. Compute left-over capacities for Group 2:

$$P_l(t) := P_l^0(t) - \sum_{i \in \text{Group } 1} r_i^*(t), \quad t \in [1, T]$$

where $P_l^0(t)$ are the original resource capacities.

3. Solve QP (with inequality energy constraints) for Group 2 EVs only using the left-over capacities ($P_l(t)$, $\forall l, t \in [1,T]$).

Initially, certain embodiments may serve only Group 2. It is expected that most EVs may be in Group 2 even when Group 1 service is offered in the future.

In certain embodiments, initially, Group 3 EVs may not be served. EVs in Group 3 may be re-assigned to Group 1 or Group 2 for service (e.g., an EV without driver input may be assigned default parameters ($e_i, d_i, \underline{e}_i = 0$) by ACN and sent to Group 2), may be allocated charging separately from Groups 1 and 2 using left-over capacities, or may not be served, based on its subgroup.

Some of the key parameters of these groups are summarized in FIG. 12. As can readily be appreciated, any of a variety of parameters can be utilized in determining charging rates for different groups as appropriate to the requirements of a given application.

Driver Input

Described now are processes for obtaining driver inputs in accordance with various embodiments of the invention. The processes may check if the inputs are valid, determine parameters for rate optimization, and assign an input request to an appropriate group.

Processing EV Inputs

When a new EV arrives, its driver can be expected to input via a user interface on an EVSE or mobile application information (including but not limited to) their energy demand $e_i$, departure time $d_i$, and/or (in when group 1 service is offered) which group they desire. In many embodiments, the inputs can be automatically provided by the EV and/or a remote service that utilizes data analysis and/or machine learning to estimate specific parameters such as (but not limited to) estimated departure time. Irrespective of the manner in which the information is received, some sanity checks may be performed, including:

1. The requested energy $e_i$ is too close to zero (e.g., less than the minimum rate $\underline{r}_i$) or negative, ask the driver to re-enter $e_i$ or assign the EV to Group 3 for further handling.
2. The departure time $d_i$ exceeds optimization horizon T, reset $d_i = T$. This means that an EV may not be charged for a duration longer than T even if the EV stays beyond T.
3. The laxity is negative, i.e., impossible to meet the requested energy even if the EV is charged at its peak rate $\bar{r}_i$ throughout its duration $[1, d_i-1]$ See Laxity and Group Assignment discussion below.

In addition to sanity checks, an ACN may also determine for each new EV request:

1. Its peak charging rate $\bar{r}_i$, e.g., based on driver subscription information, EV make and model, or ACN real-time testing on the EV.
2. Its minimum rate $\underline{r}_i$, e.g., based on EVSE limit, or EV make and model.
3. Its minimum energy demand $\underline{e}_i$, e.g., based on site policy, ACN policy, or user input. This parameter might be changed in the middle of the charging session, e.g., if an EV is re-assigned to a different group.

While specific examples of ways in which data received by the ACN can be validated to assist with the development of viable charging schedules, any of a variety of processes can be utilized to validate data received by the ACN as appropriate to the requirements of a given application in accordance with various embodiments of the invention.

Laxity and Group Assignment

For each new EV 0 request ($e_0, d_0$), the input module should first check its laxity and decide if it should be sent to Group 3, using a process such as (but not limited to) Algorithm 1 illustrated in FIG. 13. This group assignment may be performed on each new EV request. Other group re-assignments may also be needed, e.g., when the remaining energy demand $e_i$ has dropped to (approximately) zero as EV i is served (part of Group 3 design). In many systems, the ACN does not provide any guarantees and there is no Group 1 as described above. Accordingly, the following discussion starts by examining cost functions that can be utilized by ACNs in accordance with a number of embodiments of the invention to allocate charging capacity in the scenario corresponding to Group 2 EVs described above. A variety of cost functions that accommodate different objectives from priority to switching frequency can be utilized. The manner in which an ACN can provide specific guarantees with respect to charging of specific Group 1 EVs is then discussed.

Group 2

This section discusses specializations and modifications of this basic form (1) to implement various features. In several embodiments, the first few features may be implemented by appropriate implementation of the cost function c(r) utilized by the ACN to determine charging rates. The other features may be implemented mainly in the constraints. However, in certain embodiments, cost functions and constraints may not be chosen independently of each other, and it can therefore be important to understand their interactions.

The capacity constraints $(P_l(t), t \in [1,T], \forall l)$ may denote left-over capacities if Group 1 service is offered.

Charge as Close to $E_I$ as Possible

In several embodiments, there may be two ways to charge as close as possible to the specified energy demand $e_i$. The first is to enforce it as a hard constraint:

$$\sum_{t=1}^{T} r_i(t) = e_i$$

This approach may have the disadvantage that the QP can be infeasible, when EVs do not have sufficient laxity or the infrastructure does not have sufficient capacity. This can be used for Group 1 EVs.

A second approach, as in (1), relaxes the equality constraint into an inequality constraint:

$$\underline{e}_i \le \sum_{t=1}^{T} r_i(t) \le e_i$$

This approach may be used for Group 2 EVs. With this inequality constraint, it may be important that the cost function c(r) is decreasing in $\sum_{t=1}^{T} r_i(t)$. Otherwise, minimizing c(r) tends to drive $\sum_{t=1}^{T} r_i(t)$ to $\underline{e}_i$. For example, use $$c_1(r) := \sum_{t=1}^{T} -a_i \sum_i r_i(t) \quad (22)$$

for some constant $a_i > 0$, subject to the inequality constraint (1c).

Charge as Fast as Possible

Using a cost function that is increasing in time t may encourage charging as fast as possible. An example is to modify $c_1(r)$ in (22) into:

$$c_2(r) := \sum_{t=1}^{T} \sum_i (t - d_i) r_i(t) \quad (23)$$

Re-iterating that for each QP instance, t is not the real time but t=1, 2, . . . , T.

This cost function may have the following properties.
1. For $t<d_i$, $(t-d_i)r_i(t)$ is decreasing in $r_i(t)$ and hence it attempts to charge as close as possible to $e_i$ with inequality constraint, as discussed in detail above.
2. For $t>d_i$, $(t-d_i)r_i(t)$ is increasing in $r_i(t)$ and hence it drives r(t) towards zero at times after the specified departure time $d_i$.
3. At time $t=d_i$, $c_2(r)$ is independent of $r_i(d_i)$. At times of congestion, this will drive $r_i(d_i)$ to zero. Otherwise, its value may depend on the QP solver and initial condition. For instance, if the process always initialize $r_i(t)=0$ for all i, t before calling the QP solver, then it is likely that the solution will have $r_i(d_i)=0$.
4. The cost function $c_2(r)$ is increasing in t and hence it encourages charging as fast as possible.

In several embodiments, a cost coefficient should not be $t-a_i$. This factor does not necessarily encourage charging as fast as possible since $t-a_i \ge 0$. It has the effect of giving priority to EVs that arrive earlier.

An alternative to the cost function in (23) is $$c_2(r) := \sum_{t=1}^{T} \sum_i (t - T) r_i(t)$$

Since $t-T \le 0$ and is increasing in t, use of this cost function by an ACN encourages charging as fast as possible and as close to $e_i$ as possible. Note the use of the cost coefficient $t-d_i$ in (23) instead of $t-T$ may not have the effect of prioritizing EVs with earlier (or later) departure times. Implementation using the $t-T$ approach may seem simpler, though the use of $t-d_i$ might offer certain advantages (e.g., drives $r_i(t)=0$ for $t>d_i$). Unless complication arises, certain embodiments may use $t-d_i$. As is discussed below. ACNs in accordance with many embodiments of the invention can further prioritize the charging of specific vehicles by explicitly adding priority constraints to the process for determining charging rates for individual EVs.

Incorporating Priority

Many embodiments may add priority among EVs, e.g., to prioritize EVs that arrive earlier, or EVs that have lower laxity. Certain embodiments may assign different priorities based on a driver paying different amounts for charging a vehicle depending upon the charging rates/guarantees provided by the ACN. For example, a driver may pay extra in order to charge at a higher charging rate. Suppose each EV i has a parameter $a_i$ and, everything being equal, one wishes to charge EV i faster than EV j if $0 \le a_i < a_j$. For example, $a_i$ may be its arrival time, or $a_i$ may be its laxity $$a_i := 1 - \frac{e_i}{(d_i - 1)\bar{r}_i}$$

Suppose the departure time is greater than the current time, $d_i \ge t$, then $a_i \le 1$. Moreover $a_i \in [0,1]$ if and only if it is possible to deliver the requested energy $e_i$ within the available time $d_i-t$, assuming the infrastructure is not constrained. Otherwise, if $a_i<0$ then it is impossible.

To prioritize EVs with smaller $a_i$, the cost function in (23) may be modified to (provided $a_i>0$):

$$c_3(r) := \sum_{t=1}^{T} \sum_i (t - d_i) \frac{1}{a_i} r_i(t)$$

In this way, the cost t can be weighted by a decreasing function of parameter $a_i$. As can readily be appreciated this weighting can be achieved in different ways. The following example illustrates why this may prioritize small $a_i$ over large $a_i$.

Example of Utilization of Charging Priority

Consider charging two EVs 1 and 2 each with an energy demand of $e_1=e_2=1$ unit, over two time periods t=1, 2, i.e., $d_i=T=3$ (not 2). Suppose $a_1<a_2$, i.e, want to prioritize EV 1 over EV 2. Suppose the capacity is 1 unit. The cost is:

$$c_3(r) := \sum_{t=1}^{3} \sum_{i} (t-d_i) \frac{1}{a_i} r_i(t) = -\frac{2}{a_1} r_1(1) - \frac{2}{a_2} r_2(1) - \frac{1}{a_1} r_1(2) - \frac{1}{a_2} r_2(2)$$

and the constraints are:

$r_i(1)+r_i(2)=1$ for $i=1,2$ $r_1(t)+r_2(t) \leq 1$ for $t=1,2$

Substituting $r_i(2)=1-r_i(1)$ into $c_2(r)$ to obtain:

$$c_3(r) := -\frac{2}{a_1} r_1(1) - \frac{1}{a_1}(1-r_1(1)) - \frac{2}{a_2} r_2(1) - \frac{1}{a_2}(1-r_2(1))$$
$$= -\frac{r_1(1)}{a_1} - \frac{r_2(1)}{a_2} - \left(\frac{1}{a_1} + \frac{1}{a_2}\right)$$

Therefore to minimize cost $c_3(r)$, we set $r_1^*(1)=1$ and $r_2^*(1)=0$ since $0<a_1<a_2$ and $r_1^*(1)+r_2^*(1)\leq 1$. The optimal charging profile is $r_1^*(1)=1, r_1^*(2)=0$; and $r_2^*(1)=0, r_2^*(2)=1$ e.g., EVs are charged as fast as possible and EV 1 enjoys a higher priority over EV 2.

Instead of $1/a_i$, many embodiments may also use other decreasing functions of $a_i$ in the cost function. For example, ACNs in accordance with many embodiments of the invention utilize the following cost function $$c_3(r) := \sum_{t} \sum_{i} (t-d_i) f(a_i) r_i(t)$$

where the priority function $f(a)$ is positive and strictly decreasing in a. For example, to prioritize early arrival times $a_i$, we may use $t-a_i$ instead of $1/a_i$. If $a_i$ denotes laxity then a necessary condition for feasibility is $a_i \in [0,1)$ and hence, instead of $1/a_i$, one may use $1-a_i$. The next example illustrates that any decreasing priority $f$ prioritizes EV's with smaller $a_i$.

Additional Example of Prioritized Charging

ACNs in accordance with a number of embodiments of the invention utilize the following more generalized cost function in scenarios similar to those outlined with respect to the example above $$c_3(r) := \sum_{t} \sum_{i} (t-d_i) f(a_i) r_i(t)$$

where the priority function $f(a)>0$ is strictly decreasing in a. One can argue that an optimal solution may need to satisfy $r_1(t)+r_2(t)=1$ for t=1, 2. Substitute $r_2(r)=1-r_1(t)$ into $c_3(r)$, provides $$c_3(r) := \sum_{t=1}^{3} ((t-d_1)f(a_1)r_1(t) + (t-d_2)f(a_2)r_2(t))$$

$$= \sum_{t=1}^{2} (t-d_1)f(a_1)r_1(t) + (t-d_2)f(a_2)(1-r_1(t)))$$

$$= \sum_{t=1}^{2} (f(a_1)-f(a_2))tr_1(t) + (d_2 f(a_2) - d_1 f(a_1)))$$

$$\sum_{t=1}^{2} r_1(t) + \sum_{t=1}^{2} (t-d_2)f(a_2)$$

The last two terms may be constant. If $a_1<a_2$ then $f(a_1)-f(a_2)>0$ since $f$ is decreasing, and hence the first term is increasing in t. This drives $r_1(t)$ to be as large as possible for small t, i.e., $r_1(1)=1$, $r_1^*(2)=0$. Hence the optimal charging profile remains $r_1^*(1)=1, r_1^*(2)=0$; and $r_2^*(1)=0, r_2^*(2)=1$ In various embodiments, to avoid numerical issues, in the cost function $c_3$, the unit of $a_i>0$ should be chosen so that the cost coefficients $(t-d_i)/a_i$ are not exceedingly large or exceedingly small relative to each other, or within a reasonable range, e.g., the range of $10^{-4}$ and $10^4$ if possible. In this way, an ACN can use a constant weight $\alpha>0$ to bring $(t-d_i)/a_i$ within a reasonable range:

$$c_3(r) := \sum_{t=1}^{T} \sum_{i} (t-d_i) \frac{\alpha}{a_i} r_i(t) \quad (24)$$

While many of the ACNs described above utilize cost functions that enable the utilization of charging rates that provide priority to particular EVs, ACNs in accordance with several embodiments of the invention utilize processes that accommodate a variety of other objectives.

Reducing Temporal Fluctuation

In many embodiments, it may be desirable to reduce rate fluctuations over a charging time period. This may be to reduce the wear and tear on a vehicle. Accordingly, it may be desirable to reduce rate fluctuations $r_i(t)$ across t. In several embodiments, this can be achieved by penalizing the squared differences $(r_i(t)-r_i(t-1))^2$ of the rates by utilizing a cost function $c_2(r)$ that replaces the cost function in (23) with:

$$c_4(r) := \sum_{i} \left( \sum_{t=1}^{T} (t-d_i) r_i(t) + \beta \sum_{t=1}^{T} (r_i(t) - r_i(t-1))^2 \right) \quad (25a)$$

or replaces $c_3(r)$ in (24) with:

$$c_4(r) := \sum_{i} \left( \sum_{t=1}^{T} \frac{(t-d_i)\alpha}{a_i} r_i(t) + \beta \sum_{t=1}^{T} (r_i(t) - r_i(t-1))^2 \right) \quad (25b)$$

where $r_i(0)$ is the actual charging rate used in the last QP instance, and $\alpha>0$ and $\beta>0$ are weights.

In many embodiments, a QP at each time s may solve for the entire charging profile $r^*(t):=(r_i^*(t), i \in [1,n])$ for t=s, s+1, ..., s+T. Only the first rates $r^*(s)$ of an optimal solution $r^*$ of the QP may be used for charging the EVs. An updated QP may then be solved at time s+1 and the cycle repeats. It may be beneficial to that the first rates $r^*(s)$ do not fluctuate widely across different QP instances that are solved at different times. The cost function (24) attempts to reduce the temporal fluctuation of the solution to a single QP instance. Even though this is different from reducing fluctuations across different QP solutions, it may achieve the desired effect.

An alternative to the penalty term $\Sigma_{i,t}(r_i(t)-r_i(t-1))^2$ is $\Sigma_{i,t}(r_i(t))^2$. Both may reduce temporal fluctuation in $r_i$. The penalty term $\Sigma_{i,t}(r_i(r))^2$ has the advantage of making the QP cost function $c_3(r)$ strictly convex (and hence has a unique optimal solution). It may work well with the equality constraint on energy:

$$\sum_{t=1}^{T} r_i(t) = e_i$$

but not with the inequality constraint:

$$e_i \le \Sigma_{t=1}^{T} r_i(t) \le \bar{e}_i$$

Hence many embodiments may use $\Sigma_{i,t}(r_i(t)-r_i(t-1))^2$. Although the above describes a variety of mechanisms for modifying a cost function to reduce temporal fluctuations, any of a variety of mechanisms may be utilized as appropriate to the requirements of specific applications in accordance with various embodiments of the invention. Certain other features that may be implemented using cost functions are described below.

Enforcing Minimum Charging Rates

In general, it may be undesirable to set a charging rate to zero before an EV has finished charging because this may cause the mechanical contact in the charger to open. A charging profile $r_i(t)$ with many zero and nonzero rates before the EV finishes charging may incur excessive wear and tear. To avoid this, several embodiments may set charging rates $r_1(t) \ge \underline{r}_i$ for some $\underline{r}_i$ greater than zero, as long as the energy demand $e_i > 0$. For example, $\underline{r}_i = 8A$ for constant charge (CC) chargers or $\underline{r}_i = 6A$ in J1772 standard. Note that, if the unit of charging rate $r_i(t)$ is in W, then $\underline{r}_i = 6 \text{ v W}$ at voltage level v V. To simplify exposition, certain embodiments often assume $r_i(t)$ is in A.

Since each QP may compute for every EV i an entire charging profile $r_i^* := (r_i(t), t \in [1,T])$ but only the first rate $r_i^*(1)$ may be executed, it may be conservative to impose the constraint that all future rates $r_i(t) \ge \underline{r}_i$ for $t > 1$, and also increases the chance that the QP becomes infeasible. Several embodiments impose only $r_i(1) \ge \underline{r}_i$ and post-process the future rates, as described in Algorithm 2 below.

A comparison of Algorithm 2 illustrated in FIG. 14 with the basic QP in (1) is described below.
1. The constraint (1b) on the charging rates in the basic QP is separated into two constraints (14A-2)(14A-3) in Step 1 of Algorithm 2 illustrated in FIG. 14, the first on rates $r(1) := (r_i(1), i \in [1,n])$ at time $t=1$ that enforces the minimum rate r and the second on future rates $r(t), t > 1$. As explained above, many embodiments do not impose the minimum rate on future rates.
2. Step 2 of Algorithm 2 post-processes the QP solution r* by choosing a rate r** that is as close to r* as possible, subject to the constraints that all rates r(t), $t=1, 2, \ldots, T$, are equal or higher than their minimum rates and that capacity limits are not exceeded. Notably, the energy requirements are relaxed. It means that the energy delivered by the charging profile r may not be as close to $e_i$ as possible or may even exceed $e_i$, but one expects this effect to be negligible.

Implementation

The problem (14B) is separable in t, and hence the subproblem for each t can be solved separately in parallel:

$$\min_{r(t)} \quad \sum_i (r_i(t) - r_i^*(t))^2$$
$$\text{s.t.} \quad r_i^{min}(t) \le r_i(t) \le \bar{r}_i(t), \quad i \in [1, n]$$
$$\sum_i A_{li} r_i(t) \le P_l(t), \quad \forall l$$

Even if these (much smaller) t-subproblems are solved sequentially, the computation seems to be faster than solving the overall problem (14B). Moreover, solving these t-subproblems separately helps handling infeasibility. Therefore, many embodiments solve them separately.

Discrete Rates.

If the charging rate for EV i can only take values in a discrete set $R_i$, e.g., CC chargers can charge at rates in $R_i := \{6A, 12A, 18A, 24A, 30A, 36A\}$. The final charging rates can be obtained from the solution of Algorithm 2 by rounding down to the nearest value in $R_i$:

$$r_i^{*}(t) := \lfloor r_i^{}(t) \rfloor_{R_i}$$

Simply rounding down may underutilize capacity if the gap between the discrete values is large compared with the capacity. In that case, a more sophisticated algorithm can be used to map $r_i^{**}(t)$ to a value in $R_i$.

Handling Infeasibility

Certain embodiments may assume throughout that $0 \le \underline{r}_i \le \bar{r}_i$, $\underline{r}_i < e_i$, and $0 \le \underline{e}_i \le e_i$, so that (14A-2)-(14A-4) can always be satisfied individually. Furthermore, assume $\bar{r}_i(d_i-1) \ge \underline{e}_i$, i.e., if each EV i is charged at its peak rate $\bar{r}_i$ over its entire charging horizon, then its minimum energy $\underline{e}_i$ demand is always met.

Described now is how an ACN can handle the infeasibility of QP (14A) in Algorithm 2 illustrated in FIG. 14, and then the infeasibility of the post-processing problem (14B). Informally, the QP (14A) in Algorithm 2 can be infeasible when the minimum energy demand $\underline{e}_i$ in (14A-4) cannot be met for some EV i, or when some capacity constraint in (14A-5) is violated at some resource l. Certain embodiments deal with this by setting $$\underline{r}_i := 0 \text{ and } \underline{e}_i := 0$$

in (14A-2) and (14A-4) respectively. The constraints (14A-2)-(14A-5) can then be satisfied jointly (e.g., setting $r_i(t)=0$ for all i,t). Note that this may not guarantee minimum energy delivered for this QP instance. In certain embodiments, this can be refined by allowing some $\underline{e}_i$ to remain nonzero, e.g., to guarantee all EVs 15 miles of charge or 15% of their requested energy. It also may not guarantee $r^*(1) \ge \underline{r}_i$ but this is handled in the post-processing step.

The post-processing problem can be solved by solving each t-subproblem separately. Recall that it is assumed $A_{li} \in \{0, 1, -1\}$ in general. If $A_{li} \ge 0$, then a way a t-subproblem can be infeasible is when even setting $r_i(t) = \underline{r}_i$ for all i will violate (14A-5) at some resource l, i.e., $$\sum_l A_{li} r_i^{min}(t) > P_l(t) \quad (26)$$

where $|S_l|$ is the number of EVs sharing resource l. In this case, some EV i may be assigned a rate lower than $\underline{r}_i$ in order not to violate the capacity constraint. This means that some EVs may be charged at rate $r_i$ and others at zero. Certain embodiments may prioritize based on laxity by calling Algorithm 3, as illustrated in FIG. 15.

Even though Algorithm 3 illustrated in FIG. 15 is motivated by the case where $A_{li}=0$ or 1, it can ensure that the capacity constraints may be satisfied even when $A_{li}$ can take value −1. Indeed, providing $$\sum_i A_{li} r_i(t) \leq \sum_i |A_{li}| r_i(t) \leq \max_i r_{-i} i_0 \leq P_l(t), \quad \forall l$$

It may be simple, but conservative since $i_0$ can be chosen based on $\max_i r_i$ and independently of the group of EVs that share a constraint. It also does not exploit the fact that t may exceed $\tau_i$ in which case $r_i^{min}(t)=0$. In certain embodiments, if this scenario is only rarely encountered, a simple algorithm should be sufficient. Otherwise, the algorithm can be tightened to be more efficient.

For some EVs, once their rates are set to zero, they may not recover (i.e., they may not resume charging until they are unplugged and plugged in again). Since this may negatively impact user experience, many embodiments may avoid the situation where a resource constraint might be violated even if all EVs are charged at their minimum rates when a deployment is sized and if it participates in a demand response program.

In summary, certain embodiments may modify Algorithm 2 illustrated in FIG. 14 above by adding a mechanism to handle infeasibility and this is given as Algorithm 4 illustrated in FIG. 16.

Providing Guarantees (Supporting Group 1 EVS)

In many embodiments, EVs may be grouped into different groups that provide different charging rates based on a variety of factors. For example a driver may pay to have a higher charging rate (in order to reduce the time needed to charge their vehicle). Other factors may include reducing the charging rate for a vehicle that is expected to be parked for a longer duration of time and thus provide more charge to other vehicles that are expected to be parked for a shorter time period. In several embodiments, the groups may include a prioritized group (e.g. a Group 1), where the defining feature of the prioritized group is that EV i is guaranteed its requested energy $e_i$ (up to a measurement error margin) under normal conditions. This is why Group 1 may have strict priority over Group 2 and/or lower priority groups and why it is expected most EVs may be in Group 2 that guarantees only minimum energy $\underline{e}_i \geq 0$, but not requested energy $e_i$.

Algorithms that provide guarantees for certain EVs can be characterized in that they:

1. Enforce equality energy constraint for each EV i in Group 1:

$$\sum_{t=1}^{T} r_i(t) = e_i$$

instead of the inequality constraints for Group 2.

2. In certain embodiments, in order to avoid infeasibility, perform admission control before a new EV i can be admitted to Group 1. The purposes of the admission control may be to guarantee:

(a) the requested energy $e_j$ of all existing Group 1 EVs j.

(b) the minimum energy $\underline{e}_j \geq 0$ of all existing Group 2 EVs j.

Described below are various charging algorithms that can be utilized by ACNs to determine charging rates for Group 1 EVs in accordance with certain embodiments, and then various processes that ACNs can utilize for admitting EVs into Group 1.

Charging Algorithm

A charging algorithm for Group 1 (only) may be QP followed by post-processing to enforce minimum rates $\underline{r}_i$. A charging algorithm for Group 1 in accordance with various embodiments of the invention is given in Algorithm 5 illustrated in FIG. 17. It can be the same as Algorithm 2 for Group 2 illustrated in FIG. 14, except that the inequality energy constraints (14A-4) may replaced by equality energy constraints.

An important assumption for the Group 1 algorithm is that, throughout the ACN execution, all existing Group 1 and Group 2 EV requests can be guaranteed, as long as resource capacities $P_l^0(t)$ (and other ACN conditions) remain unchanged. In that case, both the QP (17A) and the post-processing problem (17B) may always be feasible. Furthermore, conditions can change in unexpected ways, and therefore certain embodiments add mechanisms to Algorithm 5 illustrated in FIG. 17 to handle infeasibility (c.f. Algorithm 4).

Admission Control

Certain embodiments may control admission of an EV to an ACN based on the current profile of the ACN, including its existing EVs charging demands, the ACN's capacity, among a variety of other factors. Assuming the laxity of the new EV 0 request $(e_0, d_0)$ has already been checked by Algorithm 1 illustrate in FIG. 13, before the admission to Group 1 is determined. The admission control may be implemented by Algorithm 6 illustrated in FIG. 18 and FIG. 19. Certain embodiments may handle differently new EV requests to Group 1 that have been rejected by the admission control Certain embodiments may repeatedly ask the driver to re-enter their parameter $(e_0, d_0)$ until it is admitted to Group 1, or a maximum number of tries are reached. In certain embodiments, the ACN may suggest a departure time $d_0'$ so that $(e_0, d_0')$ can be admitted, or suggest an energy level $e_0'$ so that $(e_0', d_0)$ can be admitted. Note an alternative to admission control is not to have drivers specify both $e_i$ and $d_i$, but only one of them and ACN may decide the other parameter so that the new request can always be admitted to Group 1. In certain embodiments, an ACN may assign the request $(e_0, d_0)$ to Group 2 with appropriate parameter $\underline{e}_i \geq 0$. In several embodiments, the ACN may assign it to Group 3 and not serve it until subgroups are defined and implemented. As can readily be appreciated, any of a variety of admission control processes can be utilized by an ACN as appropriate to the requirements of a given application in accordance with various embodiments of the invention.

Handling Infeasibility for QP Implementations

In many embodiments, ACNs can utilize a variety of processes to determine charging rates for EVs when requested charging parameters provided with respect to the EVs would otherwise yield an infeasible QP. In several of these embodiments, the basic features of a QP implementation may include the following:

1. Each subscriber (EV driver) may input energy demands (e.g., must-have miles) and departure time, among others.
2. During registration, each subscriber may also set a willingness to pay for nice-to-have miles. After the must-have miles have been delivered to the subscriber, energy may be delivered to the EV when the current energy price is lower or equal to the willingness to pay.
3. A price ($/kWh) may be computed dynamically in real time (e.g., every minute). A subscriber may pay the energy delivered multiplied by the price, for both must-have miles and nice-to-have miles, regardless of her willingness-to-pay.
4. Charging rates may be computed using the QP with a cost function that is the weighted sum of three components:

$$c(r) := w_1 c_1(r) + w_2 \sum_{i,t} (r_i(t) - r_i(t-1))^2 + w_3 \sum_{i,t} r_i^2(t)$$

where $w_i > 0$ are nonnegative weights and
The first component $c_1(r)$ is a measure of performance, e.g., to charge as fast as possible, to minimize expected energy payment, or to track forecast scaled solar generation $\sigma(t)$, e.g., $c_1(r) := \sum_t (\sum_i r_i(t) - \sigma(t))^2$.
The second component is to reduce temporal fluctuation in charging rates.
The third component is to make the cost function strictly convex so that the optimal charging rates $r^*(t)$ are unique.
5. EVs are divided into two groups:
Group 1: EVs whose must-have miles have not been fully delivered.
Group 2: EVs whose must-have miles have been fully delivered, and may receive nice-to-have miles when the dynamic prices do not exceed their willingness to pay.
Group 1 EVs have strict priority over Group 2 EVs.
6. At time t when QP is computed:
(a) All Group 1 EVs will be included in QP computation at time t, regardless of the current price p(t).
(b) A Group 2 EV will be included in QP computation if and only if its willingness-to-pay for nice-to-have miles is higher or equal to the current price p(t) (and the QP is feasible; see below).
(c) All EVs that are scheduled for charging at time t will pay at price p(t), regardless of their willingness to pay for Group 2 EVs.
7. The QP computation can be implemented as follows:
(a) Solve QP with:
equality energy constraints for all Group 1 EVs.
inequality energy constraints for all Group 2 EVs that are included in scheduling.
(b) If the QP is feasible, then it will produce charging rates for the next control period (e.g., next minute) for all Group 1 EVs and those Group 2 EVs that are included in scheduling for that control period.
(c) Handling Infeasibilty. If the QP is infeasible, then solve QP again with only Group 1 EVs and inequality energy constraints. Notify Group 1 EVs whose energy demands are forecast not to be met fully.

Handling Infeasibility: Deadline Extension

When QP is infeasible, certain embodiments may only schedule Group 1 EVs. Instead of changing all their energy constraints from equalities to inequalities many embodiments can extend their deadlines (charging durations) to make QP feasible, and notify the drivers that they may have to stay longer to receive fully their must-have miles, or receive less energy at their original departure times.

Described now are two processes utilized in many ACNs that can be used to determine new deadlines for EV charging in the face of infeasibility of originally requested deadlines. The first algorithm scales up all EV durations by a common factor. It does not involve discrete variables but requires binary search over QP's. The second algorithm adds dwell times to the EVs in a way that minimizes weighted sum of the additional times. The weights allow the implementation of different priorities among these EVs. It involves binary variables (which may be computationally expensive) and thus certain embodiments may provide an algorithm that relaxes the integer constraints.

Scale all Durations by a Common Factor

Recall that the departure time $d_i$ is incorporated into the maximum charging rate $\bar{r}_i(t)$, by setting $\bar{r}_i(t)=0$ for $t \geq d_i$. Then the constraints $$r_i(t) \leq \bar{r}_i(t), t \in [1,T], i \in [1,n] \quad (27)$$

can ensure that the QP will not charge EVs i after their specified departure times. Here, t=1 denotes the current time when the QP is called, and $d_i - 1$ denotes the duration over which EV i is available for charging from time t=1 (current time) to time $t = d_i - 1$.

When QP is infeasible, certain embodiments may extend the durations of all EVs by a common scaling factor $\gamma > 1$ so that QP becomes feasible with equality energy constraints. The following algorithm attempts to determine a minimum such $\gamma$.

Let $d := (d_i, \forall i)$ denote the vector of EV durations. Let $\gamma d$ denote the vector of durations scaled by $\gamma > 1$ but upper bounded by T, i.e., $$\gamma d := (\min(\gamma d_i, T), \forall i)$$

Consider the QP that include only Group 1 EVs with equality energy constraints, and suppose it takes the form:

$$QP(\gamma d) : \min_r c(r) \text{ s.t. } r \in \mathcal{R}(\gamma d) \quad (28)$$

Here, $\mathcal{R}(\gamma d)$ denotes the feasible set for the charging rates r, as a function of the scaled durations $\gamma d$. Therefore the QP is a function of $\gamma d$, and this dependence is emphasized by the notation $QP(\gamma d)$. The algorithm will do a binary search (or other appropriate search) on $\gamma$ until $QP(\gamma d)$ becomes feasible.

Assumption:
The QP when the durations of all EVs are T is feasible with equality energy constraints.

The algorithm is described in Algorithm 6 illustrated in FIGS. 17 and 18 and described below.

Addition of Heterogenous Dwell Times to Cost Function

In certain embodiments, the (original) departure times and the maximum charging rate conditions are combined into a single set of constraints (27). To specify the second algorithm to extend durations, (27) may be replaced by two separate set of constraints:

$$r_i(t) \leq \bar{r}_i(t), t \in [1, d_i - 1], i \in [1,n] \quad (29a)$$

$$r_i(t) = 0, t \in [d_i, T], i \in [1,n] \quad (29b)$$

where $\hat{r}_i(t)$ are the upper bounds on charging rates of EVs i at time t, e.g. due to EVSE or EV limits. Note that $\hat{r}_i(t)$ are given constants. Suppose the QP takes the form:

$$\min_r c(r) \text{ s.t. } r \in \mathcal{R}, \quad (29)(30)$$

Here $r \in \mathcal{R}$ denote all QP constraints that do not involve the durations d, including the equality energy constraints. The deadline constraints are given by (29).

To add to the durations $d_i$, we introduce binary variables $x_i(t)$, one for each time $t=d_i, \ldots, T$, and each EV i. This adds a total of $\Sigma_i(T-d_i+1)$ binary variables. If $t \geq_d$ is an additional dwell time (i.e., before the new deadline), then $x_i(t)=1$; otherwise, $x_i(t)=0$. Hence if $x_i(t)=0$ (i.e., r is after the new deadline), then $x_i(s)=0$ for all subsequent times $s \geq t$. The constraints (29) are replaced by (note by our convention, $x_i(T)=0$ even though this is not enforced in (31).)

$$r_i(t) \leq \hat{r}_i(t), \, t \in [1, d_i-1], i \in [1, n] \quad (31a)$$

$$r_i(t) \leq \hat{r}_i(t)x_i(t), \, t \in [d_i, T], i \in [1, n] \quad (31b)$$

$$x_i(t+1) \leq x_i(t), \, t \in [d_i, T-1], i \in [1, n] \quad (31c)$$

$$x_i(t) \in \{0,1\}, \, t \in [d_i, T], i \in [1, n] \quad (31d)$$

Condition (31b) says that if $t \geq d_i$ is an additional dwell time ($x_i(t)=1$) then the rate $r_i(t)$ is upper bounded by $\hat{r}_i(t)$; otherwise ($x_i(t)=0$), $r_i(r)$ is set to zero. Condition (31c) says that if $t \geq d_i$ is not an additional dwell time (i.e., $x_i(t)=0$) then all subsequent times will not be additional dwell times. This ensures that all rates are set to zero after the new deadline. Note that it is possible to choose $x_i(t)=1$ and $r_i(t)=0$, i.e., time t is before the new deadline even though QP chooses not to charge EV i at time t.

Algorithm

When the QP (30) with original deadlines d is infeasible, certain embodiments may solve the following problem (with only Group 1 EVs and equality energy constraints):

$$\min_{r,x} \sum_i w_i \sum_{t=d_i}^{T} x_i(t) \text{ s.t. } r \in \mathcal{R}, \quad (31)(32)$$

Note that the optimization is over both the charging rates r and the binary variables $x:=(x_i(t), t \in [d_i, T], i \in [1, n])$. The sum $\Sigma_{t=d_i}^{T} x_i(t)$ represents the additional dwell time added to EV i's duration. The optimization (32) therefore minimizes the weighted sum of additional dwell times subject to the same set of constraints as the original QP as well as constraints (31) discussed above. An optimal solution may provide both feasible charging rates r and the new durations (deadlines) $d_i^{new}$ for Group 1 EVs:

$$d_i^{new} := d_i + \sum_{t=d_i}^{T} x_i(t) \quad (33)$$

A bigger weight $w_i$ for EV i means its deadline will be extended by a smaller amount. Hence the weights $w_i$ can be chosen to implement priorities, e.g., an EV that arrived earlier or has a greater laxity can be assigned a bigger $w_i$ and hence will incur a smaller deadline extension.

Since both the cost function and the constraints in (32) are linear, the optimization is a mixed integer linear program (MILP). Certain embodiments, can relax the binary constraints (31d) to [0,1]-interval constraints:

$$x_i(t) \in [0,1], t \in [d_i, T], i \in [1, n] \quad (34)$$

Instead of (32), certain embodiments solve the following linear program $$\min_{r,x} \sum_i w_i \sum_{t=d_i}^{T} x_i(t) \text{ s.t. } r \in \mathcal{R}, (31a)(31b)(31c), (34) \quad (35)$$

Given an optimal solution (r,x) of (35), certain embodiments may need to discretize $x_i(t)$ to either 0 or 1 in order to calculate the new durations $d^{new}$ using (33).

In summary, the ACN can solve the MILP (32) if it is computationally manageable. Otherwise, the ACN can use Algorithm 7 illustrated in FIG. 20 and described below.

Even though the charging rates produced by (35) in Step 1 of Algorithm 7 are feasible for the new durations $d^{new}$, certain embodiments may re-compute QP($d^{new}$) in Step 4 to obtain a potentially better set of charging rates.

Online Linear Program

Described now is an LP that is to be constructed and solved at computation time 0 to compute charging rates r(t) over time window $t \in [1, T]$.

1. The decision variable is the vector of charging rates $r:=(r_i(t), i \in [1, n], t \in [1, T])$ for all active EVs i over the time window [1, T]. This is an nT-dimensional vector.
2. The simplest linear cost function is $$\sum_i \left( e_i - \sum_{t=1}^{T} r_i(t) \right)$$

Here, $(e_i - \Sigma_{t=1}^{T} r_i(t))$ is the unmet energy demand of EV i by the end of the time window [1, T]. Hence this cost function minimizes the total unmet demand of all active EVs. Note that, in minimizing this cost, it is possible that the optimal charging rates r deliver more energy than the EVs have requested, i.e., $(e_i - \Sigma_{t=1}^{T} r_i())<0$ at optimality. If this is undesirable, certain embodiments can include the constraints:

$$\sum_{t=1}^{T} r_i(t) \leq e_i, i \in [1, n]$$

This will ensure that no more than the requested energy $e_i$ is delivered. Since $\Sigma_i e_i$ is a constant, it can be dropped from the cost function, i.e. we can equivalently minimize the cost $$-\sum_i \sum_{t=1}^{T} r_i(t)$$

or, maximizing the total energy delivered to all active EVs.
3. There may be several constraints on the charging rates r.

Rates do not exceed their max rates:

$$0 \leq r_i(t) \leq \bar{r}_i(t), \text{ for all } i \in [1,n], t \in [1,T] \quad (36)$$

By setting $\bar{r}_i(t)=0$ for $t>d_i$, constraint (36) also enforces $r_i(t)=0$ for $t>d_i$, i.e., do not charge after EV i's declared departure time.

Capacity constraints of the form $$\sum_{i \in S_l} r_i(t) \leq P_l(t), \text{ for all resources } l, t \in [1, T]$$

In summary, the simplest version of LP that an ACN can solve at time 0 is:

$$\min_r - \sum_i w_i \sum_{t=1}^T r_i(t) \quad (37a)$$

subject to $0 \leq r_i(t) \leq \bar{r}_i(t), \quad i \in [1, n], t \in [1, T] \quad (37b)$ $$\underline{e}_i \leq \sum_{t=1}^T r_i(t) \leq e_i, \quad i \in [1, n] \quad (37c)$$

$$\sum_{i \in S_l} r_i(t) \leq P_l(t), \quad t \in [1, T], \text{ for all } l \quad (37d)$$

Figure 21:
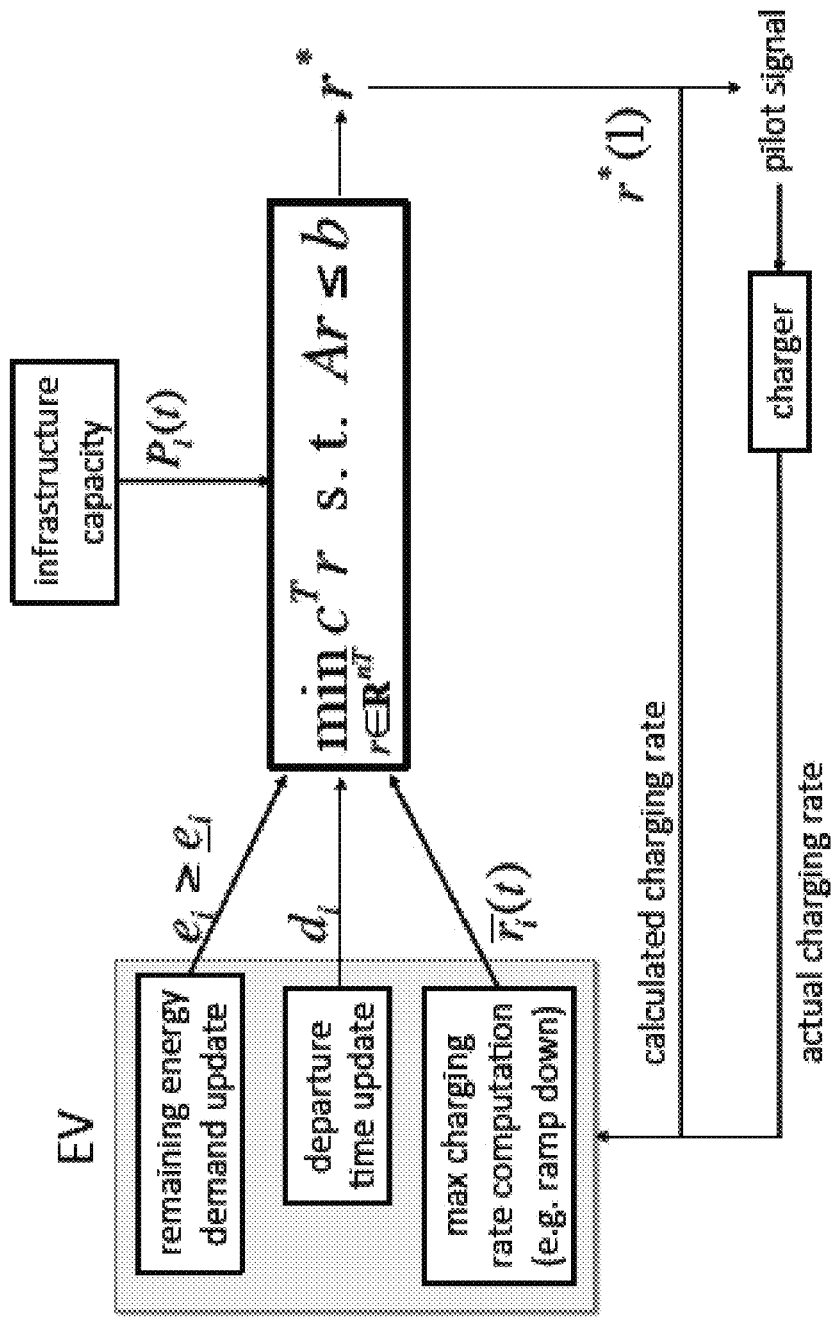
FIG. 21 illustrates a structure of a basic online LP for EV charging in accordance with an embodiment of the invention.

This is illustrated in FIG. 21, which illustrates a structure of an online LP for EV charging.

Certain modifications to two aspects from the processes described above have been made. First, weights $w_i$ are included in the objective (37a). This can be used to implement priority when it is not possible to satisfy every EV's energy demand by their deadlines: online LP favors EVs with larger weights $w_i$. When it is possible to satisfy every EV's energy demand, the weights $w_i$ have no effect and $\Sigma_t r_i(t) = e_i$ for all EVs i.

Second, a lower bound $\underline{e}_i$ on the energy delivered to EV i is included in (37c). This is a service-level guarantee (minimum energy delivered). If $\underline{e}_i=0$ for all EV i, then there is no guarantee and the LP (37) will also be feasible, e.g., $r_i(t):=0$ for all i,t is a feasible solution. Otherwise, it is possible that (37) is infeasible, but when online LP is feasible in every computation period, then every EV i will get a minimum amount $\underline{e}_i$ of energy by the end of time T. In many embodiments, the st function utilized by an ACN can vary based upon a variety of factors including (but not limited to) time of day, cost of energy, actual and/or anticipated available capacity, number of EVs, and charging parameters requested with respect to specific EVs.

Product Features and LP Extensions

The online LP framework of many embodiments is very versatile. Different product features can be implemented within this framework, e.g., by choosing different cost functions, different minimum energy guarantees $\underline{e}_i$, different constraints $P_l(t)$, and/or different max charging rates $\bar{r}_i(t)$. Described below are some of these features in accordance with various embodiments of the invention.

Infrastructure Protection

Consider the scenario:
The infrastructure capacity of the site is (a constant) $\bar{P}$.
an ACN shares this capacity with some background (non-EV) load.
an ACN measures in real time the background load at the computation period r=0; denote it by $L_0$.

Many embodiments ensure that the total background load plus the total EV load do not exceed P.

To construct the framwework in the computation period 0, the main task is to forecast the background load over the (future) time window [1,T]. Let $\hat{L}(t)$ denote the forecast background load for $t \in [1,T]$. In the simplest case, certain embodiments assume future background load remains the same as the current background load:

$$\hat{L}(t) := L_0, t \in [1,T]$$

If historical data on background load is available, then set the forecast $\hat{L}(t)$ to be its historical value (e.g., the average value over the last week, perhaps depending on day of the week).

Using the forecast $\hat{L}(t)$, certain embodiments can prevent overloading the infrastructure by adding to (or replacing some of) the constraints (37d) (by) the following constraint:

$$\sum_i r_i(t) \leq \bar{P} - \hat{L}(t), \quad t \in [1, T] \quad (38)$$

This ensures that the EV load plus the forecast background load do not exceed the infrastructure capacity. This is illustrated in FIG. 21, which illustrates a structure of online LP for infrastructure protection and load shifting in accordance with various embodiments of the invention. Although FIG. 21 illustrates a particular structure of an online LP for EV shifting, any of a variety of structures may be utilized as appropriate to the requirements of specific applications in accordance with various embodiments of the invention.

Demand Response: Load Shifting/Tracking

Consider a same scenario as described above where an ACN shares the same capacity with some background load, and $\hat{L}(t)$ denotes the forecast background load in the future based on historical data and/or real-time measurement of the current background load.

Load Shifting:

Cap the total site load to D(t) over $t \in [t_1, t_2]$. For example, an DR event is to maintain the total site load below or at 1 MW from 1 pm to 4 pm today. This feature can be implemented in online LP, as illustrated in FIG. 22, by adding to (or replacing some of) the constraints (37d) (by) the following constraint:

$$\sum_i r_i(t) \leq \min\{\bar{P}, D(t)\} - \hat{L}(t), \quad t \in [t_1, t_2]$$

Figure 22:
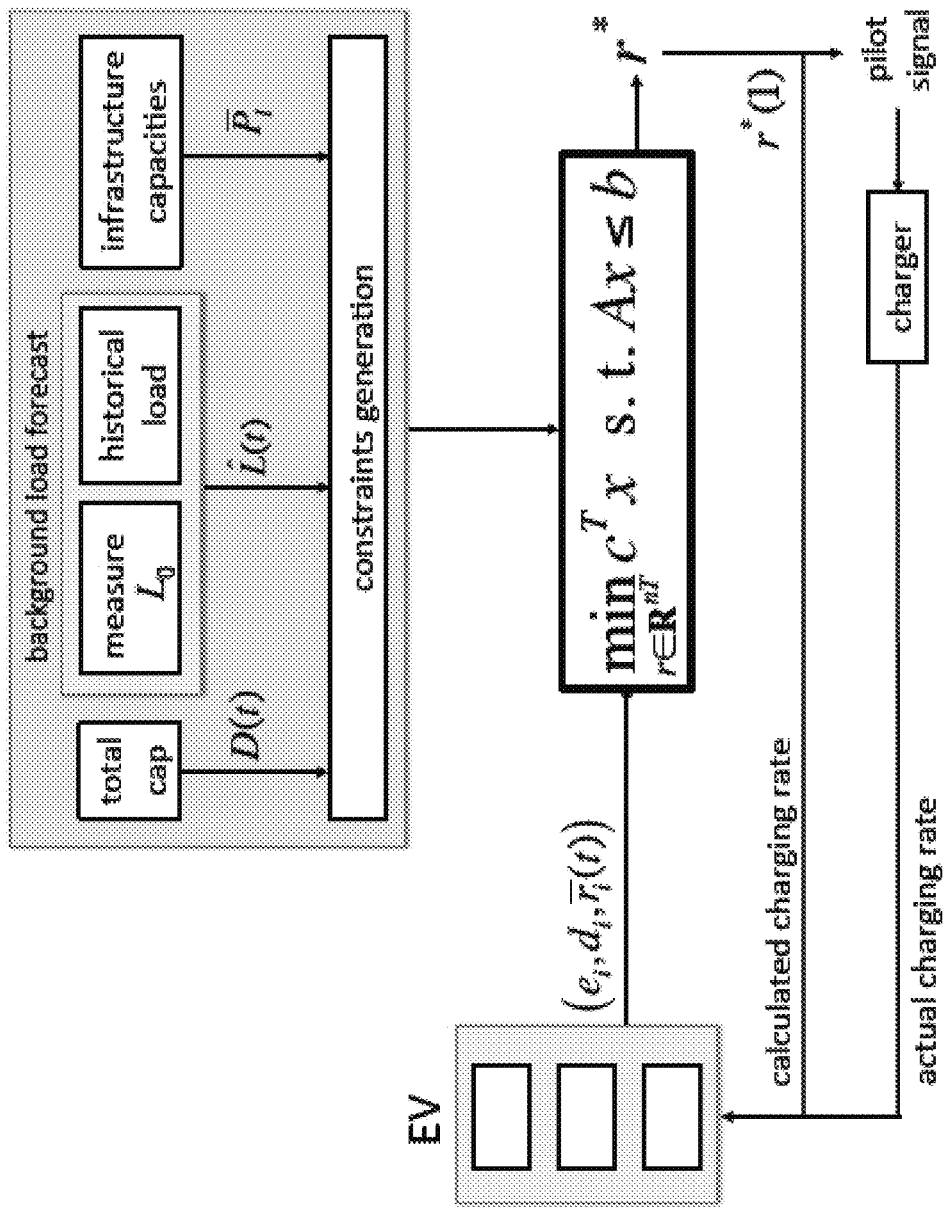
FIG. 22 illustrates a structure of online LP for infrastructure protection and load shifting in accordance with an embodiment of the invention.

This is illustrated in FIG. 22, which illustrates the structure of an online quadratic program for load tracking. Although FIG. 22 illustrates a particular structure of an online QP for load tracking, any of a variety of structures may be utilized as appropriate to the requirements of specific applications in accordance with various embodiments of the invention.

Load Tracking:

Have the total site load track a given profile D(t) over $t \in [t_1, t_2]$. This feature can be implemented by replacing the cost (37a) by the following cost (or adding to the cost):

$$\sum_{t=1}^T \left( \sum_i r_i(t) + \hat{L}(t) - D(t) \right)^2$$

Figure 23:
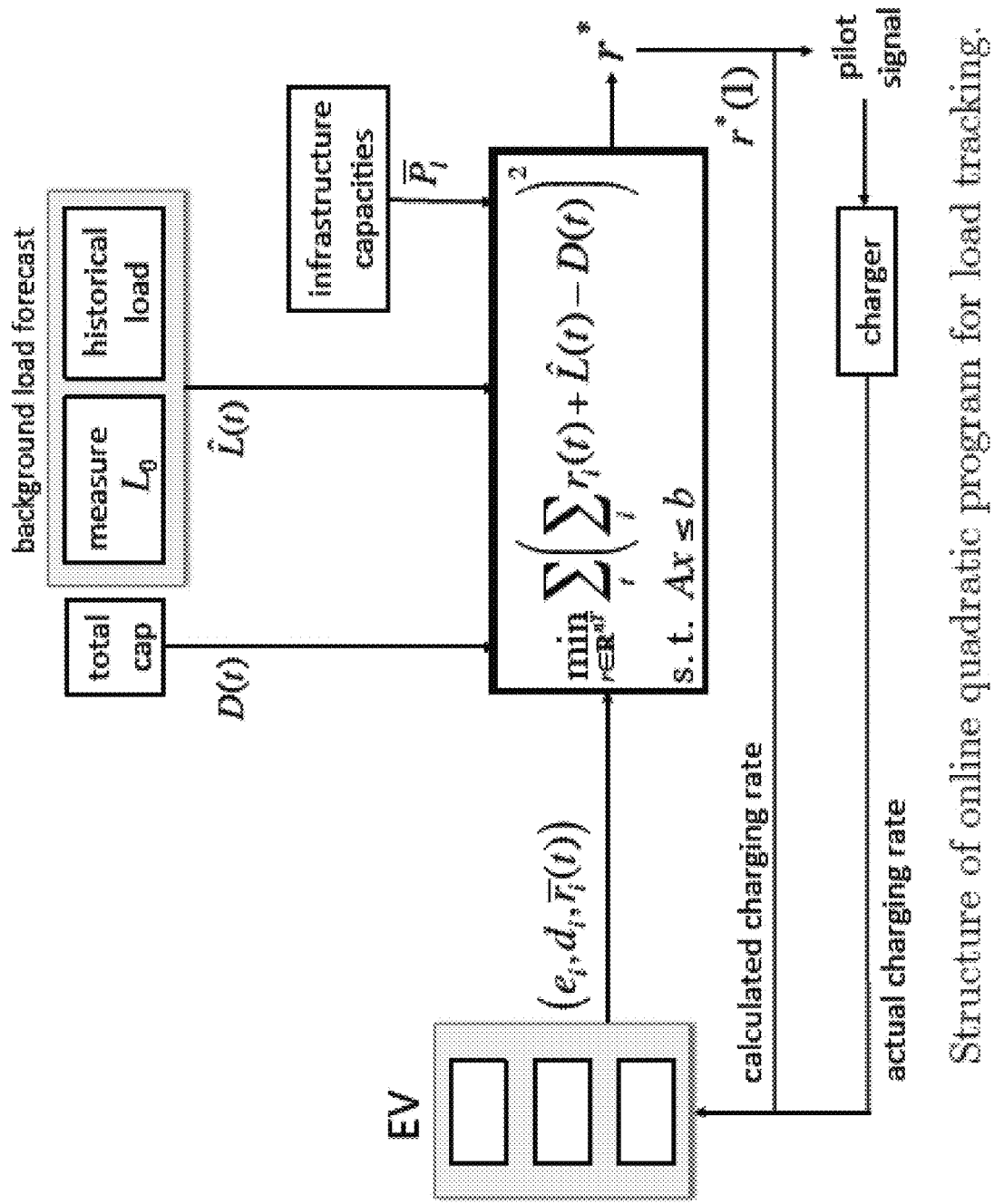
FIG. 23 illustrates a structure of quadratic program for load tracking in accordance with an embodiment of the invention.

In this case, the constraint (38) should be included in (37d) to ensure the background load and the EV load does not exceed the infrastructure capacity. Note that in this case, the objective is no longer linear and hence the problem is not an LP. It is a simple (convex) quadratic program and can still be efficiently solved. This is illustrated in FIG. 23, which illustrates a structure of online quadratic program for load tracking in accordance with various embodiments of the invention. Although FIG. 23 illustrates a particular structure of an online quadratic program for load tracking, any of a variety of structures may be utilized as appropriate to the requirements of specific applications in accordance with various embodiments of the invention Priority Charging Priority charging can be important. e.g., to coordinate between DCFC and L2 chargers, or if drivers pay different prices. Priority among the EVs can be implemented by the appropriate choice of parameter values in online LP (37): a higher-priority EV i can be assigned 1. a larger weight $w_i$ in (37a), and/or
2. a larger min energy $\underline{e}_i$ in (37d), and/or
3. a larger max charging rate $\bar{r}_i(t)$ in (37c).

When the EVs have enough laxity and the infrastructure has enough capacity, these parameters have no effect on the final energy delivered, i.e., ACN will meet the energy demand of every EV before their departure in that case. Priority makes a difference only when there is insufficient capacity or insufficient laxity.

Priority can be used to deal with a driver who does not provide input. In this case, the EV is assigned the lowest priority.

Demand Charge Mitigation

Certain embodiments include a demand charge mitigation feature assuming the peak demand used for demand charge determination is the max energy consumed in each time period t. More likely, the peak demand used for demand charge determination is the max energy consumed in (say) 15 mins which can span multiple time periods t. The following design can be easily extended to the more general case.

Figure 24:
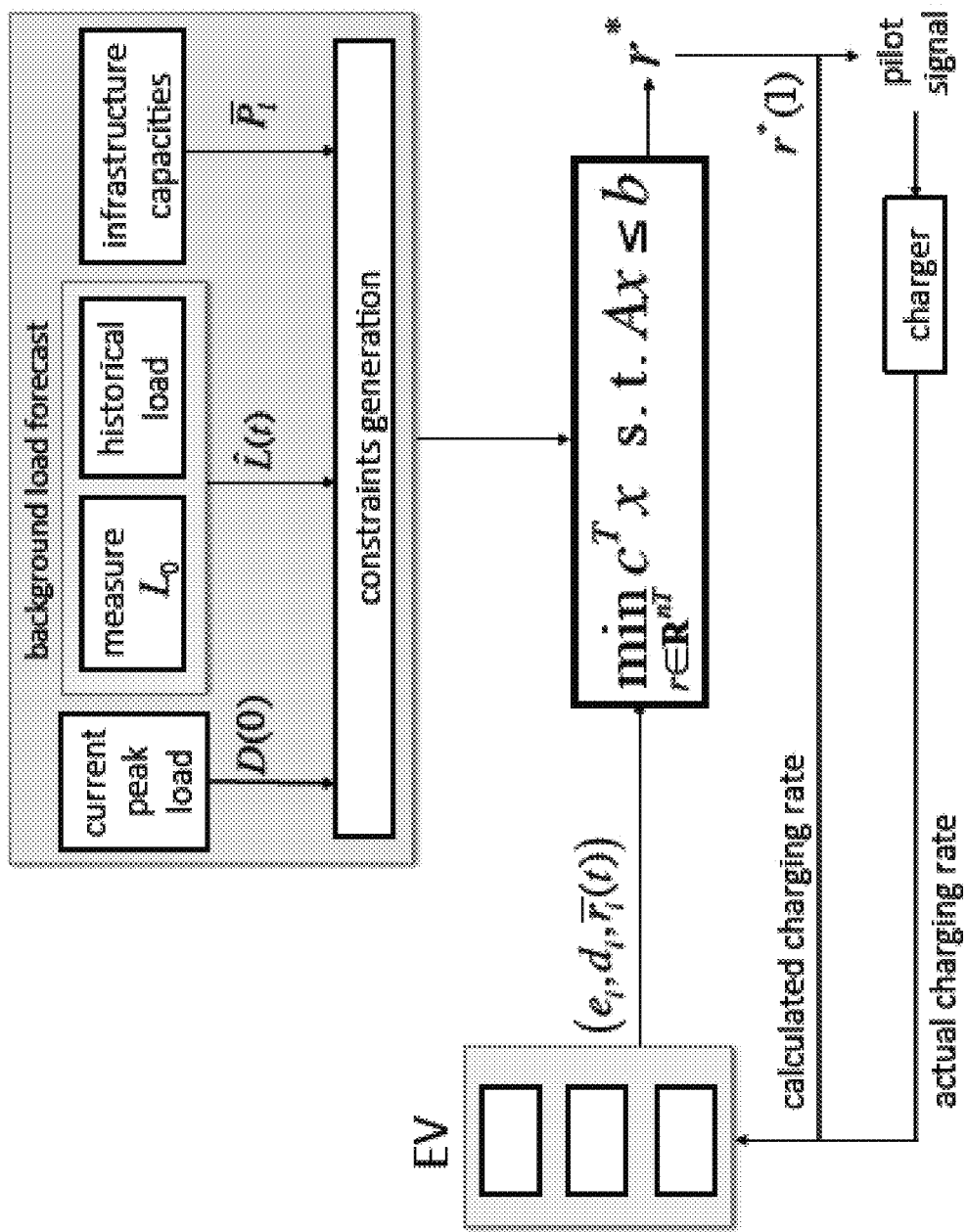
FIG. 24 illustrates a structure of online LP with demand charge mitigation in accordance with an embodiment of the invention.

Let D(0) be the peak demand (EV load+background load) observed from the beginning of the current billing cycle (e.g., from beginning of the month) to the current time t=0. To minimize demand charge, certain embodiments can add to (or replace some of) the constraints (37d) (by) the following constraint:

$$\sum_i r_i(t) \leq \min\{\bar{P}, D(0)\} - \hat{L}(t), \quad t \in [1, T] \quad (39)$$

where $\hat{L}(t)$ are the forecast background loads over $t \in [1,T]$. This guarantees that the total charging rates do not exceed the previous peak demand D(0) (nor the infrastructure capacity $\bar{P}$). This is illustrated in FIG. 24, which illustrates a structure of an online LP with demand charge mitigation in accordance with various embodiments of the invention. Although FIG. 24 illustrates a particular structure of an online LP with demand charge mitigation, any of a variety of structures may be utilized as appropriate to the requirements of specific applications in accordance with various embodiments of the invention.

Just like the basic online LP (37), the LP with demand charge mitigation (39) will always be feasible if the minimum energy guarantees $\underline{e}_i=0$ for all EV i. Otherwise, the LP may be infeasible. In that case, there are two possible policies. In the first case, certain embodiments set all $\underline{e}_i=0$ so that LP becomes always feasible, but may forgo minimum energy guarantees. In the second case, certain embodiments remove the limit due to the current peak load D(t) and require only (note that this reverts to the formulation (38) for infrastructure protection and therefore may still be infeasible if $\underline{e}_i>0$, but the infeasibility is not due to demand charge mitigation):

$$\sum_i r_i(t) \leq \bar{P} - \hat{L}(t), \quad t \in [1, T]$$

After an optimal charging rate vector $r^*:=(r_i^*(r), i \in [1,n], t \in [1,T])$ is computed, the rates $r^*(1):=(r_i^*(1), i \in [1,n])$ is used to set the pilot signals for time t=1. It is possible the actual total load exceed the current peak load D(0). Then the current peak load D(0) is replaced by a measured new (higher) value D(1) for the online LP problem at time t=1.

Real-Time Price Adaptation

In many embodiments, there can be multiple EV charging policies based on real-time prices.

Price Cap

Figure 25:
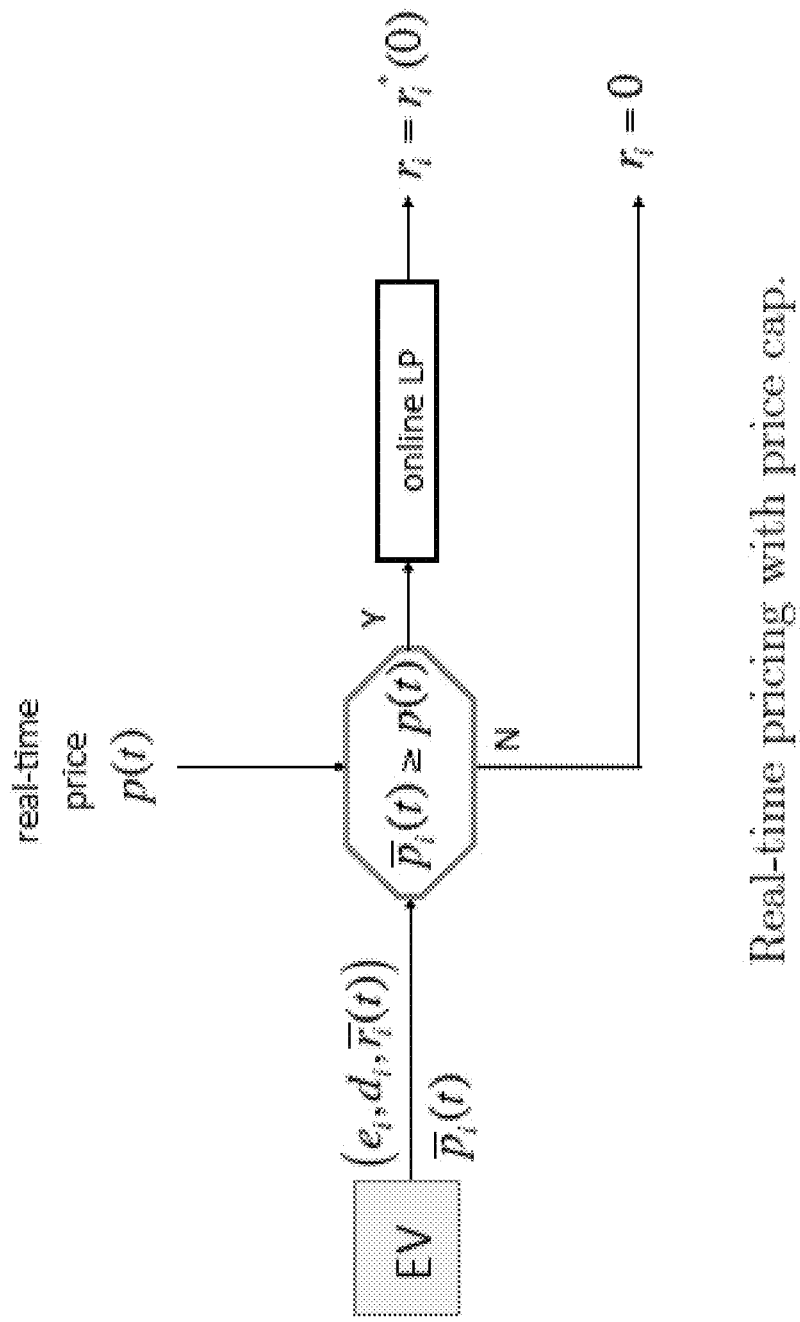
FIG. 25 illustrates real-time pricing with price cap in accordance with an embodiment of the invention.

Each user specifies a cap $\bar{p}_i(t)$ on the real-time electricity prices with the interpretation that if the real-time price p(t) at computation period t is less or equal to the cap $\bar{p}_i(t)$ of EV i, then EV i will be included in the charging rate computation. Otherwise, its rate is set to zero and excluded in the computation. This is illustrated in FIG. 25, which illustrates real-time pricing with price cap in accordance with various embodiments of the invention. Although FIG. 25 illustrates real-time pricing with price cap, any of a variety of mechanisms for price capping may be utilized as appropriate to the requirements of specific applications in accordance with various embodiments of the invention Payment Cap Each user i specifies a budget cap $\beta_i$ so that the total chafing payment is no more than $\beta_i$. Let $\hat{p}(t)$ be the published or forecast real-time prices over time window $t \in [1,T]$.

Certain embodiments may minimize the expected electricity payment in each computation period, and update the remaining budget after charging in each period. Let $\hat{\beta}_i(0)$ be the remaining budget of EV i at computation period $\hat{\beta}_i(0)$. Specifically, we solve the following online LP:

$$\min_r \sum_{t=1}^{T} \hat{p}(t) \sum_i r_i(t) \quad (40a)$$

subject to $0 \leq r_i(t) \leq \bar{r}_i(t), \quad i \in [1, n], t \in [1, T] \quad (40b)$ $$\underline{e}_i \leq \sum_{t=1}^{T} r_i(t) \leq e_i, \quad i \in [1, n] \quad (40c)$$

$$\sum_{i \in S_l} r_i(t) \leq P_l(t), \quad t \in [1, T], \text{ for all } l \quad (40d)$$

$$\sum_{t=1}^{T} \hat{p}(t) r_i(t) \leq \hat{\beta}_i(0), \quad i \in [1, n] \quad (40e)$$

After an optimal charging rate vector $r^*:=(r_i^*(t), i \in [1,n], t \in [1,T])$ is computed, the rates $r^*(1):=(r_i^*(1), i \in [1,n])$ is used to set the pilot signals for time t=1. This incurs an electricity cost $p(1)r_i^*(1)$, assuming the $\hat{p}(1)=p(1)$ is the true real-time price for time $t=1$. The remaining budget is updated to:

$$\hat{\beta}(1):=\hat{\beta}(0)-p(1)r_i^*(1)$$

and the cycle repeats for computation period $r=1$.

Tiered Prices/Payments

In certain embodiments, each user may specify two energy levels $(e_i^1, e_i^2)$ and three caps on prices $(\bar{p}_i^1(t), \bar{p}_i^2(t), \bar{p}_i^3(t))$ or on payments $(\beta_i^1, \beta_i^2, \beta_i^3)$, with the following interpretation:

if energy delivered $\le e_i^1$, then charge EV i with a price (demand) cap of $\bar{p}_i^1(t)(\beta_i^1)$;

if $e_i^1 <$ energy delivered $\le e_i^2$, then charge EV i with a price (demand) cap of $\bar{p}_i^2(t)(\beta_i^2)$;

if energy delivered $> e_i^2$, then charge EV i with a price (demand) cap of $\bar{p}_i^3(t)(\beta_i^3)$.

Joint EV/Solar/Storage Optimization

In many embodiments an ACN includes EV charging, solar generation, and at least one battery. In certain embodiments, the OP framework may schedule EV charging and battery (onsite energy storage) operation to track solar generation. This can be formulated as a convex program. Consider again the problem at time $t=0$.

Let $\hat{L}(t)$ be the forecast background load over time window $t \in [1,T]$, based on real-time measurement $L(0)$ and historical data.

$\hat{S}(t)$ be the forecast solar generation over time window $t \in [1,T]$, based on real-time measurement $S(0)$ and historical data.

$b(t)$ be the SoC of the battery at time $t \in [1,T]$. Use a simple battery model (without loss) with $$b(t+)=b(t)+u(t)$$

where $u(t)$ is the amount of energy in time period t drawn by the battery if $u(t)$ is positive, and the amount of energy released by the battery if $u(t)$ is negative.

In certain embodiments, the QP framework may choose charging rates r and battery operation $u(t)$ so as to minimize the distance between the forecast solar generation $S(t)$ and the total net load (EV+background+battery draw). This can be accomplished by solving the following convex optimization problem (quadratic program):

$$\min_r \sum_{t=1}^{T} \left( \sum_i r_i(t) + \hat{L}(t) + u(t) - \hat{S}(t) \right)^2 \quad (41a)$$

subject to $0 \le r_i(t) \le \bar{r}_i(t), \quad i \in [1, n], t \in [1, T]$ (41b)

$$\underline{e}_i \le \sum_{t=1}^{T} r_i(t) \le e_i, \quad i \in [1, n] \quad (41c)$$

$$\sum_{i \in S_l} r_i(t) \le P_l(t), \quad t \in [1, T], \text{ for all } l \quad (41d)$$

$$b(t+1) = b(t) + u(t), \quad 0 \le b(t) \le B, \quad t \in [1, T] \quad (41e)$$

Here the new constraints (41e) represent a simple (lossless) battery model that describes how SoC evolves according to the control $u(t)$ and that the SoC must lie between empty and full (B being the battery capacity of the onsite energy storage facility).

Figure 26:
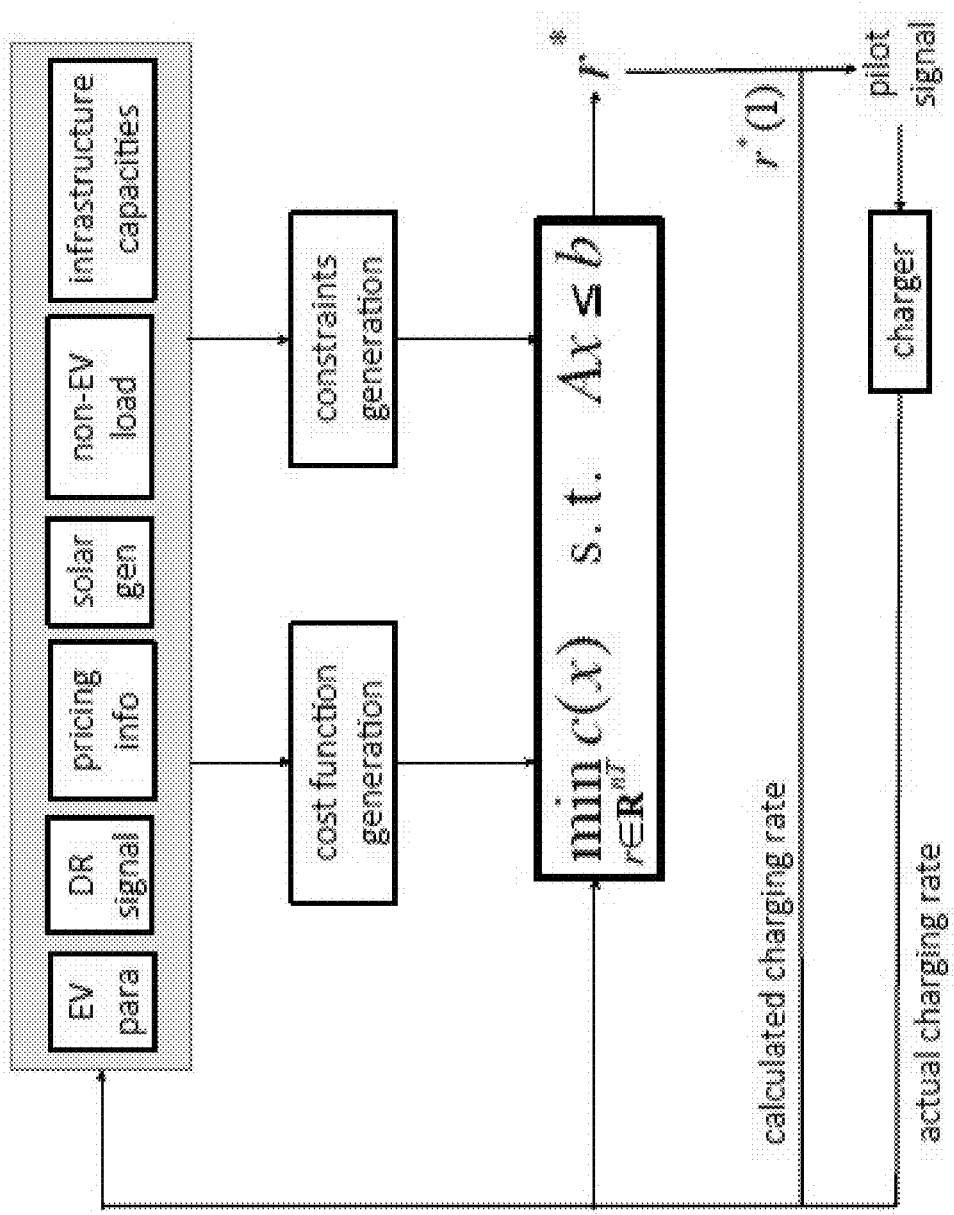
FIG. 26 illustrates building blocks of optimization-based product feature in accordance with an embodiment of the invention.

Accordingly, many embodiments provide a unified algorithmic framework to guide the design of a clean, flexible and evolvable architecture to implement various optimization-based product features. FIG. 26 illustrates building blocks of optimization-based product features in accordance with various embodiments of the invention. In particular, these may include:

User account and management, e.g., for priority or payment purposes;

Background load $\hat{L}(t)$ real-time measurement and forecast from historical data;

Interface for DR commands $D(t)$ from site operator or utility;

User priority determination;

Current peak load measurement $D(0)$;

Interface for real-time prices $\hat{p}(t)$ and forecast from historical data;

Solar generation $\hat{S}(t)$ real-time measurement and forecast from historical data;

Although FIG. 26 illustrates various building blocks for optimization-based product features, any of a variety of building blocks may be utilized as appropriate to the requirements of specific applications in accordance with various embodiments of the invention Although the present invention has been described in certain specific aspects, many additional modifications and variations would be apparent to those skilled in the art. It is therefore to be understood that the present invention may be practiced otherwise than specifically described as appropriate to the requirements of a given application. Thus, embodiments of the present invention should be considered in all respects as illustrative and not restrictive.

What is claimed is:

1. An electric vehicle charging network, comprising:
one or more centralized computing systems;
a communications network;
a plurality of electric vehicle node controllers for charging a plurality of electric vehicles (EVs), where each electric vehicle node controller in the plurality of node controller comprises:
a network interface;
a processor;
memory containing:
an adaptive charging application;
a plurality of electric vehicle node parameters describing charging parameters of an electric vehicle in the electric vehicle charging network;
wherein the processor is configured by the adaptive charging application to:
send electric vehicle node parameters to the one or more centralized computing systems; and
charge an electric vehicle using a charging rate received from the one or more centralized computing systems;
wherein the one or more centralized computing systems is configured to:
receive the electric vehicle node parameters from the plurality of electric vehicle node controllers;
calculate a plurality of charging rates for the plurality of electric vehicle node controllers using quadratic programming (QP), wherein the quadratic programming computes the plurality of charging rates based on the electric vehicle node parameters, a plurality of adaptive charging parameters and a quadratic cost function; and
distributing the charging rates to the plurality of electric vehicle node controllers.

2. The electric vehicle charging network of claim 1, wherein the charging rates meet energy demands of the plurality of electric vehicles by a plurality of departure times.

3. The electric vehicle charging network of claim 1, wherein the charging rates for the plurality of electric vehicle nodes are a time series of timing rates provided to each electric vehicle node controller.

4. The electric vehicle charging network of claim 1, wherein the electric vehicle node parameters include an electric vehicle departure time, a remaining energy demand, and a maximum charging rate.

5. The electric vehicle charging network of claim 3, wherein the time series of timing rates can be evaluated by the one or more centralized computing systems using the following expression:

$$c(r) \quad (42a)$$

$$\text{subject to } 0 \leq r_i(t) \leq \bar{r}_i(t), \quad i \in [1, n], t \in [1, T] \quad (42b)$$

$$\underline{e}_i \leq \sum_{t=1}^{T} r_i(t) \leq e_i, \quad i \in [1, n] \quad (42c)$$

$$\sum_i A_{li} r_i(t) \leq P_l(t), \quad t \in [1, T], \text{ for all resources } l \quad (42d)$$

where $c(r)$ is a convex quadratic cost function, $e_i$ is an energy demand, $\underline{e}_i$ is a minimum energy that will be delivered, T is an optimization horizon, $r_i(t)$ is the calculated charging rate, $\bar{r}_i$ is a maximum rate, $P_l(t)$ denotes the capacities of resources l at time t, and $A_{li}$ are the coefficients that describe how EV i's are constrained by resources l, wherein for each QP instance, t can be t=1, 2, . . . , T.

6. The electric vehicle charging network of claim 1, wherein the charging rates for a first set of electric vehicle node controllers are a maximum charging rate; and
the charging rates for a second set of electric vehicle node controllers are a minimum charging rate.

7. The electric vehicle charging network of claim 1, wherein calculating the plurality of charging rates is a least laxity first process.

8. The electric vehicle charging network of claim 1, wherein a first electric vehicle node controller is assigned a first group that is guaranteed that, for each EV in the first group, a requested energy will be delivered, and a second electric vehicle node controller is assigned to a second group that is guaranteed, for each EV in the second group, a minimum energy.

9. The electric vehicle charging network of claim 8, wherein charging rates for the first group and second group are determined sequentially by:

solving for charging rates using QP for EVs in the first group only;
computing left-over capacities for Group 2; and
solving for charging rates using QP for EVs in the second group only using the left-over capacities.

10. The electric vehicle charging network of claim 1, further comprising reducing rate fluctuations across a time period by using a penalty term within the quadratic cost function.

11. The electric vehicle charging network of claim 1, wherein the one or more centralized computing systems is configured to: set a charging rate to be greater than zero for an EV with a remaining energy demand.

12. The electric vehicle charging network of claim 1, wherein the one or more centralized computing systems is configured to: receive a request for admission of an electric vehicle from an electric vehicle node controller; determine whether to admit the electric vehicle based on existing electric vehicle node parameters from the plurality of electric vehicle node controllers and existing capacity constraints.

13. The electric vehicle charging network of claim 1, wherein the one or more centralized computing systems is configured to: prioritize the plurality of electric vehicle node controllers when there is insufficient capacity to meet energy demands of the plurality of electric vehicles.

14. The electric vehicle charging network of claim 1, wherein the one or more centralized computing systems is configured to schedule charging by the plurality of electric vehicle node controllers based on solar generation.

15. The electric vehicle charging network of claim 14, wherein the one or more centralized computing systems is configured to select charging rates that minimize the distance between a forecasted solar generation and a total net load.

16. The electric vehicle charging network of claim 1, wherein the one or more centralized computing systems is configured to cap a total site load over a time period.

17. The electric vehicle charging network of claim 1, wherein the plurality of electric vehicle node controllers are connected in delta configurations providing an unbalanced three-phase infrastructure.

18. The electric vehicle charging network of claim 17, further comprising providing phase constrains and line constraints on currents along legs of the delta configurations.

19. The electric vehicle charging network of claim 1, wherein the one or more centralized computing systems is configured to: determining that a minimum energy demand cannot be met for an EV and post-processing, using the QP, the plurality of charging rates.

20. The electric vehicle charging network of claim 1, wherein the plurality of adaptive charging parameters are quadratic capacity constraints.

* * * * *